(12) United States Patent
Batwara et al.

(10) Patent No.: US 9,274,937 B2
(45) Date of Patent: Mar. 1, 2016

(54) SYSTEMS, METHODS, AND INTERFACES FOR VECTOR INPUT/OUTPUT OPERATIONS

(71) Applicants: Ashish Batwara, Fremont, CA (US); James G. Peterson, San Jose, CA (US); Nisha Talagala, Livermore, CA (US); Nick Piggin, Yarralumla (AU); Michael Zappe, Arvada, CO (US)

(72) Inventors: Ashish Batwara, Fremont, CA (US); James G. Peterson, San Jose, CA (US); Nisha Talagala, Livermore, CA (US); Nick Piggin, Yarralumla (AU); Michael Zappe, Arvada, CO (US)

(73) Assignee: Longitude Enterprise Flash S.a.r.l., Luxembourg (LU)

( * ) Notice: Subject to any disclaimer, the term of this patent is extended or adjusted under 35 U.S.C. 154(b) by 301 days.

(21) Appl. No.: 13/725,728

(22) Filed: Dec. 21, 2012

(65) Prior Publication Data

US 2013/0166855 A1 Jun. 27, 2013

Related U.S. Application Data

(63) Continuation-in-part of application No. 13/539,235, filed on Jun. 29, 2012, which is a continuation-in-part of application No. 13/335,922, filed on Dec. 22, 2011, now Pat. No. 8,725,934.

(60) Provisional application No. 61/625,475, filed on Apr. 17, 2012, provisional application No. 61/637,155, filed on Apr. 23, 2012, provisional application No. 61/579,627, filed on Dec. 22, 2011.

(51) Int. Cl.
*G06F 12/00* (2006.01)
*G06F 3/06* (2006.01)

(52) U.S. Cl.
CPC .............. *G06F 12/00* (2013.01); *G06F 3/0608* (2013.01); *G06F 3/0659* (2013.01); *G06F 3/0688* (2013.01); *G06F 3/064* (2013.01)

(58) Field of Classification Search
None
See application file for complete search history.

(56) References Cited

U.S. PATENT DOCUMENTS

| | | | |
|---|---|---|---|
| 4,571,674 A | 2/1986 | Hartung | |
| 5,193,184 A | 3/1993 | Belsan et al. | |
| 5,261,068 A | 11/1993 | Gaskins et al. | |

(Continued)

FOREIGN PATENT DOCUMENTS

| | | |
|---|---|---|
| CN | 1771495 | 5/2006 |
| EP | 1418502 | 5/2004 |

(Continued)

OTHER PUBLICATIONS

Ari, "Performance Boosting and Workload Isolation in Storage Area Networks with SanCache," Hewlett Packard Laboratories, Proceedings of the 23rd IEEE / 14th NASA Goddard Conference on Mass Storage Systems and Technologies (MSST 2006), May 2006, pp. 263-274.

(Continued)

*Primary Examiner* — Gary Portka

(57) ABSTRACT

Data of a vector storage request pertaining to one or more disjoint, non-adjacent, and/or non-contiguous logical identifier ranges are stored contiguously within a log on a non-volatile storage medium. A request consolidation module modifies one or more sub-requests of the vector storage request in response to other, cached storage requests. Data of an atomic vector storage request may comprise persistent indicators, such as persistent metadata flags, to identify data pertaining to incomplete atomic storage requests. A restart recovery module identifies and excludes data of incomplete atomic operations.

18 Claims, 25 Drawing Sheets

(56) References Cited

U.S. PATENT DOCUMENTS

| | | |
|---|---|---|
| 5,307,497 A | 4/1994 | Feignbaum |
| 5,325,509 A | 6/1994 | Lautzenheiser |
| 5,392,427 A | 2/1995 | Barrett et al. |
| 5,404,485 A | 4/1995 | Ban |
| 5,438,671 A | 8/1995 | Miles |
| 5,469,555 A | 11/1995 | Ghosh et al. |
| 5,499,354 A | 3/1996 | Aschoff et al. |
| 5,504,882 A | 4/1996 | Chai |
| 5,535,399 A | 7/1996 | Blitz et al. |
| 5,553,261 A | 9/1996 | Hasbun et al. |
| 5,586,291 A | 12/1996 | Lasker et al. |
| 5,594,883 A | 1/1997 | Pricer |
| 5,596,736 A | 1/1997 | Kerns |
| 5,598,370 A | 1/1997 | Nijima et al. |
| 5,651,133 A | 7/1997 | Burkes |
| 5,680,579 A | 10/1997 | Young et al. |
| 5,682,497 A | 10/1997 | Robinson |
| 5,682,499 A | 10/1997 | Bakke et al. |
| 5,701,434 A | 12/1997 | Nakagawa |
| 5,745,792 A | 4/1998 | Jost |
| 5,754,563 A | 5/1998 | White |
| 5,757,567 A | 5/1998 | Hetzler et al. |
| 5,787,486 A | 7/1998 | Chin et al. |
| 5,802,602 A | 9/1998 | Rahman et al. |
| 5,809,527 A | 9/1998 | Cooper et al. |
| 5,809,543 A | 9/1998 | Byers et al. |
| 5,832,515 A | 11/1998 | Ledain et al. |
| 5,845,329 A | 12/1998 | Onishi et al. |
| 5,930,815 A | 7/1999 | Estakhri et al. |
| 5,957,158 A | 9/1999 | Volz et al. |
| 5,960,462 A | 9/1999 | Solomon et al. |
| 6,000,019 A | 12/1999 | Dykstal et al. |
| 6,014,724 A | 1/2000 | Jennett |
| 6,073,232 A | 6/2000 | Kroeker et al. |
| 6,101,601 A | 8/2000 | Matthews et al. |
| 6,170,039 B1 | 1/2001 | Kishida |
| 6,170,047 B1 | 1/2001 | Dye |
| 6,173,381 B1 | 1/2001 | Dye |
| 6,185,654 B1 | 2/2001 | Van Doren |
| 6,209,088 B1 | 3/2001 | Reneris |
| 6,236,593 B1 | 5/2001 | Hong et al. |
| 6,256,642 B1 | 7/2001 | Krueger et al. |
| 6,279,069 B1 | 8/2001 | Robinson et al. |
| 6,289,413 B1 | 9/2001 | Rogers et al. |
| 6,311,290 B1 | 10/2001 | Hasbun et al. |
| 6,330,688 B1 | 12/2001 | Brown |
| 6,336,174 B1 | 1/2002 | Li et al. |
| 6,356,986 B1 | 3/2002 | Solomon et al. |
| 6,370,631 B1 | 4/2002 | Dye |
| 6,385,710 B1 | 5/2002 | Goldman et al. |
| 6,404,647 B1 | 6/2002 | Minne |
| 6,412,080 B1 | 6/2002 | Fleming et al. |
| 6,418,478 B1 | 7/2002 | Ignatius et al. |
| 6,480,933 B1 | 11/2002 | Cargemel et al. |
| 6,507,911 B1 | 1/2003 | Langford |
| 6,523,102 B1 | 2/2003 | Dye et al. |
| 6,564,285 B1 | 5/2003 | Mills |
| 6,587,915 B1 | 7/2003 | Kim |
| 6,601,211 B1 | 7/2003 | Norman |
| 6,625,685 B1 | 9/2003 | Cho et al. |
| 6,629,112 B1 | 9/2003 | Shank |
| 6,658,438 B1 | 12/2003 | Moore et al. |
| 6,671,757 B1 | 12/2003 | Multer et al. |
| 6,715,027 B2 | 3/2004 | Kim et al. |
| 6,751,155 B2 | 6/2004 | Gorobets |
| 6,754,774 B2 | 6/2004 | Gruner et al. |
| 6,775,185 B2 | 8/2004 | Fujisawa et al. |
| 6,779,088 B1 | 8/2004 | Benveniste et al. |
| 6,785,785 B2 | 8/2004 | Piccirillo et al. |
| 6,877,076 B1 | 4/2005 | Cho et al. |
| 6,880,049 B2 | 4/2005 | Gruner et al. |
| 6,883,079 B1 | 4/2005 | Priborsky |
| 6,938,133 B2 | 8/2005 | Johnson et al. |
| 6,957,158 B1 | 10/2005 | Hancock et al. |
| 6,959,369 B1 | 10/2005 | Ashton et al. |
| 6,973,551 B1 | 12/2005 | Walton |
| 6,981,070 B1 | 12/2005 | Luk et al. |
| 6,996,676 B2 | 2/2006 | Megiddo |
| 7,010,652 B2 | 3/2006 | Piccirillo et al. |
| 7,010,662 B2 | 3/2006 | Aasheim et al. |
| 7,013,376 B2 | 3/2006 | Hooper, III |
| 7,013,379 B1 | 3/2006 | Testardi |
| 7,035,974 B2 | 4/2006 | Shang |
| 7,043,599 B1 | 5/2006 | Ware et al. |
| 7,047,366 B1 | 5/2006 | Ezra |
| 7,050,337 B2 | 5/2006 | Iwase et al. |
| 7,058,769 B1 | 6/2006 | Danilak |
| 7,076,599 B2 | 7/2006 | Aasheim et al. |
| 7,082,495 B2 | 7/2006 | DeWhitt et al. |
| 7,082,512 B2 | 7/2006 | Aasheim et al. |
| 7,085,879 B2 | 8/2006 | Aasheim et al. |
| 7,089,391 B2 | 8/2006 | Geiger et al. |
| 7,093,101 B2 | 8/2006 | Aasheim et al. |
| 7,096,321 B2 | 8/2006 | Modha |
| 7,130,956 B2 | 10/2006 | Rao |
| 7,130,957 B2 | 10/2006 | Rao |
| 7,167,953 B2 | 1/2007 | Megiddo et al. |
| 7,171,536 B2 | 1/2007 | Chang et al. |
| 7,173,852 B2 | 2/2007 | Gorobets |
| 7,181,572 B2 | 2/2007 | Walmsley |
| 7,194,577 B2 | 3/2007 | Johnson et al. |
| 7,194,740 B1 | 3/2007 | Frank et al. |
| 7,203,815 B2 | 4/2007 | Haswell |
| 7,215,580 B2 | 5/2007 | Gorobets |
| 7,219,238 B2 | 5/2007 | Saito et al. |
| 7,243,203 B2 | 7/2007 | Scheuerlein |
| 7,246,179 B2 | 7/2007 | Camara et al. |
| 7,254,686 B2 | 8/2007 | Islam |
| 7,275,135 B2 | 9/2007 | Coulson |
| 7,280,536 B2 | 10/2007 | Testardi |
| 7,293,183 B2 | 11/2007 | Lee et al. |
| 7,305,520 B2 | 12/2007 | Voigt et al. |
| 7,310,711 B2 | 12/2007 | New et al. |
| 7,328,307 B2 | 2/2008 | Hoogterp |
| 7,340,558 B2 | 3/2008 | Lee et al. |
| 7,340,566 B2 | 3/2008 | Voth |
| 7,356,651 B2 | 4/2008 | Liu et al. |
| 7,360,015 B2 | 4/2008 | Matthews et al. |
| 7,366,808 B2 | 4/2008 | Kano et al. |
| 7,395,384 B2 | 7/2008 | Sinclair |
| 7,398,348 B2 | 7/2008 | Moore et al. |
| 7,437,510 B2 | 10/2008 | Rosenbluth et al. |
| 7,447,847 B2 | 11/2008 | Louie et al. |
| 7,450,420 B2 | 11/2008 | Sinclair et al. |
| 7,464,221 B2 | 12/2008 | Nakamura et al. |
| 7,487,235 B2 | 2/2009 | Andrews et al. |
| 7,487,320 B2 | 2/2009 | Bansal et al. |
| 7,516,267 B2 | 4/2009 | Coulson et al. |
| 7,526,614 B2 | 4/2009 | van Riel |
| 7,529,905 B2 | 5/2009 | Sinclair |
| 7,536,491 B2 | 5/2009 | Kano et al. |
| 7,552,271 B2 | 6/2009 | Sinclair et al. |
| 7,580,287 B2 | 8/2009 | Aritome |
| 7,603,532 B2 | 10/2009 | Rajan et al. |
| 7,610,348 B2 | 10/2009 | Kisley et al. |
| 7,620,773 B2 | 11/2009 | Nicholson et al. |
| 7,640,390 B2 | 12/2009 | Iwamura et al. |
| 7,644,239 B2 | 1/2010 | Ergan et al. |
| 7,660,911 B2 | 2/2010 | McDaniel |
| 7,660,941 B2 | 2/2010 | Lee et al. |
| 7,664,239 B2 | 2/2010 | Groff et al. |
| 7,669,019 B2 | 2/2010 | Fujibayashi et al. |
| 7,676,628 B1 | 3/2010 | Compton et al. |
| 7,702,873 B2 | 4/2010 | Griess et al. |
| 7,721,059 B2 | 5/2010 | Mylly et al. |
| 7,725,628 B1 | 5/2010 | Phan et al. |
| 7,743,210 B2 | 6/2010 | Jernigan, IV et al. |
| 7,831,783 B2 | 11/2010 | Pandit et al. |
| 7,853,772 B2 | 12/2010 | Chang et al. |
| 7,873,782 B2 | 1/2011 | Terry |
| 7,873,803 B2 | 1/2011 | Cheng |
| 7,882,305 B2 | 2/2011 | Moritoki |
| 7,904,647 B2 | 3/2011 | El-Batal et al. |
| 7,913,051 B1 | 3/2011 | Todd et al. |

(56) References Cited

U.S. PATENT DOCUMENTS

| | | | |
|---|---|---|---|
| 7,917,803 B2 | 3/2011 | Stefanus et al. | |
| 7,930,326 B2 | 4/2011 | Doucette et al. | |
| 7,941,591 B2 | 5/2011 | Aviles | |
| 7,970,770 B2 | 6/2011 | Edwards | |
| 7,984,230 B2 | 7/2011 | Nasu et al. | |
| 8,046,526 B2 | 10/2011 | Yeh | |
| 8,055,820 B2 | 11/2011 | Sebire | |
| 8,090,886 B2 | 1/2012 | Phan et al. | |
| 8,127,103 B2 | 2/2012 | Kano et al. | |
| 8,135,900 B2 | 3/2012 | Kunimatsu et al. | |
| 8,151,082 B2 | 4/2012 | Flynn et al. | |
| 8,171,204 B2 | 5/2012 | Chow et al. | |
| 8,205,060 B2 | 6/2012 | Hahn et al. | |
| 8,417,901 B2 * | 4/2013 | Lin | 711/154 |
| 8,607,028 B2 * | 12/2013 | Kale et al. | 711/220 |
| 8,904,091 B1 * | 12/2014 | Guda et al. | 711/103 |
| 9,015,209 B2 | 4/2015 | Hahn et al. | |
| 2002/0069318 A1 | 6/2002 | Chow et al. | |
| 2002/0103819 A1 | 8/2002 | Duvillier | |
| 2002/0161855 A1 | 10/2002 | Manczak et al. | |
| 2002/0181134 A1 | 12/2002 | Bunker et al. | |
| 2003/0028726 A1 | 2/2003 | Gaertner et al. | |
| 2003/0061296 A1 | 3/2003 | Craddock et al. | |
| 2003/0140051 A1 | 7/2003 | Fujiwara et al. | |
| 2003/0145230 A1 | 7/2003 | Chiu et al. | |
| 2003/0149753 A1 | 8/2003 | Lamb | |
| 2003/0198084 A1 | 10/2003 | Fujisawa et al. | |
| 2004/0003002 A1 | 1/2004 | Adelmann | |
| 2004/0044840 A1 | 3/2004 | Wong | |
| 2004/0093463 A1 | 5/2004 | Shang | |
| 2004/0117586 A1 | 6/2004 | Estakhri | |
| 2004/0128470 A1 | 7/2004 | Hetzler | |
| 2004/0148360 A1 | 7/2004 | Mehra et al. | |
| 2004/0186946 A1 | 9/2004 | Lee | |
| 2004/0268359 A1 | 12/2004 | Hanes | |
| 2005/0002263 A1 | 1/2005 | Iwase et al. | |
| 2005/0015539 A1 | 1/2005 | Horii et al. | |
| 2005/0027951 A1 | 2/2005 | Piccirillo et al. | |
| 2005/0120177 A1 | 6/2005 | Black | |
| 2005/0141313 A1 | 6/2005 | Gorobets | |
| 2005/0177672 A1 | 8/2005 | Rao | |
| 2005/0177687 A1 | 8/2005 | Rao | |
| 2005/0193166 A1 | 9/2005 | Johnson et al. | |
| 2005/0216653 A1 | 9/2005 | Aasheim et al. | |
| 2005/0240713 A1 | 10/2005 | Wu | |
| 2005/0246510 A1 | 11/2005 | Retnamma et al. | |
| 2005/0257017 A1 | 11/2005 | Yagi | |
| 2005/0267882 A1 | 12/2005 | Aupperlee et al. | |
| 2005/0273476 A1 | 12/2005 | Wertheimer | |
| 2006/0004955 A1 | 1/2006 | Ware et al. | |
| 2006/0020744 A1 | 1/2006 | Sinclair et al. | |
| 2006/0026339 A1 | 2/2006 | Rostampour | |
| 2006/0059326 A1 | 3/2006 | Aasheim et al. | |
| 2006/0075057 A1 | 4/2006 | Gildea et al. | |
| 2006/0085626 A1 | 4/2006 | Roberson et al. | |
| 2006/0129778 A1 | 6/2006 | Clark et al. | |
| 2006/0136657 A1 | 6/2006 | Rudelic et al. | |
| 2006/0143396 A1 | 6/2006 | Cabot | |
| 2006/0149893 A1 | 7/2006 | Barfuss et al. | |
| 2006/0153026 A1 | 7/2006 | Blacquiere | |
| 2006/0179263 A1 | 8/2006 | Song et al. | |
| 2006/0184722 A1 | 8/2006 | Sinclair | |
| 2006/0190552 A1 | 8/2006 | Henze et al. | |
| 2006/0224849 A1 | 10/2006 | Islam et al. | |
| 2006/0236061 A1 | 10/2006 | Koclanes | |
| 2006/0248387 A1 | 11/2006 | Nicholson et al. | |
| 2006/0265636 A1 | 11/2006 | Hummler | |
| 2007/0016699 A1 | 1/2007 | Minami | |
| 2007/0033325 A1 | 2/2007 | Sinclair | |
| 2007/0033326 A1 | 2/2007 | Sinclair | |
| 2007/0033327 A1 | 2/2007 | Sinclair | |
| 2007/0033362 A1 | 2/2007 | Sinclair | |
| 2007/0043900 A1 | 2/2007 | Yun | |
| 2007/0043915 A1 | 2/2007 | Moir et al. | |
| 2007/0050571 A1 | 3/2007 | Nakamura | |
| 2007/0061508 A1 | 3/2007 | Zweighaft | |
| 2007/0083530 A1 | 4/2007 | Lakshminath et al. | |
| 2007/0088666 A1 | 4/2007 | Saito | |
| 2007/0118676 A1 | 5/2007 | Kano et al. | |
| 2007/0118713 A1 | 5/2007 | Guterman | |
| 2007/0124540 A1 | 5/2007 | van Riel | |
| 2007/0136555 A1 | 6/2007 | Sinclair | |
| 2007/0143532 A1 | 6/2007 | Gorobets et al. | |
| 2007/0143560 A1 | 6/2007 | Gorobets | |
| 2007/0143561 A1 | 6/2007 | Gorobets | |
| 2007/0143566 A1 | 6/2007 | Gorobets | |
| 2007/0150689 A1 | 6/2007 | Pandit et al. | |
| 2007/0156998 A1 | 7/2007 | Gorobets | |
| 2007/0168698 A1 | 7/2007 | Coulson et al. | |
| 2007/0169030 A1 | 7/2007 | Tarditi, Jr. | |
| 2007/0198770 A1 | 8/2007 | Horii et al. | |
| 2007/0204128 A1 | 8/2007 | Lee et al. | |
| 2007/0208790 A1 | 9/2007 | Reuter et al. | |
| 2007/0233937 A1 | 10/2007 | Coulson et al. | |
| 2007/0260608 A1 | 11/2007 | Hertzberg et al. | |
| 2007/0261030 A1 | 11/2007 | Wadhwa | |
| 2007/0263514 A1 | 11/2007 | Iwata et al. | |
| 2007/0266037 A1 | 11/2007 | Terry | |
| 2007/0274150 A1 | 11/2007 | Gorobets | |
| 2007/0276994 A1 | 11/2007 | Caulkins et al. | |
| 2007/0294474 A1 | 12/2007 | Panabaker et al. | |
| 2007/0300008 A1 | 12/2007 | Rogers et al. | |
| 2008/0010395 A1 | 1/2008 | Mylly et al. | |
| 2008/0052377 A1 | 2/2008 | Light | |
| 2008/0052477 A1 | 2/2008 | Lee | |
| 2008/0091876 A1 | 4/2008 | Fujibayashi et al. | |
| 2008/0120469 A1 | 5/2008 | Kornegay | |
| 2008/0126507 A1 | 5/2008 | Wilkinson | |
| 2008/0126700 A1 | 5/2008 | El-Batal et al. | |
| 2008/0140737 A1 | 6/2008 | Garst et al. | |
| 2008/0163220 A1 | 7/2008 | Wang | |
| 2008/0195798 A1 | 8/2008 | Lee et al. | |
| 2008/0209090 A1 | 8/2008 | Kano et al. | |
| 2008/0228992 A1 | 9/2008 | Dumitru et al. | |
| 2008/0229045 A1 | 9/2008 | Qi | |
| 2008/0235443 A1 | 9/2008 | Chow et al. | |
| 2008/0243966 A1 | 10/2008 | Croisettier | |
| 2008/0263259 A1 | 10/2008 | Sadovsky et al. | |
| 2008/0263305 A1 | 10/2008 | Shu et al. | |
| 2008/0263569 A1 | 10/2008 | Shu et al. | |
| 2008/0276040 A1 | 11/2008 | Moritoki | |
| 2008/0288819 A1 | 11/2008 | Heller, Jr. | |
| 2008/0294847 A1 | 11/2008 | Maruyama et al. | |
| 2008/0320209 A1 * | 12/2008 | Lee et al. | 711/103 |
| 2008/0320253 A1 | 12/2008 | Tomlin et al. | |
| 2009/0070526 A1 | 3/2009 | Tetrick | |
| 2009/0083478 A1 | 3/2009 | Kunimatsu et al. | |
| 2009/0083485 A1 | 3/2009 | Cheng | |
| 2009/0089485 A1 | 4/2009 | Yeh | |
| 2009/0125650 A1 | 5/2009 | Sebire | |
| 2009/0125700 A1 | 5/2009 | Kisel | |
| 2009/0132760 A1 | 5/2009 | Flynn | |
| 2009/0150599 A1 | 6/2009 | Bennett | |
| 2009/0150605 A1 | 6/2009 | Flynn et al. | |
| 2009/0150641 A1 | 6/2009 | Flynn et al. | |
| 2009/0228637 A1 | 9/2009 | Moon | |
| 2009/0248763 A1 | 10/2009 | Rajan | |
| 2009/0276654 A1 | 11/2009 | Butterworth | |
| 2009/0287887 A1 | 11/2009 | Matsuki | |
| 2009/0292861 A1 | 11/2009 | Kanevsky et al. | |
| 2009/0300277 A1 | 12/2009 | Jeddeloh | |
| 2009/0307424 A1 | 12/2009 | Galloway et al. | |
| 2009/0313453 A1 | 12/2009 | Stefanus et al. | |
| 2009/0327602 A1 | 12/2009 | Moore et al. | |
| 2009/0327804 A1 | 12/2009 | Moshayedi | |
| 2010/0005228 A1 | 1/2010 | Fukutomi | |
| 2010/0005255 A1 | 1/2010 | Kaushik et al. | |
| 2010/0017556 A1 | 1/2010 | Chin | |
| 2010/0023674 A1 | 1/2010 | Aviles | |
| 2010/0023676 A1 | 1/2010 | Moon | |
| 2010/0030946 A1 | 2/2010 | Kano et al. | |
| 2010/0076936 A1 | 3/2010 | Rajan | |
| 2010/0082529 A1 | 4/2010 | Mace | |
| 2010/0095059 A1 | 4/2010 | Kisley et al. | |

(56) References Cited

U.S. PATENT DOCUMENTS

| | | | |
|---|---|---|---|
| 2010/0153660 A1 | 6/2010 | Lasser | |
| 2010/0169542 A1 | 7/2010 | Sinclair | |
| 2010/0205231 A1 | 8/2010 | Cousins | |
| 2010/0205335 A1 | 8/2010 | Phan et al. | |
| 2010/0211737 A1 | 8/2010 | Flynn | |
| 2010/0235597 A1 | 9/2010 | Arakawa | |
| 2010/0262738 A1 | 10/2010 | Swing et al. | |
| 2010/0262740 A1 | 10/2010 | Borchers et al. | |
| 2010/0262757 A1 | 10/2010 | Sprinkle et al. | |
| 2010/0262758 A1 | 10/2010 | Swing et al. | |
| 2010/0262759 A1 | 10/2010 | Borchers et al. | |
| 2010/0262760 A1 | 10/2010 | Swing et al. | |
| 2010/0262761 A1 | 10/2010 | Borchers et al. | |
| 2010/0262762 A1 | 10/2010 | Borchers et al. | |
| 2010/0262766 A1 | 10/2010 | Sprinkle et al. | |
| 2010/0262767 A1 | 10/2010 | Borchers et al. | |
| 2010/0262773 A1 | 10/2010 | Borchers et al. | |
| 2010/0262894 A1 | 10/2010 | Swing et al. | |
| 2010/0262979 A1 | 10/2010 | Borchers et al. | |
| 2011/0022819 A1 | 1/2011 | Post et al. | |
| 2011/0119446 A1 | 5/2011 | Blumrich et al. | |
| 2011/0208915 A1 | 8/2011 | Bannon et al. | |
| 2011/0225364 A1 | 9/2011 | Edwards | |
| 2011/0296133 A1 | 12/2011 | Flynn et al. | |
| 2012/0030408 A1 | 2/2012 | Flynn et al. | |
| 2012/0059978 A1* | 3/2012 | Rosenband et al. | 711/103 |
| 2013/0166829 A1 | 6/2013 | Dumitru | |

FOREIGN PATENT DOCUMENTS

| | | |
|---|---|---|
| EP | 1814039 | 3/2009 |
| JP | 8153014 | 6/1996 |
| WO | WO95/18407 | 7/1995 |
| WO | WO96/12225 | 4/1996 |
| WO | WO0201365 | 1/2002 |
| WO | WO2004099989 | 11/2004 |
| WO | WO2005103878 | 11/2005 |
| WO | WO2006062511 | 6/2006 |
| WO | WO2006065626 | 6/2006 |
| WO | WO2008130799 | 3/2008 |
| WO | WO2008/070173 | 6/2008 |
| WO | WO 2008/073421 | 6/2008 |
| WO | WO2011106394 | 9/2011 |

OTHER PUBLICATIONS

Van Hensbergen, IBM Research Report, "Dynamic Policy Disk Caching for Storage Networking," IBM Research Division, Computer Science, RC24123 (W0611-189), Nov. 28, 2006.
Huffman, "Non-Volatile Memory Host Controller Interface," Apr. 14, 2008, 65 pgs.
Information Technology, "SCSI Object-Based Storage Device Commands," 2 (OSD-2), Project T10/1729-D, Revision 4, published Jul. 30, 2004, printed Jul. 24, 2008.
Intel, "Non-Volatile Memory Host Controller Interface (NVMHCI) 1.0," Apr. 14, 2008.
Johnson, "An Introduction to Block Device Drivers," Jan. 1, 1995.
Micron, "TN-29-17: NAND Flash Design and Use Considerations," Mar. 10, 2010.
Probert, "Windows Kernel Internals Cache Manager," Microsoft Corporation, http://www.i.u.-tokyo.co.jp/edu/training/ss/lecture/new-documents/Lectures/15—CacheManager/CacheManager.pdf, printed May 15, 2010.
Ranaweera, 05-270RO, Sat: Write Same (10) command (41h), T10/05, Jul. 7, 2005, www.t10.org/ftp/t10/document.05/05-270r0.pdf, last visited Apr. 11, 2013.
Shimpi, Anand, The SSD Anthology: Understanding SSDs and New Drives from OCZ, Mar. 18, 2009, 69 pgs.
Shu, "Data Set Management Commands Proposals for ATA8-ACS2," Dec. 12, 2007, http://www.t13.org.Documents/UploadedDocuments/docs2008/e07154r6-Data_Set_Management_Proposal_for_ATA-ACS2.pdf, printed Apr. 5, 2010.
USPTO, Notice of Allowance for U.S. Appl. No. 12/986,117, Mailed Apr. 4, 2013.
USPTO, Notice of Allowance for U.S. Appl. No. 12/986,117 Mailed Jun. 5, 2013.
USPTO, Office Action for U.S. Appl. No. 13/607,486 mailed Jan. 10, 2013.
USPTO, Office Action for U.S. Appl. No. 12/711,113, mailed Jun. 6, 2012.
USPTO, Office Action for U.S. Appl. No. 12/711,113, mailed Nov. 23, 2012.
USPTO, Office Action for U.S. Appl. No. 13,607,486 mailed Jan. 10, 2013.
USPTO, Office Action for U.S. Appl. No. 13/118,237 mailed Apr. 22, 2013.
Walp, "System Integrated Flash Storage," Microsoft Corporation, 2008, http://download.microsoft.com/download/5/E/6/5E66B27B-988B-4F50-AF3A-C2FF1E62180F/COR-T559-WHO8.pptx, Printed Apr. 6, 2010, 8 pgs.
WIPO, International Preliminary Report on Patentability for PCT/US2010/048325, mailed Mar. 13, 2012.
WIPO, International Search Report and Written Opinion for PCT/US2010/048325, mailed Jun. 1, 2011.
Hynix Semiconductor, Intel Corporation, Micron Technology, Inc. Phison Electronics Corp., Sony Corporation, Spansion, STMicroelectronics, "Open NAND Flash Interface Specification," Revision 2.1, Jan. 14, 2009.
USPTO, Office Action for U.S. Appl. No. 12/879,004 mailed Feb. 25, 2013.
Wacha, "Improving RAID-Based Storage Systems with Flash Memory," First Annual ISSDM/SRL Research Symposium, Oct. 20-21, 2009.
Zhang et al., "De-indirection for Flash-Based SSDs with Nameless Writes," UseniX InFast 2012 (Feb. 14, 2012).
State Intellectual Property Office, Office Action, CN Application No. 200780050983.8, issued May 18, 2011.
State Intellectual Property Office, Office Action, CN Application No. 200780050970.0, issued Oct. 28, 2010.
State Intellectual Property Office, Office Action, CN Application No. 200780050970.0, issued Jun. 29, 2011.
State Intellectual Property Office, Office Action, CN Application No. 200780050970.0, issued Jan. 5, 2012.
State Intellectual Property Office, Office Action, CN Application No. 200780051020.X, issued Nov. 11, 2010.
State Intellectual Property Office, Office Action, CN Application No. 200780051020.X, issued Jul. 6, 2011.
State Intellectual Property Office, Office Action, CN Application No. 200780051020.X, issued Nov. 7, 2011.
European Patent Office, Office Action, EP Application No. 07865345.8, issued Nov. 17, 2010.
United States Patent Office, Final Office Action, U.S. Appl. No. 11/952,109, mailed Nov. 29, 2011.
United States Patent Office, Office Action, U.S. Appl. No. 11/952,113, mailed Mar. 6, 2012.
United States Patent Office, Office Action, U.S. Appl. No. 11/952,113, mailed Dec. 15, 2010.
United States Patent Office, Office Action, U.S. Appl. No. 11/952,109, issued May 1, 2012.
Ari, "Performance Boosting and Workload Isolation in Storage Area Networks with SanCache," Hewlett Packard Laboratories, Proceedings of the 23rd IEEE / 14th NASA Goddard Conference on Mass Storage Systems and Technologies (MSST 2006), May 2006, pp. 263-27.
Gutmann, "Secure Deletion of Data from Magnetic and Solid-State Memory", Usenix, 14 pages, San Jose, CA, published Jul. 1, 1996.
Brandon, Jr., "Sparse Matrices in CS Education," Journal of Computing Sciences in Colleges, vol. 24 Issue 5, May 2009, pp. 93-98.
Kawaguchi, "A Flash-Memory Based File System," TCON'95 Proceedings of the USENIX 1995 Technical Conference Proceedings, p. 13.
Gal, "A Transactional Flash File System for Microcontrollers," 2005 USENIX Annual Technical Conference, published Apr. 10, 2009.

(56) References Cited

OTHER PUBLICATIONS

Plank, "A Tutorial on Reed-Solomon Coding for Fault Tolerance in RAID-like System," Department of Computer Science, University of Tennessee, pp. 995-1012, Sep. 1997.
Actel, "Actel Fusion FPGAs Supporting Intelligent Peripheral Management Interface (IPMI) Applications," http://www.actel.com/documents/Fusion_IPMI_AN.pdf, Oct. 1, 2006, visited Mar. 11, 2010.
Asine, "ASPMC-660 Rugged IDE Flash Drive PMC Module", http://www.asinegroup.com/products/aspmc660.html, copyright 2002, visited Nov. 18, 2009.
BiTMICRO, "BiTMICRO Introduces E-Disk PMC Flash Disk Module at Military & Aerospace Electronics East 2004," http://www.bitmicro.com/press.sub, published May 18, 2004, visited Mar. 8, 2011.
Spansion, "Data Management Software (DMS) for AMD Simultaneous Read/Write Flash Memory Devices", published Jul. 7, 2003.
Van Hensbergen, "Dynamic Policy Disk Caching for Storage Networking," IBM Research Division, RC24123 (WO611-189), Nov. 2006.
Spillane, "Enabling Transactional File Access via Lightweight Kernel Extensions", Stony Brook University, IBM T. J. Watson Research Center, published Feb. 25, 2009.
Wu, "eNVy: A Non-Volatile, Main Memory Storage System," ACM 0-89791-660-3/94/0010, ASPLOS-VI Proceedings of the sixth international conference on Architectural support for programming languages and operating systems, pp. 86-97, 1994.
Wright, "Extending ACID Semantics to the File System", ACM Transactions on Storage, vol. 3, No. 2, published May 1, 2011, pp. 1-40.
Seltzer, "File System Performance and Transaction Support", University of California at Berkeley, published Jan. 1, 1992.
Novell, "File System Primer", http://wiki.novell.com/index.php/File_System_Primer, 2006, visited Oct. 18, 2006.
Dan, "Implementing MLC NAND Flash for Cost-Effective, High-Capacity Memory," M-Systems, White Paper, 91-SR-014-02-8L, Rev 1.1, Sep. 2003.
Samsung Electronics, "Introduction to Samsung's Linux Flash File System—RFS Application Note", Version 1.0, Nov. 2006.
Morgenstern, David, "Is There a Flash Memory Raid in your Future?", http://www.eweek.com—eWeek, Ziff Davis Enterprise Holdings Inc., Nov. 8, 2006, visited Mar. 18, 2010.
Anonymous, "Method for Fault Tolerance in Nonvolatile Storage", http://ip.com, IP.com number: IPCOM000042269D, 2005.
Volos, "Mnemosyne: Lightweight Persistent Memory", ACM 978-1-4503-0266-Jan. 11, 2003, published Mar. 5, 2011.
Micron Technology, Inc., "NAND Flash 101: An Introduction to NAND Flash and How to Design It in to Your Next Product (TN-29-19)," http://www.micron.com/~/media/Documents/Products/Technical%20Note/NAND%20Flash/145tn2919_nand _101.pdf, 2006, visited May 10, 2010.
Elnec, "NAND Flash Memories and Programming NAND Flash Memories Using ELNEC Device Programmers, Application Note," published Mar. 1, 2007.
Tal, "NAND vs. NOR Flash Technology," M-Systems, www2.electronicproducts.com/PrintArticle.aspx?ArticleURL=FEBMSY1.feb2002.html, visited Nov. 22, 2010.
Coburn, "NV-Heaps: Making Persistent Objects Fast and Safe with Next-Generation, Non-Volatile Memories", ACM 978-1-4503-0266-1/11/0, published Mar. 5, 2011.
Mesnier, "Object-Based Storage," IEEE Communications Magazine, Aug. 2003, pp. 84-90.
Garfinkel, "One Big File Is Not Enough: A Critical Evaluation of the Dominant Free-Space Sanitization Technique," 6th Workshop on Privacy Enhancing Technologies. Cambridge, United Kingdom, published Jun. 1, 2006.
Porter, "Operating System Transactions," ACM 978-1-60558-752-Mar. 9, 2010, published Oct. 1, 2009.
Sears, "Stasis: Flexible Transactional Storage," OSDI '06: 7th USENIX Symposium on Operating Systems Design and Implementation, published Nov. 6, 2006.
Rosenblum, "The Design and Implementation of a Log-Structured File System," ACM Transactions on Computer Systems, vol. 10 Issue 1, Feb. 1992.
Seltzer, "Transaction Support in a Log-Structured File System", Harvard University Division of Applied Sciences, published Jan. 1, 1993 (Chapter 5, pp. 52-69).
Seltzer, "Transaction Support in Read Optimized and Write Optimized File Systems," Proceedings of the 16th VLDB Conference, Brisbane, Australia, published Jan. 1, 1990.
Barrall et al., U.S. Appl. No. 60/625,495, "Dynamically Expandable and Contractible Fault-Tolerant Storage System Permitting Variously Sized Storage Devices and Method," filed Nov. 5, 2004.
Barrall et al., U.S. Appl. No. 60/718,768, "Dynamically Adaptable Fault-Tolerant Storage System," filed Sep. 20, 2005.
Terry et al., U.S. Appl. No. 60/797,127, "Filesystem-aware Block Storage System, Apparatus, and Method," filed May 3, 2006.
United States Patent Office, U.S. Appl. No. 60/912,728, published as U.S. Application Publication No. 20080263305 on Oct. 23, 2008.
WIPO, International Search Report and Written Opinion for PCT/US2007/025048, mailed May 27, 2008.
WIPO, International Preliminary Report on Patentability for PCT/US2007/025048, mailed Jun. 10, 2009.
WIPO, International Preliminary Report on Patentability for PCT/US2007/059048, mailed Oct. 20, 2009.
WIPO, International Search Report and Written Opinion for PCT/US2007/059048, mailed Aug. 25, 2008.
WIPO, International Preliminary Report on Patentability for PCT/US2007/086687, mailed Mar. 18, 2009.
WIPO, International Search Report and Written Opinion for PCT/US2007/086687, mailed Sep. 5, 2008.
WIPO, International Preliminary Report on Patentability for PCT/US2007/086688, mailed Mar. 16, 2009.
WIPO, International Search Report and Written Opinion for PCT/US2007/086691, mailed May 8, 2008.
WIPO, International Preliminary Report on Patentability for PCT/US2007/086691, mailed Feb. 16, 2009.
WIPO, International Search Report and Written Opinion for PCT/US2007/086701, mailed Jun. 5, 2008.
WIPO, International Preliminary Report on Patentability for PCT/US2007/086701, Mar. 16, 2009.
Macko et al., "Tracking Back References in a Write-Anywhere File System" Proceedings of the 8th USENIX Conference on File and Storage Technologies, (2010) 3 pages.
Arpaci-Dusseau, "Removing the Costs of Indirection in Flash-Based SSDs with Nameless Writes," Jun. 2010, HotStorage 10, Boston, MA.
WIPO, International Search Report and Written Opinion for PCT/US11/65927, mailed Aug. 28, 2012.
United States Patent Office, Non-Final Office Action, U.S. Appl. No. 13/107,820, mailed Feb. 22, 2013.
United States Patent Office, Pre-Interview Communication, U.S. Appl. No. 13/193,559, mailed Jul. 8, 2014.
United States Patent Office, Final Office Action, U.S. Appl. No. 13/193,559, mailed Dec. 6, 2014.
United States Patent Office, Non-Final Office Action, U.S. Appl. No. 13/335,922, mailed Aug. 29, 2013.
United States Patent Office, Non-Final Office Action, U.S. Appl. No. 13/539,235, mailed Feb. 13, 2015.
IEEE Dictionary. "Atomic transaction". 7th ed. Published in 2000. Last updated Feb. 27, 2007.
Randal, PaulS. "Understanding Logging and Recovery in SOL Server". Published Feb. 2009. <http://tech net.microsoft.com/en-us/magazine/2009. 02.1ogging.aspx>.

(56) References Cited

OTHER PUBLICATIONS

Russinovich, Mark E. "Windows Internals, Fifth Edition". Chapters 11-12: "Common Log File System", "NTFS Design Goals and Features". Published Jun. 17, 2009.
Weissel, Andreas. "Revisiting Log-Structured File Systems for Low-Power Portable Storage". Published Mar. 2005. <https://www4.cs.fau.de/-weissei/Publications/Papers/IWSSPS05.pdf>.
Wikipedia, "Journaling File System". Published on Jul. 4, 2009. URL: https://en.wikipedia.org/wiki/Journaling_file_system.
Wikipedia. "Transaction log". Published on Jul. 4, 2009. URL: https://en.wikipedia.org/wiki/Transaction_log.
Adaptec, "Understanding Read and Write Caching," <http://ask.adaptec.com/app/answers/detail/a_id/2046/~/understanding-read-and-write-caching>, 2 pgs. Published Mar. 12, 2001.
Non-Final Office Action for U.S. Appl. No. 13/837,628, filed Mar. 15, 2013, and mailed from the USPTO on Oct. 19, 2015, 47 pgs.
Final Office Action for U.S. Appl. No. 13/539,235, filed Jun. 29, 2012, and mailed from the USPTO Nov. 9, 2015, 20 pgs.

\* cited by examiner

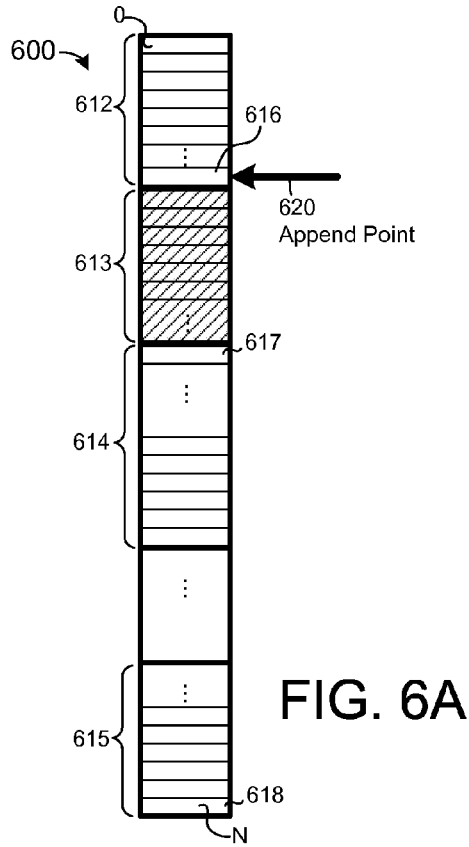
FIG. 6A
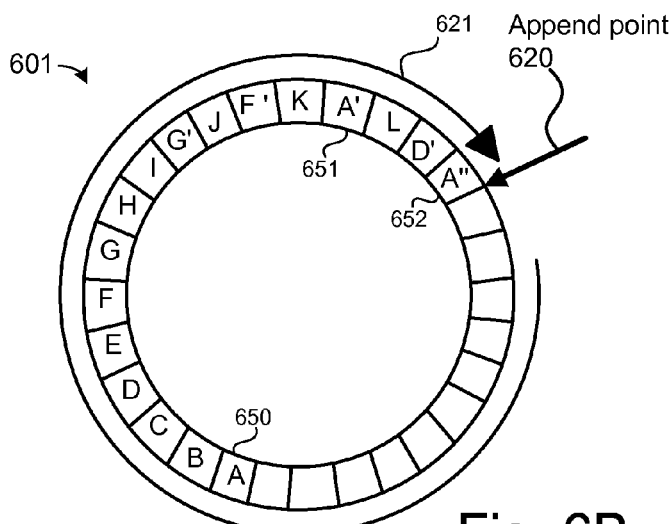
Fig. 6B
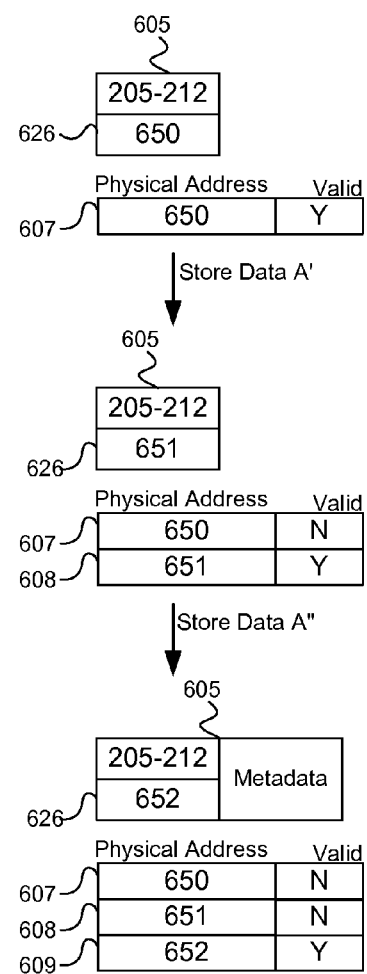

SYSTEMS, METHODS, AND INTERFACES FOR VECTOR INPUT/OUTPUT OPERATIONS

CROSS-REFERENCE TO RELATED APPLICATIONS

The application claims priority to U.S. Provisional Patent Application Ser. No. 61/625,475, filed Apr. 17, 2012, and entitled, "Composite Vectored Storage Operations," U.S. Provisional Patent Application Ser. No. 61/637,155, filed Apr. 23, 2012, and entitled "Systems, Methods and Interfaces for Composite, Vectored Atomic Storage Operations," U.S. patent application Ser. No. 13/539,235, entitled "Systems, Methods, and Interfaces for Managing Persistent Data of Atomic Storage Operations," filed Jun. 29, 2012, and to U.S. patent application Ser. No. 13/335,922, entitled, "Methods and Apparatuses for Atomic Storage Operations," filed Dec. 22, 2011, which claims priority to U.S. Provisional Patent Application Ser. No. 61/579,627, filed Dec. 22, 2011, and entitled, "Methods and Apparatuses for Atomic Storage Operations," each of which is hereby incorporated by reference.

TECHNICAL FIELD

The disclosure relates to input/output (IO) operations and, more particularly, to IO operations configured to operate on one or more IO vectors.

BRIEF DESCRIPTION OF THE DRAWINGS

This disclosure includes and references the accompanying drawings. In the drawings, similar symbols typically identify similar components, unless context dictates otherwise. The illustrative embodiments described in the detailed description, drawings, and claims are not meant to be limiting. Other embodiments may be utilized, and other changes may be made to these exemplary embodiments, without departing from the scope of the disclosure.

FIGS. 6A-B depict embodiments of storage metadata for log storage;

DETAILED DESCRIPTION

Figure 1:
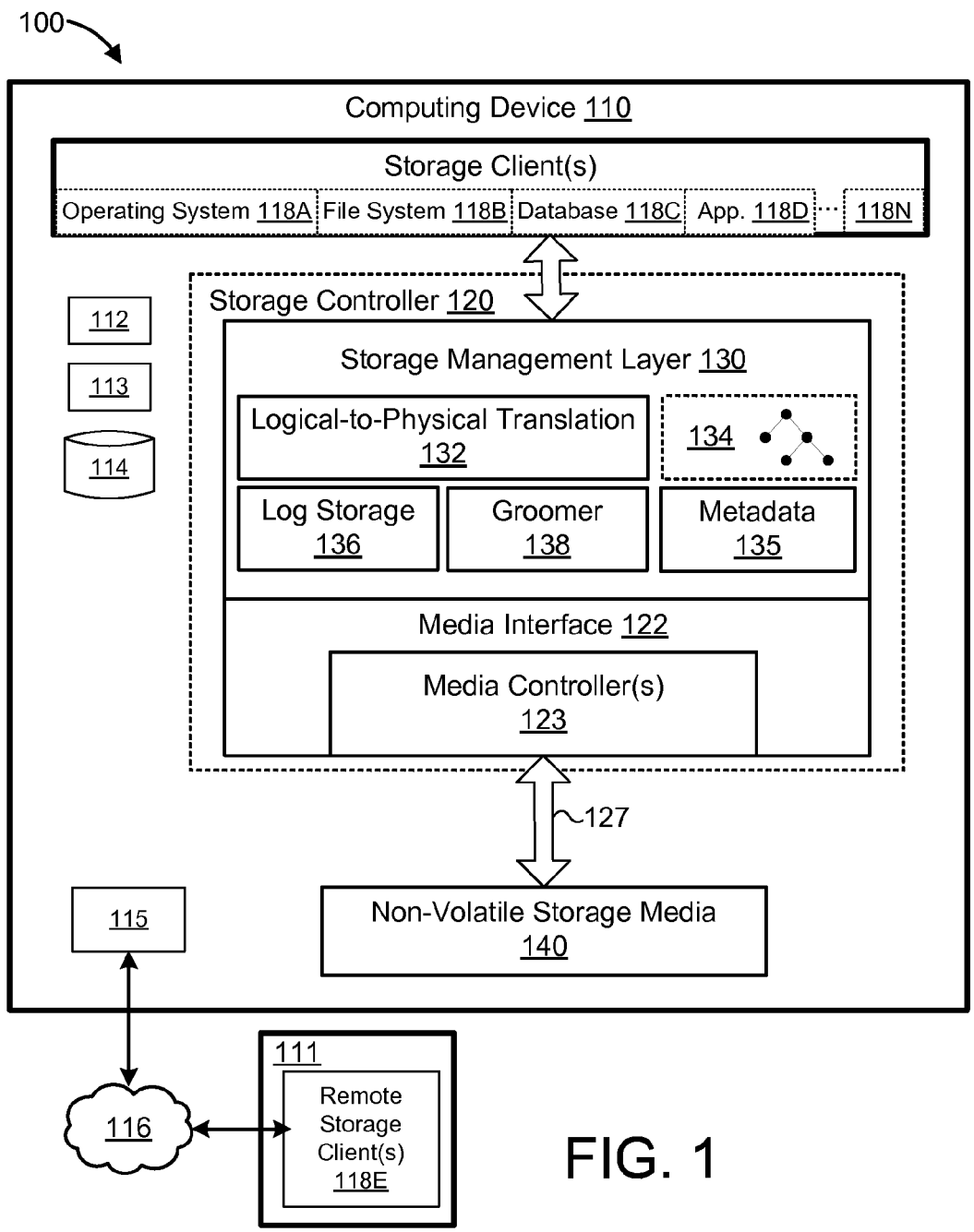
FIG. 1 is a block diagram of a storage system comprising a storage controller.

A storage controller may be configured to perform input/output (IO) operations in response to requests from one or more storage clients. The storage controller may be configured to implement vector storage operations on respective logical identifier ranges. The vector storage operations may be atomic, such that the storage operation completes for each I/O vector, or none of the I/O vectors.

Disclosed herein are systems and apparatuses configured to service vector storage requests, which may include a request consolidation module configured to modify one or more storage requests of a vector storage request, wherein the storage requests corresponds to respective logical identifier ranges of the vector storage request in response to one or more other pending storage requests, and a storage controller configured to store one or more data packets pertaining to the vector storage request on the non-volatile storage medium.

The request consolidation module may be configured to combine two or more storage requests including a storage request of the vector storage request. The two or more storage requests pertain to logical identifiers that are adjacent and/or overlap. The two or more storage requests may comprise trim storage requests that pertain to overlapping and/or adjacent logical identifier ranges in a logical address space. The request consolidation module may be further configured to remove one or more of the storage requests of the vector storage request in response to determining that the one or more storage requests are obviated by one or more pending storage requests. The request consolidation module may be configured to remove a storage request to trim one or more logical identifiers in response to a pending storage request to write data to the one or more logical identifiers.

The apparatus may further comprise a log storage module configured to append the one or more data packets pertaining to an atomic vector storage request contiguously within a log on the non-volatile storage medium, and an atomic storage module configured to include a persistent indicator in one or more the data packets of the atomic vector storage request to indicate that the one or more data packets pertain to an atomic storage operation that is incomplete. The atomic storage module may be configured to include a persistent indicator in a last one of the data packets of the atomic vector storage request to indicate that the atomic storage request is complete.

Disclosed herein are systems and apparatus configured to service atomic vector storage requests, which may comprise a non-volatile storage medium, a log storage module configured to append one or more data packets pertaining to an atomic vector storage request in a contiguous log format on the non-volatile storage medium, and an atomic storage module configured to include respective persistent metadata flags in one or more of the data packets of the atomic storage request within the log on the non-volatile storage medium to indicate that that the one or more data packets correspond to an atomic storage request that is in process. The atomic storage module may be configured to include a persistent metadata flag in one of the data packets of the atomic vector storage request to indicate that the atomic storage request is complete. The persistent metadata flags may comprise single bits. The log storage module may be configured to append the one or more data packets to non-contiguous physical storage locations within a physical address space of the non-volatile storage medium. The log storage module may be configured to append data packets sequentially from an append point within a physical address space of the non-volatile storage medium and to associate the data packets with respective sequence indicators, and wherein the sequential order and the sequence indicators of the data packets determine a log order of the data packets.

The atomic vector storage request may comprise a plurality of sub-requests, each sub-request comprising an operation pertaining to a respective set of one or more logical identifiers, and wherein the storage controller is configured to defer updating a forward index comprising any-to-any mappings between logical identifiers and physical storage locations until each of the sub-requests of the atomic vector storage operation are complete.

The atomic vector storage request comprises a plurality of sub-requests, each sub-request comprising an operation pertaining to a respective set of one or more logical identifiers, wherein two or more of the sub-requests comprise different types of storage operations.

A restart recovery module may be configured to reconstruct a forward index comprising mappings between logical identifiers of a logical address space and physical storage locations of the non-volatile storage medium, wherein the restart recovery module is configured to identify a data packet of an incomplete atomic vector storage request in response to accessing a data packet that comprises a persistent metadata flag indicating that the data packet corresponds to an atomic vector storage request that is in process at an append point.

The storage controller may be configured to update an inflight index in response to completing a subcommand of the atomic vector storage operation, and to update the forward index with the inflight index in response to completing each of the subcommands of the atomic vector storage operation.

Subcommands of the atomic vector storage request may be queued in an ordered queue configured to complete the subcommands and the other storage requests according to an order in which the subcommands and the other storage requests were received at the ordered queue.

A request consolidation module may be configured to modify one of the subcommands based on one or more of the other plurality of subcommands of the atomic vector storage request. The request consolidation module may delete a subcommand in response to determining that the subcommand is overridden by one or more other subcommands of the atomic vector storage request and/or combine one or more subcommands into a single composite subcommand.

Disclosed herein are systems and apparatus for consolidating storage requests, comprising a request buffer configured to buffer and/or queue one or more storage requests, a request consolidation module configured to modify one or more of the storage requests in the request buffer based on one or more other storage requests in the request buffer, and a storage controller configured to service storage requests in the request buffer. The request consolidation module may be configured to delete a storage request to trim one or more logical identifiers from the request buffer in response to receiving a storage request configured to store data to the one or more logical identifiers at the storage controller. The request consolidation module may be further configured to consolidate two or more storage requests to trim logical identifiers that overlap and/or are contiguous in a logical address.

FIG. 1 is a block diagram illustrating one embodiment of a storage system 100. The system 100 may comprise a computing device 110, which may comprise a personal computer, server, blade, laptop, notebook, smart phone, embedded system, virtualized computing device, or the like. The computing device 110 may comprise a processor 112, volatile memory 113, non-transitory storage medium 114, and/or communication interface 115. The processor 112 may comprise one or more general and/or special purpose processing elements and/or cores. The processor 112 may be configured to execute instructions loaded from the non-transitory storage medium 114. Portions of the modules and/or methods disclosed herein may be embodied as machine-readable instructions stored on the non-transitory storage medium 114.

The system 100 may further comprise a storage controller 120. The storage controller 120 may comprise a storage management layer 130, logical-to-physical translation module 132, storage metadata 135, log storage module 136, media interface 122, and/or one or more media controllers 123. Portions of the storage controller 120 may operate on, or in conjunction with, the computing device 110. Portions of the storage controller 120 may be implemented separately from the computing device; for example, portions of the storage controller 120 may be connected using a system bus, such as a peripheral component interconnect express (PCI-e) bus, a Serial Advanced Technology Attachment (serial ATA) bus, universal serial bus (USB) connection, an Institute of Electrical and Electronics Engineers (IEEE) 1394 bus (FireWire), an external PCI bus, Infiniband, or the like.

The storage controller 120 may comprise a media interface 122 configured to couple to the storage controller 120 to a non-volatile storage media 140 (by use of one or more media controllers 123 and bus 127). The non-volatile storage media 140 may comprise any suitable storage medium including, but not limited to, flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), Resistive Random-Access Memory (RRAM), Programmable Metallization Cell (PMC), Conductive-Bridging RAM (CBRAM), Magneto-Resistive RAM (MRAM), Dynamic RAM (DRAM), Phase change RAM (PRAM), magnetic media (e.g., one or more hard disks), optical media, or the like.

The media controller(s) 123 may be configured to write data to and/or read data from the non-volatile storage media 140 via a bus 127. The bus 127 may comprise a storage I/O bus for communicating data to and from the non-volatile storage media 140, and may further comprise a control I/O bus for communicating addressing and other command and control information to the non-volatile storage media 140.

The storage controller 120 may be configured to service storage requests for one or more storage clients 118A-N. The storage clients 118A-N may include, but are not limited to, operating systems 118A, file systems 118B, databases 118C, user applications 118D, and so on. The storage clients 118A-N may operate locally on the computing device and/or may operate on other, remote computing devices 111 (e.g., remote storage client(s) 118E).

The storage clients 118A-N may access services provided by the storage controller 120 via the storage management layer 130. The storage management layer 130 may comprise one or more drivers, libraries, modules, interfaces, block device interfaces, interface extensions (e.g., input/output control IOCTL interfaces), Application Programming Interfaces (API), application binary interfaces (ABI), object classes, remote interfaces (e.g., Remote Procedure Call, Simple Object Access Protocol, or the like), and so on.

The storage management layer 130 may be configured to present and/or expose a logical address space 134 to the storage clients 118A-N. As used herein, a logical address space refers to a logical representation of I/O resources, such as storage resources. The logical address space 134 may comprise a plurality (e.g., range) of logical identifiers. As used herein, a logical identifier refers to any identifier for referencing an I/O resource (e.g., data stored on the non-volatile storage media 140), including, but not limited to, a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

The storage management layer 130 may comprise a logical-to-physical translation layer configured to map and/or associate logical identifiers in the logical address space 134 (and referenced by the storage clients 118A-N) with physical storage locations (e.g., physical addresses) on the non-volatile storage media 140. The mappings may be "any-to-any," such that any logical identifier can be associated with any physical storage location (and vice versa). As used herein, a physical address refers to an address (or other reference) of one or more physical storage location(s) on the non-volatile storage media 140. Accordingly, a physical address may be a "media address." As used herein, physical storage locations include, but are not limited to, sectors, pages, logical pages, storage divisions (e.g., erase blocks, logical erase blocks, and so on), or the like.

In some embodiments, the logical address space 134 maintained by the storage management layer 130 may be thinly provisioned or "sparse." As used herein, a thinly provisioned or sparse logical address space refers to a logical address space having a logical capacity that is independent of physical address space of the non-volatile storage media 140. For example, the storage management layer 130 may present a very large logical address space 134 (e.g., 2^64 bits) to the storage clients 118A-N, which exceeds the physical address space of the non-volatile storage media 140.

The storage management layer 130 may be configured to maintain storage metadata 135 pertaining to the non-volatile storage media 140 including, but not limited to, a forward index comprising any-to-any mappings between logical identifiers of the logical address space 134 and storage resources, a reverse index pertaining to the non-volatile storage media 140, one or more validity bitmaps, atomicity and/or translational metadata, and so on. Portions of the storage metadata 135 may be stored on the volatile memory 113 and/or may be periodically stored on a persistent storage medium, such as the non-transitory storage medium 114 and/or non-volatile storage media 140.

In some embodiments, the storage controller 120 may leverage the arbitrary, any-to-any mappings of the logical-to-physical translation module to store data in a log format, such that data is updated and/or modified "out-of-place" on the non-volatile storage media 140. As used herein, writing data "out-of-place" refers to writing data to different media storage location(s) rather than overwriting the data "in-place" (e.g., overwriting the original physical location of the data). Storing data in a log format may result in obsolete and/or invalid data remaining on the non-volatile storage media 140. For example, overwriting data of logical identifier "A" out-of-place may result in writing data to new physical storage location(s) and updating the storage metadata 135 to associate A with the new physical storage locations(s) (e.g., in a forward index, described below). The original physical storage location(s) associated with A are not overwritten, and comprise invalid, out-of-date data. Similarly, when data of a logical identifier "X" is deleted or trimmed, the physical storage locations(s) assigned to X may not be immediately erased, but may remain on the non-volatile storage media 140 as invalid data.

The storage controller 120 may comprise a groomer module 138 configured to "groom" the non-volatile storage media 140, which may comprise reclaiming physical storage location(s) comprising invalid, obsolete, or "trimmed," data, as described above. As used herein, "grooming" the non-volatile storage media 140 may include, but is not limited to, wear leveling, removing invalid and/or obsolete data from the non-volatile storage media 140, removing deleted (e.g., trimmed) data from the non-volatile storage media 140, refreshing and/or relocating valid data stored on the non-volatile storage media 140, reclaiming physical storage locations (e.g., erase blocks), identifying physical storage locations for reclamation, and so on. The groomer module 138 may be configured to operate autonomously, and in the background, from servicing other storage requests. Accordingly, grooming operations may be deferred while other storage requests are being processed. Alternatively, the groomer module 162 may operate in the foreground while other storage operations are being serviced. Reclaiming a physical storage location may comprise erasing invalid data from the physical storage location so that the physical storage location can be reused to store valid data. For example, reclaiming a storage division (e.g., an erase block or logical erase block) may comprise relocating valid data from the storage division, erasing the storage division, and initializing the storage division for storage operations (e.g., marking the storage division with a sequence indicator). The groomer 162 may wear-level the non-volatile storage media 140, such that data is systematically spread throughout different physical storage locations, which may improve performance, data reliability, and avoid overuse and/or underuse of particular physical storage locations. Embodiments of systems and methods for grooming non-volatile storage media are disclosed in U.S. Pat. No. 8,074,011, issued Dec. 6, 2011, and entitled, "Apparatus, System, and Method for Storage Space Recovery After Reaching a Read Count Limit," which is hereby incorporated by reference.

In some embodiments, the storage controller 120 may be configured to manage asymmetric, write-once non-volatile storage media 140, such as solid-state storage media. As used herein, a "write once" refers to storage media that is reinitialized (e.g., erased) each time new data is written or programmed thereon. As used herein, "asymmetric" refers to storage media having different latencies and/or execution times for different types of storage operations. For example, read operations on asymmetric solid-state non-volatile storage media 140 may be much faster than write/program operations, and write/program operations may be much faster than erase operations. The solid-state non-volatile storage media 140 may be partitioned into storage divisions that can be erased as a group (e.g., erase blocks) in order to, inter alia, account for these asymmetric properties. As such, modifying a single data segment "in-place" may require erasing an entire erase block, and rewriting the modified data on the erase block, along with the original, unchanged data (if any). This may result in inefficient "write amplification," which may cause excessive wear. Writing data out-of-place as described above may avoid these issues, since the storage controller 120 can defer erasure of the obsolete data (e.g., the physical storage location(s) comprising the obsolete data may be reclaimed in background grooming operations).

Figure 4:
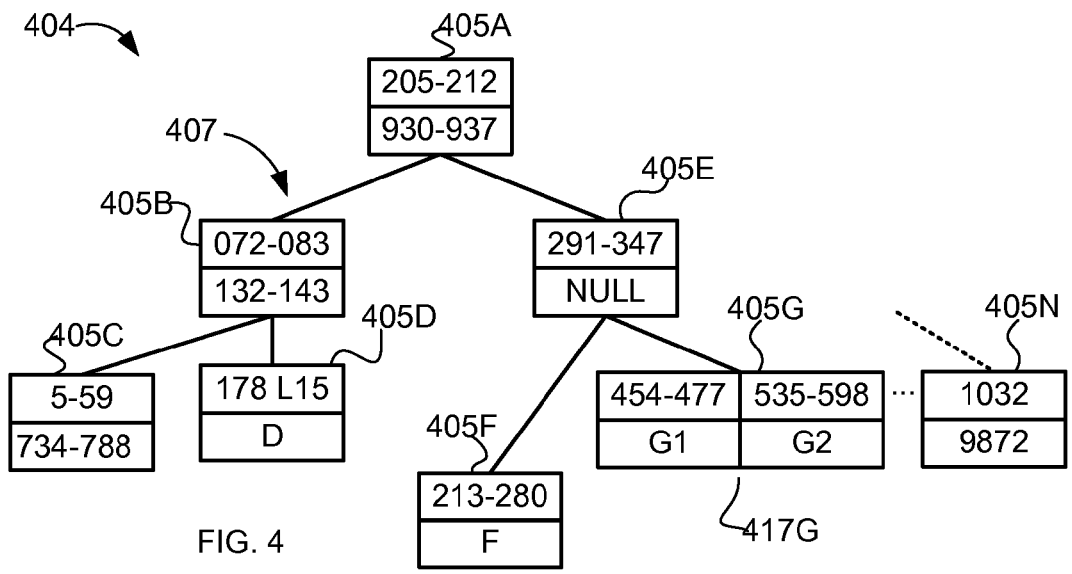
FIG. 4 depicts one embodiment of a forward index.

FIG. 4 depicts one embodiment of a forward index 404 configured to maintain arbitrary, any-to-any mappings between logical identifiers and physical storage locations on a non-volatile storage media 140. In the FIG. 4 example, the forward index 404 is implemented as a range-encoded B-tree. The disclosure is not limited in this regard, however, the forward index 404 may be implemented using any suitable data structure including, but not limited to, a tree, a B-tree, a range-encoded B-tree, a radix tree, a map, a content addressable map (CAM), a table, a hash table, or other suitable data structure (or combination of data structures).

The forward index 404 comprises a plurality of entries 405A-N, each representing one or more logical identifiers in the logical address space 134: entry 405A references logical identifiers 205-212; entry 405B references logical identifiers 72-83; entry 405C references logical identifiers 5-59; and so on. The logical-to-physical translation module 132 may enable independence between logical identifiers and physical storage locations, such that data may be stored sequentially, in a log-based format and/or updated "out-of-place" on the non-volatile storage media 140. As such, there may be no correspondence between logical identifiers and the physical storage locations.

The entries 405A-N may comprise assignments between logical identifiers and physical storage locations on the non-volatile storage media 140. Accordingly, one or more of the entries 405A-N may reference respective physical storage locations; for example, entry 405A assigns logical identifiers 205-212 to physical addresses 930-937; entry 405B assigns logical identifiers 072-083 to physical addresses 132-143; and so on. In some embodiments, references to the physical storage locations may be indirect, as depicted in entries 405D, 405F, and 405G.

The physical address(es) of the entries 405A-N may be updated in response to changes to the physical storage location(s) associated with the corresponding logical identifiers due to, inter alia, grooming, data refresh, modification, overwrite, or the like. In some embodiments, one or more of the entries 405A-N may represent logical identifiers that have been allocated to a storage client 118A-N, but have not been assigned to any particular physical storage locations (e.g., the storage client has not caused data to be written to the logical identifiers, as depicted in entry 405E).

The entries 405A-N may be indexed to provide for fast and efficient lookup by logical identifier. For clarity, the FIG. 4 example depicts entries 405A-N comprising numeric logical identifiers. However, the disclosure is not limited in this regard and the entries 405A-N could be adapted to include suitable logical identifier representation, including, but not limited to, alpha-numerical characters, hexadecimal characters, binary values, text identifiers, hash codes, or the like.

The entries 405A-N of the index 404 may reference ranges or vectors of logical identifiers of variable size and/or length; a single entry 405A may reference a plurality of logical identifiers (e.g., a set of logical identifiers, a logical identifier range, a disjoint, non-adjacent, and/or non-contiguous set of logical identifiers, or the like). For example, the entry 405B represents a contiguous range of logical identifiers 072-083. Other entries of the index 404 may represent a non-contiguous sets or vectors of logical identifiers; entry 405G represents a non-contiguous, disjoint logical identifier range 454-477 and 535-598, each range being assigned to respective physical storage locations by respective references G1 and G2. The forward index 404 may represent logical identifiers using any suitable technique; for example, the entry 405D references a logical identifier range by starting point and length (logical identifier 178 and length 15), which corresponds to a range of logical identifiers 178-192.

The index 404 may be used to efficiently determine whether particular logical identifiers are assigned to physical storage location(s) and/or are allocated to one or more storage clients 118A-N. The storage controller 120 may determine that logical identifiers that are not included in the index 404 are available to be allocated to a storage client 118A-N. Similarly, the storage controller 120 may determine that physical storage locations that are not associated with a logical identifier in the index 404 do not comprise valid data, and can be reclaimed. For example, modifying data of the logical identifiers 5-59 may result in associating the entry 405C with a new set of physical storage location(s) (e.g., the storage locations comprising the data as modified "out-of-place" on the non-volatile storage media 140). As a result, the old physical addresses 734-788 are no longer associated with an entry 405A-N in the index 405, and may be identified as "invalid" and ready for reclamation.

Figure 5:
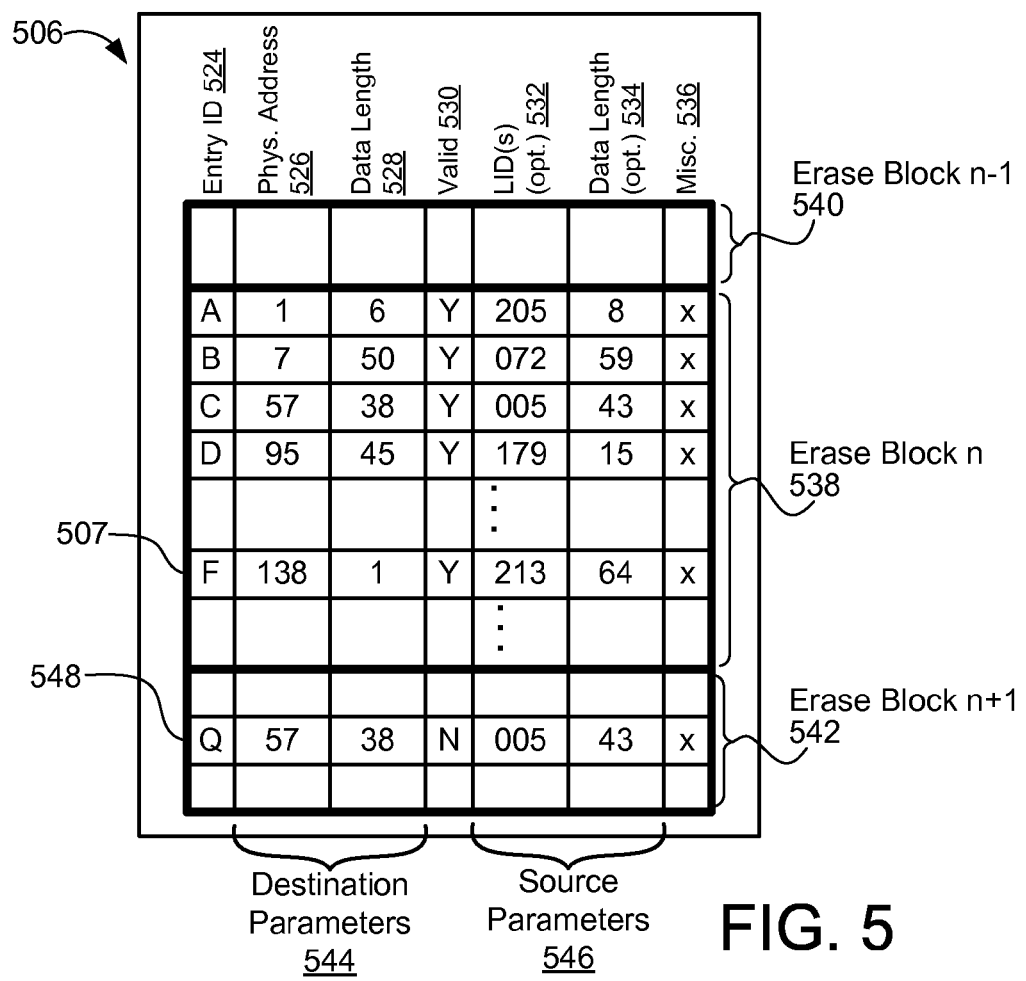
FIG. 5 depicts one embodiment of a reverse index.

FIG. 5 depicts one example of a reverse index 506 for maintaining metadata pertaining to physical storage locations of a non-volatile storage media 140. In the FIG. 5 example, the reverse index 506 is implemented as a table data structure. The disclosure is not limited in this regard, however, and could be adapted to implement the reverse index 506 using any suitable datastructure. For example, in some embodiments, the reverse index 506 is implemented using a tree datastructure similar to the forward index 404, described above.

The reverse index 506 comprises a plurality of entries 507 (depicted as rows in the table datastructure of the reverse index 506), each of which corresponds to one or more physical storage locations on the non-volatile storage media 140. Accordingly, each entry 507 may correspond to one or more physical addresses 526. In some embodiments, the entries 507 may be of variable length and/or may comprise compressed and/or encrypted data. As such, one or more of the entries 507 may comprise a data length 528. A valid tag 530 indicates whether the physical address(es) 526 of the entry 507 comprise valid or invalid data (e.g., obsolete or trimmed data).

The reverse index 506 may further comprise references and/or links to the first index, such as a logical identifier field 532, data length from the perspective of the storage clients 118A-N (e.g., uncompressed and/or decrypted data length), and the like (e.g., miscellaneous 536). In some embodiments, the reverse index 506 may include an indicator of whether the physical address 526 stores dirty or clean data, or the like.

The reverse index 522 may be organized according to the configuration and/or layout of a particular non-volatile storage media 140. In embodiments comprising solid-state non-volatile storage media 140, the reverse index 506 may be arranged by storage divisions (e.g., erase blocks), physical storage locations (e.g., pages), logical storage locations, or the like. In the FIG. 5 example, the reverse index 506 is arranged into a plurality of erase blocks (540, 538, and 542), each comprising a plurality of physical storage locations (e.g., pages, logical pages, or the like).

The entry ID 524 may comprise an address, reference, virtual link, or other data to associate entries in the reverse index 506 with entries in the forward index 404 (or other storage metadata 135). The physical address 526 indicates a physical address on the non-volatile storage media 140. Together, the physical address 526 and data length 528 may be referred to as destination parameters 544 (e.g., parameters pertaining to the physical storage location(s) of the entries 507). The logical identifier 532 and data length 534 may be referred to as source parameters 546. The logical identifier 532 associates entries 507 with respective logical identifier(s) of the logical address space 134 (e.g., in the forward index 404).

The valid tag 530 indicates whether the data of the entry 507 is valid (e.g., whether the physical storage location(s) of the entry 507 comprise valid, up-to-date data of a logical identifier). Entries marked invalid in tag 530 may comprise invalid, obsolete, and/or deleted (e.g., trimmed) data. The reverse index 506 may track the validity status of each physical storage location of the non-volatile storage device. The groomer module 138 may use the reverse index 506 to identify physical storage locations to reclaim and/or to distinguish data that needs to be retained from data that can be removed from the non-volatile storage media 140.

The reverse index 506 may also include other miscellaneous data 536, such as a file name, object name, source data, storage client, security flags, atomicity flag, transaction identifier, or the like. While physical addresses 526 are depicted in the reverse index 506, in other embodiments, physical addresses 526, or other destination parameters 544, may be included in other locations, such as in the forward index 404, an intermediate table or data structure, or the like.

The reverse index 506 may be adapted to the characteristics and/or partitioning of the non-volatile storage media 140. In the FIG. 5 example, the reverse index 506 is adapted for use with solid-state storage media 140 that is partitioned into a plurality of erase blocks. The groomer module 138 may traverse the index 506 to identify valid data in a particular erase block (or logical erase block) and to quantify an amount of valid data, or conversely invalid data, therein. The groomer may select storage divisions for recovery based, in part, on the amount of valid and/or invalid data in each erase block.

In some embodiments, the groomer module 138 is restricted to operating within certain portions of the non-volatile storage media 140. For example, portions of the storage metadata 135 may be periodically persisted on the non-volatile storage media 140 (or other persistent storage), and the groomer module 138 may be limited to operating on physical storage locations corresponding to the persisted storage metadata 135. In some embodiments, storage metadata 135 is persisted by relative age (e.g., sequence), with older portions being persisted, while more current portions are retained in volatile memory 113. Accordingly, the groomer module 138 may be restricted to operating in older portions of the physical address space and, as such, are less likely to affect data of ongoing storage operations. Therefore, in some embodiments, the groomer module may continue to operate while vector and/or atomic storage requests are being serviced. Alternatively, or in addition, groomer module 138 may access the storage metadata and/or inflight index (disclosed in further detail below) to prevent interference with atomic storage operations. Further embodiments of systems, methods, and interfaces managing a logical address pace, such as the logical address space 134, and/or storing data in a log-based format, are disclosed in U.S. patent application Ser. No. 12/986,117, filed on Jan. 6, 2011, entitled "Apparatus, System, and Method for a Virtual Storage Layer," and published as United States Patent Application Publication No. 20120011340 on Jan. 12, 2012, and U.S. patent application Ser. No. 13/424,333, filed on Mar. 19, 2012, and entitled, "Logical Interface for Contextual Storage," each of which is hereby incorporated by reference.

Referring back to FIG. 1, the storage controller 120 may be configured to leverage the arbitrary, any-to-any mappings maintained by the logical-to-physical translation module 134 to manage data on the non-volatile storage media 140 independent of the logical interface of the data (e.g., independent of the logical identifier(s) associated with the data). For example, the storage controller 120 may leverage the logical-to-physical translation layer 132 to store data on the non-volatile storage media 140 in a "log format," as described below.

The storage controller 120 may comprise a log storage module 136 configured to store data on the non-volatile storage media 140 in a log-format (e.g., an "event log"). As used herein, a log-format refers to a data storage format that defines an ordered sequence of storage operations performed on the non-volatile storage media 140. Accordingly, the log-format may define an "event log" of storage operations performed on the non-volatile storage media 140. In some embodiments, the log storage module 136 is configured to store data sequentially, from an append point, on the non-volatile storage media 140. The log storage module 136 may be further configured to associate data (and/or physical storage locations on the non-volatile storage media 140) with respective sequence indicators. The sequence indicators may be applied to individual data segments, packets, and/or physical storage locations and/or may be applied to groups of data and/or physical storage locations (e.g., erase blocks). In some embodiments, sequence indicators may be applied to physical storage locations when the storage locations are reclaimed (e.g., erased) in a grooming operation and/or when the storage locations are first used to store data.

In some embodiments, the log storage module 136 may be configured to store data according to an "append only" paradigm. The storage controller 120 may maintain a current append point within a physical address space of the non-volatile storage media 140. As used herein, an "append point" refers to a pointer or reference to a particular physical storage location (e.g., sector, page, storage division, offset, or the like). The log storage module 136 may be configured to append data sequentially from the append point. As data is stored at the append point, the append point moves to a next available physical storage location on the non-volatile storage media 140. The log-order of data stored on the non-volatile storage media 140 may, therefore, may be determined based upon the sequence indicator associated with the data and/or the sequential order of the data on the non-volatile storage media 140. The log storage module may identify the "next" available storage location by traversing the physical address space of the non-volatile storage media 140 (e.g., in a reverse index, as described below) to identify a next available physical storage location.

FIG. 6A depicts a physical address space 600 of a non-volatile storage media 140. The physical storage space 600 is arranged into storage divisions (e.g., erase blocks 612), each of which can be initialized (e.g., erased) in a single operation. Each storage division comprises a plurality of physical storage locations (e.g., pages or logical pages) capable of storing data. Alternatively, the storage divisions 612 may represent sectors of a random access storage media 140, such as a magnetic hard disk, or the like.

Each physical storage location may be assigned a respective physical address ranging from zero (0) to N. The log-storage module 138 may be configured to store data sequentially 621 from an append point 620 within the physical address space 600. The append point 620 moves sequentially through the physical storage space 600. After storing data at the append point 620, the append point advances sequentially 621 to the next available physical storage location. As used herein, an available physical storage location refers to a physical storage location that has been initialized and is ready to store data (e.g., has been erased). Some non-volatile storage media 140, such as solid-state storage media, can only be programmed once after erasure. Accordingly, as used herein, an available physical storage location may refer to a storage location that is in an initialized (or erased) state. If the next storage division in the sequence is unavailable (e.g., comprises valid data, has not been erased or initialized, is out of service, etc.), the append point 620 selects the next available physical storage location. In the FIG. 6A embodiment, after storing data on the physical storage location 616, the append point 620 may skip the unavailable physical storage locations of storage division 613, and continue at the next available physical storage location (e.g., physical storage location 617 of storage division 614).

After storing data on the "last" storage location (e.g., storage location N 618 of storage division 615), the append point 620 wraps back to the first division 612 (or the next available storage division if 612 is unavailable). Accordingly, the append point 620 may treat the physical address space as a loop or cycle.

FIG. 6B depicts an append point 620 within the physical address space 601 of a non-volatile storage media 140. As depicted in FIG. 6B, the log storage module 136 may be configured to cycle the append point 620 sequentially through the physical address space 601. As disclosed above, data stored at the append point 620 may be associated with (e.g., assigned to) any logical identifier of the logical address space 134. As such, the storage controller 120 may implement a "write anywhere" storage paradigm. Storing data sequentially at the append point 620 (with the any-to-any mappings) may provide performance benefits; rather than searching for a particular physical storage location to be used with a particular logical identifier (and/or initializing the particular physical storage location), data may be stored at available physical storage locations at the append point 620. Accordingly, data may be stored without first searching for and/or initializing particular storage locations. Moreover, sequential storage at the append point 620 may prevent write amplification and other issues related to write-once, asymmetric storage media, as described above.

Referring back to FIG. 1, the log-based format of the storage controller 120 may further comprise storing data in a "contextual" format. As used herein, a "contextual" data refers to a self-describing data format from which the logical interface of the data may be determined. As used herein, the "logical interface" of data may include, but is not limited to: a logical identifier of the data, a range and/or extent of logical identifiers, a set of logical identifiers, a name for the data (e.g., file name, object name, or the like), or the like. Accordingly, the contextual format may comprise storing self-descriptive, persistent metadata with the data on the non-volatile storage media 140; the persistent metadata may comprise the logical identifier(s) associated with the data and/or provide sequence information pertaining to the sequential ordering of storage operations performed on the non-volatile storage media 140. In some embodiments, contextual data may be stored in data packets on the non-volatile storage media 140. As used herein, a data packet refers to any data structure configured to associate a data segment, and/or other quantum of data, with metadata pertaining to the data segment. A data packet may comprise one or more fields configured for storage as a contiguous unit on the non-volatile storage media 140. Alternatively, a data packet may comprise a plurality of different portions and/or fragments stored at different, noncontiguous storage locations of one or more non-volatile storage medium 140.

Figure 7:
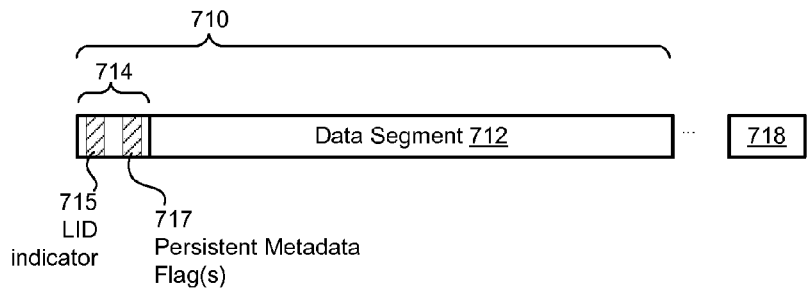
FIG. 7 depicts one embodiment of a contextual data format.

FIG. 7 depicts one embodiment of a contextual data format (packet 710). Each data packet 710 may comprise a respective data segment 712 comprising data associated with one or more logical identifiers. The data segment 712 may correspond to data a storage client 118A-N and may include, but is not limited to, operating system data, file data, application data, or the like. In some embodiments, the data of the data segment 712 may be processed by a write data pipeline (described below), which may include, but is not limited to, compression, encryption, whitening, error-correction encoding, and so on. The data segment 712 may be of a predetermined size (e.g., a fixed "block" or "segment" size). Alternatively, the data segment 712 may have a variable size.

In certain embodiments, the packet 710 may include persistent metadata 714 that is stored on the non-volatile storage media 140 with the data segment 712. In some embodiments, the persistent metadata 714 is stored with the data segment 712 as a packet header, footer, of other packet field. The persistent metadata 714 may include a logical identifier indicator 715 that identifies the logical identifier(s) to which the data segment 712 pertains. As described below, the persistent metadata 714 (and the logical identifier indicator 715) may be used to reconstruct the storage metadata 135, such as the forward index 404 and/or reverse index 506. The persistent metadata 714 may further comprise one or more persistent metadata flags 717. As disclosed below, the persistent metadata flags 717 may be used to support atomic storage operations, transactions, or the like.

In some embodiments, the packet 710 may comprise and/or be associated with a sequence indicator 718. The sequence indicator 718 may be persisted with the packet 710 on the non-volatile storage media 140; for example, the sequence indicator 718 may be stored on the same storage division as the packet 710. Alternatively, the sequence indicator 718 may be persisted in a separate storage location. In some embodiments, a sequence indicator 718 is applied when a storage division is made available for use (e.g., when erased, when the first or last storage location is programmed, or the like). The sequence indicator 718 may be used to determine the log-order of the packet 710 relative to other packets 710 on the non-volatile storage media 140.

The letters A-L of FIG. 6B may represent data stored on physical storage locations of the non-volatile storage media 140. Data A is initially stored at a physical storage location 650. When the data A is persisted at location 650, the physical storage location reference 626 in the forward index (entry 605) is updated to reference the physical storage location 650. In addition, a reverse index entry 607 may be updated to indicate that the physical storage location 650 comprises valid data and/or to associate the physical storage location 650 with logical identifiers 205-212 (not shown). (For clarity, other portions of the forward index and/or reverse index are omitted from FIG. 6B.)

Data A may be modified and/or overwritten out-of-place, such that the updated data is not be stored on the original physical storage location 650. Instead, the updated data A' is stored sequentially (out-of-place) at storage location 651, which may correspond to the current position of the append point 620 at the time data A was modified. The storage metadata is updated accordingly. The forward index entry 605 is updated to associate the logical identifiers 205-212 with the physical storage location 651 comprising A'. The entry 607 of the reverse index is updated to mark physical storage location 650 as invalid and to indicate that the physical storage location 650 comprises valid data. Marking the physical storage location 650 as invalid may allow the storage location 650 to be reclaimed by the groomer module 138, as described above.

The data A' may be further modified and/or overwritten with data A''. The updated data A'' may be stored at the current append point 620 (physical storage location 652). The storage metadata is updated, as described above: the forward index entry 605 is updated to associate the entry with the physical storage location 652, and a reverse index entry 609 is updated to indicate that the physical storage address 652 comprises valid data (and that the physical address 651 comprises invalid data). The "obsolete" versions A and A' may be retained on the non-volatile storage media 140 until the corresponding physical storage locations 650 and/or 651 are reclaimed (e.g., erased) in a grooming operation.

The data A, A', and A'' may be stored in the sequential, log-based format (an "event-log" format) described above. Referring back to FIG. 1, the storage controller 120 may be configured to reconstruct the storage metadata 135 from the contents of the non-volatile storage media 140 (e.g., from the contextual, log format of the data). The storage controller 120 may access persistent metadata 714 of packets 710 to identify the logical identifier(s) associated with corresponding data segments 712. The storage controller 120 may be further configured to distinguish valid, up-to-date data from obsolete, out-of-date versions based on the log-order of the data on the non-volatile storage medium (e.g., based on sequence indicator(s) 718 associated with the data and/or relative order of the data within the physical address space of the non-volatile storage media 140).

In FIG. 6B, the logical identifier indicator of the persistent metadata stored with data A, A', and/or A'' may indicate that the data stored at the physical storage locations 650, 651, and 652 corresponds to logical identifiers 205-212. A sequence indicator of the data A, A', and/or A'' (and/or the position of the append point 620) indicates that the physical storage location 652 comprises the current, valid copy of the data. Therefore, the forward index entry 605 may be reconstructed to associate the logical identifiers 205-212 with the physical storage location 652. In addition, the reverse index entries 607, 608, and/or 609 may be reconstructed to indicate that the physical storage locations 650 and 651 comprise invalid data, and that the physical storage location 652 comprises valid data. Further embodiments of systems, and methods for crash recovery and/or data integrity despite invalid shutdown conditions are described in U.S. patent application Ser. No. 13/330,554, filed Dec. 19, 2011, and entitled, "Apparatus, System, and Method for Persistent Data Management on a Non-Volatile Storage Media," which is hereby incorporated by reference.

Figure 2:
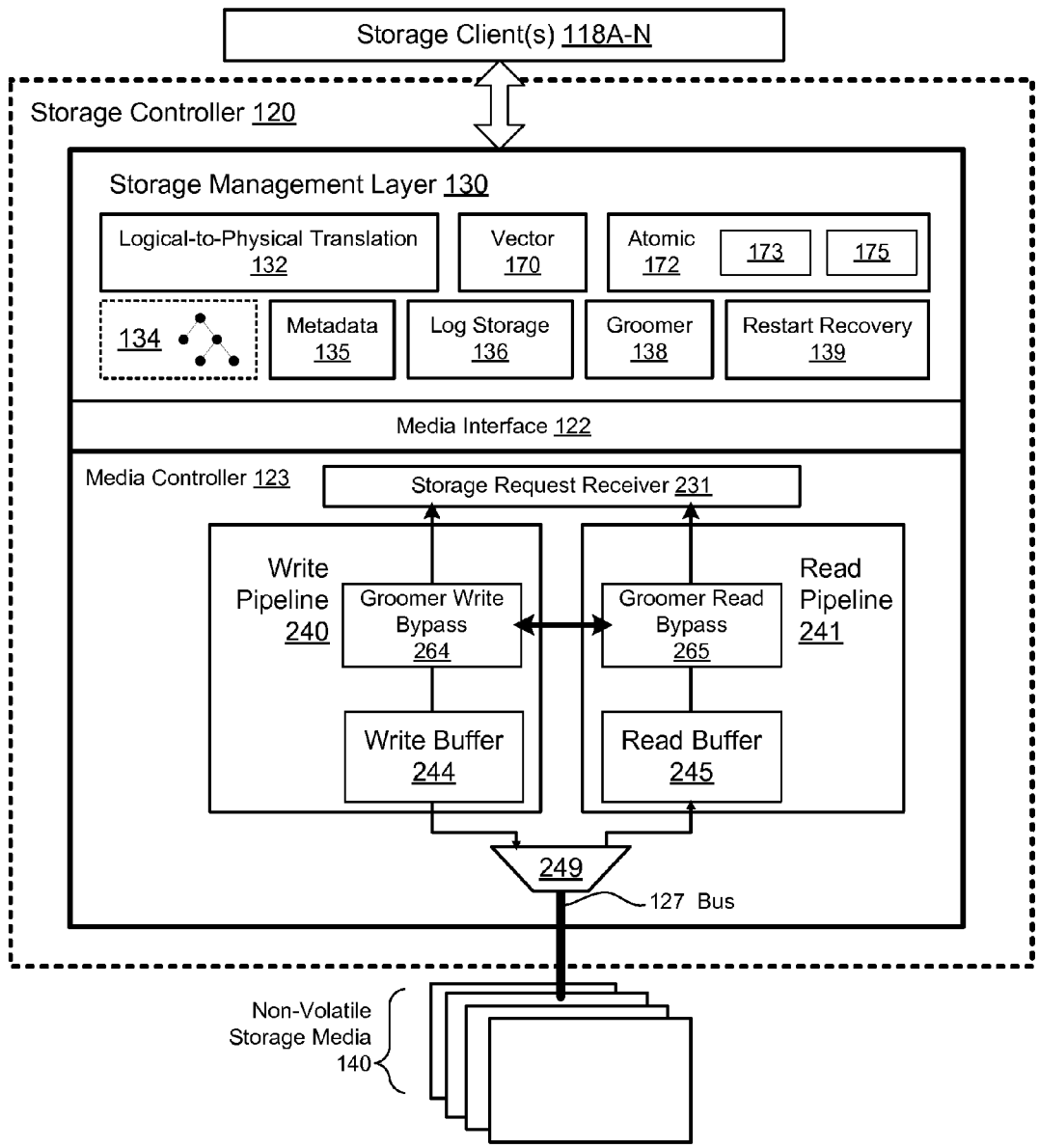
FIG. 2 is a block diagram of another embodiment of a storage controller.

FIG. 2 is a block diagram of another embodiment of a storage controller 120 configured to implement vector I/O operations and/or service vector storage requests. The storage controller 120 may further comprise a restart recovery module 139, which may be configured to reconstruct the storage metadata 135 from the contents of the non-volatile storage media 140, as described above.

In the FIG. 2 embodiment, the non-volatile storage media 140 may comprise one or more non-volatile storage devices, such as one or more hard disks, one or more solid-state storage elements, or the like. The non-volatile storage media 140 (and/or corresponding devices) may be selectively coupled to the media controller 123 via the bus 127 and/or multiplexer 249. Alternatively, or in addition, one or more of the non-volatile storage media 140 (or devices) may be a remote storage device accessible via a network (e.g., network 116).

The media controller 123 may comprise a storage request receiver module 231 configured to receive storage requests from the storage controller 120 and/or other storage clients 118A-N. The request module 231 may be configured to perform storage operations on the non-volatile storage media 140 in response to the requests, which may comprise transferring data to and from the storage controller 120 and/or storage clients 118A-N. Accordingly, the request module 231 may comprise one or more direct memory access (DMA) modules, remote DMA modules, controllers, bridges, buffers, and the like.

The media controller 123 may comprise a write pipeline 240 that is configured to process data for storage on the non-volatile storage media 140. In some embodiments, the write pipeline 240 comprises one or more write processing stages, which may include, but are not limited to, compression, encryption, packetization, media encryption, error encoding, and so on.

Packetization may comprise encapsulating data in a contextual data format, such as the self-describing packet format 710 described above. Accordingly, the write pipeline 240 may be configured to store data with persistent metadata 714, which may include indicators of the logical identifier(s) associated with the data. As described above, the restart recovery module 139 may leverage the contextual data format to reconstruct the storage metadata 135. As used herein, restart recovery comprises the act of a system, apparatus, or computing device, commencing processing after an event that can cause the loss of data stored within volatile memory of the system, apparatus, or computing device (e.g., a power loss, reset, hardware failure, software fault, or the like). Restart recovery may also comprise power cycle recovery, such as commencing processing after an invalid shutdown, a hard reset, or a disconnection or separation of the powered device from a power supply (such as physically disconnecting a power supply for the device).

Error encoding may comprise encoding data packets (or other data containers) in an error-correcting code (ECC). The ECC encoding may comprise generating ECC codewords, each of which may comprise a data segment of length N and a syndrome of length S. For example, the write pipeline 240 may be configured to encode data segments into 240 byte ECC chunks, each ECC chunk comprising 224 bytes of data and 16 bytes of ECC data. In other embodiments, the write pipeline 240 may be configured to encode data in a symbolic ECC encoding, such that each data segment of length N produces a symbol of length X. The write pipeline 240 may encode data according to a selected ECC "strength." As used herein, the "strength" of an error-correcting code refers to the number of errors that can be detected and/or corrected by use of the error-correcting code. In some embodiments, the strength of the ECC encoding may be adaptive and/or configurable; the strength of the ECC encoding may be selected according to the reliability and/or error rate of the non-volatile storage media 140.

The write buffer 244 may be configured to buffer data for storage on the non-volatile storage media 140. In some embodiments, the write buffer 244 may comprise one or more synchronization buffers to synchronize a clock domain of the media controller 123 with a clock domain of the non-volatile storage media 140 (and/or bus 127).

As described above, the log storage module 136 may be configured to store data in a log format on the non-volatile storage media 140. The log storage module 136 may be configured to store data sequentially from an append point within the physical address space of the non-volatile storage media 140, as described above. The log storage module 136 may, therefore, select physical storage location(s) for data to maintain a log order on the non-volatile storage media 140, which may comprise providing addressing and/or control information to the media controller 123 and/or write pipeline 240.

The media controller 123 may further comprise a read pipeline 241 that is configured to read data from the non-volatile storage media 140 in response to requests received via the request module 231. The requests may comprise and/or reference the logical interface of the requested data, such as a logical identifier, a range and/or extent of logical identifiers, a set of logical identifiers, or the like. The physical addresses associated with data of a read request may be determined based, at least in part, upon the logical-to-physical translation layer 132 (and/or storage metadata 135) maintained by the storage controller 120. Data may stream into the read pipeline 241 via the read buffer 245 and in response to addressing and/or control signals provided via the bus 127. The read buffer 245 may comprise one or more read synchronization buffers for clock domain synchronization, as described above.

The read pipeline 241 may be configured to process data read from the non-volatile storage media 140 and provide the processed data to the storage controller 120 and/or a storage client 118A-N. The read pipeline 241 may comprise one or more data processing stages, which may include, but are not limited to, error correction, media decryption, depacketization, decryption, decompression, and so on. Data processed by the read pipeline 241 may flow to the storage controller 120 and/or storage client 118A-N via the request module 231, and/or other interface or communication channel (e.g., the data may flow directly to and from a storage client via a DMA or remote DMA module of the storage controller 120)

The read pipeline 241 may be configured to detect and/or correct errors in data read from the non-volatile storage media 140 using, inter alia, the ECC encoding of the data (e.g., as encoded by the write pipeline 240), parity data (e.g., using parity substitution), and so on. The ECC encoding may be capable of detecting and/or correcting a pre-determined number of bit errors, in accordance with the strength of the ECC encoding. Further embodiments of apparatus, systems, and methods for detecting and/or correcting data errors are disclosed in U.S. Pat. No. 8,195,978, issued on Apr. 5, 2012, and entitled "Apparatus, System, and Method for Detecting and Replacing a Failed Data Storage," which is hereby incorporated by reference.

Figure 3:
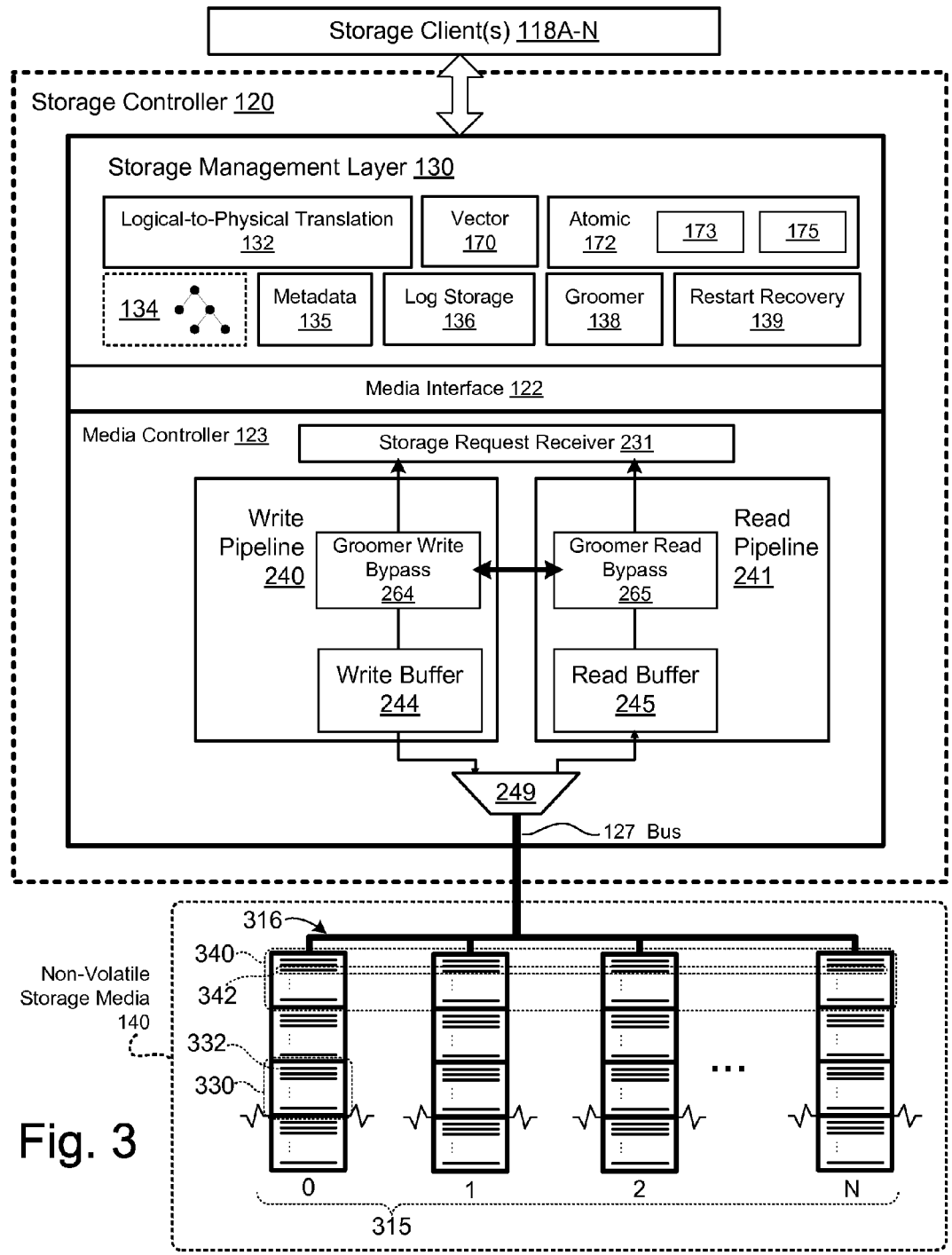
FIG. 3 is a block diagram of another embodiment of a storage controller.

FIG. 3 depicts another embodiment of a storage controller 120. In the FIG. 3 embodiment, the non-volatile storage media 140 may comprise a plurality of solid-state storage elements 316 (elements 316 0 through N). The solid-state storage elements 316 may be embodied on separate chips, packages, die, or the like. Alternatively, or in addition, one or more of the solid-state storage elements 316 may share the same package and/or chip (e.g., be separate die and/or planes on the same chip). The solid-state storage elements 316 may be partitioned into respective storage divisions 330 (e.g., erase blocks), each comprising a plurality of storage units 332 (e.g., pages). However, the disclosure could be adapted to use different types of non-volatile storage media 140 comprising different media partitioning schemes and, as such, should not be read as limited in this regard. The solid-state storage elements 316 may be communicatively coupled to the media controller 123 in parallel (via the bus 127). Accordingly, the media controller 123 may be configured to manage the solid-state storage elements 316 as a "logical storage element" 315.

The logical storage element 315 may comprise 25 solid-state storage elements 316 connected in parallel by the bus 127. The logical storage element 315 may be partitioned into logical storage units, such as logical storage divisions (logical erase blocks) 340 and/or logical storage units (logical pages) 342. Each logical erase block 340 comprises an erase block 330 of a respective storage element 316 (25 erase blocks 330), and each logical page 342 comprises a page 332 of a respective storage element 316 (25 pages).

Storage operations performed on the logical storage element 315 may operate across the constituent solid-state storage elements 316: an operation to read a logical page 342 comprises reading from as many as 25 physical pages 332 (e.g., one storage unit per solid-state storage element 316), an operation to program a logical page 342 comprises programming as many as 25 physical pages 332, an operation to erase a logical erase block 340 comprises erasing as many as 25 physical erase blocks 330, and so on.

As disclosed above, the groomer module 138 may be configured to reclaim storage resources on the non-volatile storage media 140. In some embodiments, the groomer module 138 may be configured to interleave grooming operations with other storage operations and/or requests. For example, reclaiming a storage resource, such as a physical erase block (PEB) 330 or logical erase block 340 (e.g., set of two or more physical erase blocks), may comprise relocating valid data to another storage location on the non-volatile storage media 140. The groomer write and groomer read bypass modules 264 and 265 may be configured to allow data packets to be read into the read pipeline 241 and then be transferred directly to the write pipeline 240 without being routed out of the media controller 123.

The groomer read bypass module 265 may coordinate reading data to be relocated from a storage resource that is being reclaimed (e.g., an erase block, logical erase block, or the like). The groomer module 138 may be configured to interleave the relocation data with other data being written to the non-volatile storage media 140 via the groomer write bypass 264. Accordingly, data may be relocated without leaving the media controller 123. In some embodiments, the groomer module 138 may be configured to fill the remainder of the write buffer 244 with relocation data, which may improve groomer efficiency, while minimizing the performance impact of grooming operations.

The media controller 123 may further comprise a multiplexer 249 that is configured to selectively route data and/or commands between the write pipeline 240 and read pipeline 241, and the non-volatile storage media 140. In some embodiments, the media controller 123 may be configured to read data while filling the write buffer 244 and/or may interleave one or more storage operations on one or more banks of solid-state storage elements 316. Further embodiments of write and/or read pipelines are disclosed in U.S. patent Ser. No. 11/952,091, filed Dec. 6, 2007, entitled "Apparatus, System, and Method for Managing Data Using a Data Pipeline,"

and published as United States Patent Application Publication No. 2008/0141043 on Jun. 12, 2008, which is hereby incorporated by reference.

Many storage clients 118A-N rely on atomic storage operations. As used herein, an atomic operation refers to an operation that either completes or fails as a whole. Accordingly, if any portion of an atomic storage operation does not complete successfully, the atomic storage operation is incomplete (or failed), and other portions of the atomic storage operation are invalidated or "rolled back." As used herein, rolling back an incomplete atomic storage operation refers to undoing any completed portions of the atomic storage operation. For example, an atomic storage operation may comprise storing six data packets on the non-volatile storage media 140, five of the packets may be stored successfully, but storage of the sixth data packet may fail; rolling back the incomplete storage operation may comprise ignoring and/or excluding the five packets, as described below.

Some atomic operations may be limited to a relatively small, fixed-sized data (e.g., a single sector within a block storage device). Atomic storage operations may require a "copy on write" operation to ensure consistency (e.g., to allow the atomic storage operation to be rolled back, if necessary), which may significantly impact the performance of the atomic storage operations. Moreover, support for atomic storage operations may typically be provided by a layer that maintains its own, separate metadata pertaining to atomic storage operations, resulting in duplicative effort, increased overhead, and/or decreased performance. Some atomic operations may be more complex and may involve multiple storage operations or "sub-requests" or "subcommands" (e.g., may involve storing a plurality of data packets on the non-volatile storage media 140). The storage controller 120 may be configured to efficiently service complex atomic storage operations, such that the atomic operations are crash safe and packets of incomplete (failed) atomic operations can be identified and rolled back.

In some embodiments, the storage controller 120 is configured to leverage and/or extend the storage metadata 135 to provide efficient atomic storage operations through the storage management layer 130. Consistency of the storage metadata 135 may be maintained by deferring updates to the storage metadata 135 until the one or more storage operations comprising the atomic storage request are complete. In some embodiments, the atomic storage module 172 maintains metadata pertaining to atomic storage operations that are "in process" (e.g., ongoing operations that are not yet complete) in separate "inflight" metadata 175. Accordingly, in certain embodiments, the state of the storage metadata 135 is maintained until the atomic operation successfully completes, obviating the need for extensive rollback processing. In response to completion of the atomic storage operation, the atomic storage module 172 updates the storage metadata 135 with the corresponding contents of the inflight metadata 175.

Alternatively, or in addition, the atomic storage module 172 may comprise an ordered queue 173 that is configured to maintain ordering of storage requests directed to the storage controller 120. The ordered queue 173 may be configured to queue both atomic storage requests and non-atomic storage requests. In some embodiments, the ordered queue 173 may be configured to retain the order in which the storage requests were received (e.g., in a first-in-first-out configuration). The ordering may prevent data hazards, such as read before write, or the like. The ordered queue 173 may, therefore, simplify processing of storage requests and/or obviate the need, for example, for the separate inflight metadata 175 (disclosed below in connection with FIGS. 9A-E). Consequently, certain embodiments may include an ordered queue 173 and not inflight metadata 175 (or vice versa). In addition, some embodiments may leverage the ordered queue 173 to avoid potential problems that may be caused by interleaving of data packets, which may occur if multiple atomic requests are processed simultaneously. As will be explained below in connection with FIGS. 8B and 11A-C, if data packets for each atomic request are stored contiguously in the log (without interleaving packets associated with other write requests), a single bit within each data packet may be utilized to identify whether an atomic write was successfully completed. Accordingly, in certain embodiments, the ordered queue 173 may provide significant advantages by reducing the persistent metadata overhead associated with atomic storage operations. In alternative embodiments, the ordered queue 173 may process either atomic storage requests or non-atomic storage requests but not both and/or the storage controller 120 may comprise separate queues for atomic storage requests and non-atomic storage requests.

The storage management layer 130 may comprise a vector module 170 configured to perform vector I/O operations (e.g., service vector storage requests). As used herein, a vector I/O operation (or vector storage request) refers to an I/O operation pertaining to one or more vectors. A vector may comprise one or more parameters, which may include, but are not limited to: one or more source identifiers pertaining to a source of an I/O operation, one or more destination identifiers pertaining to a destination of the I/O operation, one or more flags to indicate a type of I/O operation and/or properties of the I/O operation, and so on. Accordingly, as used herein, a "vector" may define an I/O operation (e.g., a storage request) pertaining to a set of disjoint and/or non-contiguous identifiers, a range of identifiers, an extent of identifiers, or the like. The identifiers of a vector may include, but are not limited to: memory addresses, memory references, physical storage locations, logical identifiers, names, offsets, or the like. A vector may specify a storage request and/or I/O operation. As such, as used herein, a vector may be referred to as a "storage request," storage vector," and/or "I/O vector." A vector storage request may comprise a plurality of vectors and may, therefore, define a plurality of storage requests, (e.g., a separate I/O vector and/or storage request for each vector of the vector storage request). The storage requests of a vector storage request may be referred to as "subcommands" or "sub-requests," each of which may correspond to a respective vector of the vector storage request. Servicing and/or executing a vector storage request comprising a plurality of vectors may comprise servicing and/or executing the subcommands and/or sub-requests of the vector storage request. Accordingly, in certain embodiments, servicing and/or executing a vector storage request may comprise generating and/or determining storage requests corresponding to each vector of the vector storage request (generating and/or determining the subcommands and/or sub-requests of the vector storage request). Servicing and/or executing an atomic vector storage request may comprise successfully completing all of the storage requests of the atomic vector storage request or none of the storage requests of the atomic vector storage request (e.g., rolling back and/or excluding completed portions of a failed atomic vector storage request).

As disclosed above, a vector storage request refers to a request to perform an I/O operation(s) on one or more vectors. The vector(s) of a vector storage request may pertain to logical identifier sets and/or ranges that are contiguous or non-contiguous with respect to the logical address space 134. For example, an operation to TRIM one or more logical identifier ranges in the logical address space 134 may be implemented as a single vector storage request (e.g., a vector storage request to TRIM logical identifiers 2 through 45, 1032 through 1032, and 32134 through 32445).

The storage layer 130 may further comprise an atomic module 172 configured to implement atomic operations. As described in additional detail below, the storage layer 120 may leverage the log format implemented by the log storage module 136, and the independence between logical identifiers and physical storage locations, to efficiently service vector and/or atomic operations.

As disclosed above, the logical-to-physical translation module 132 may enable arbitrary, any-to-any mappings between logical identifiers and physical storage locations. The storage controller 120 may leverage the flexibility provided by these mappings to store data "out-of-place" and in a log-based format, and to efficiently manage vector storage requests. A vector storage request may comprise a request to perform I/O operation(s) on two or more vectors, which may be disjoint, non-adjacent, and/or non-contiguous with respect to the logical address space 134. However, due to the independence between logical identifiers and physical storage locations, the storage controller 120 may store data pertaining to the vector storage operations contiguously in the log on the non-volatile storage media 140 (e.g., by use of the log storage module 136, as described above).

Figures 8A, 8B:
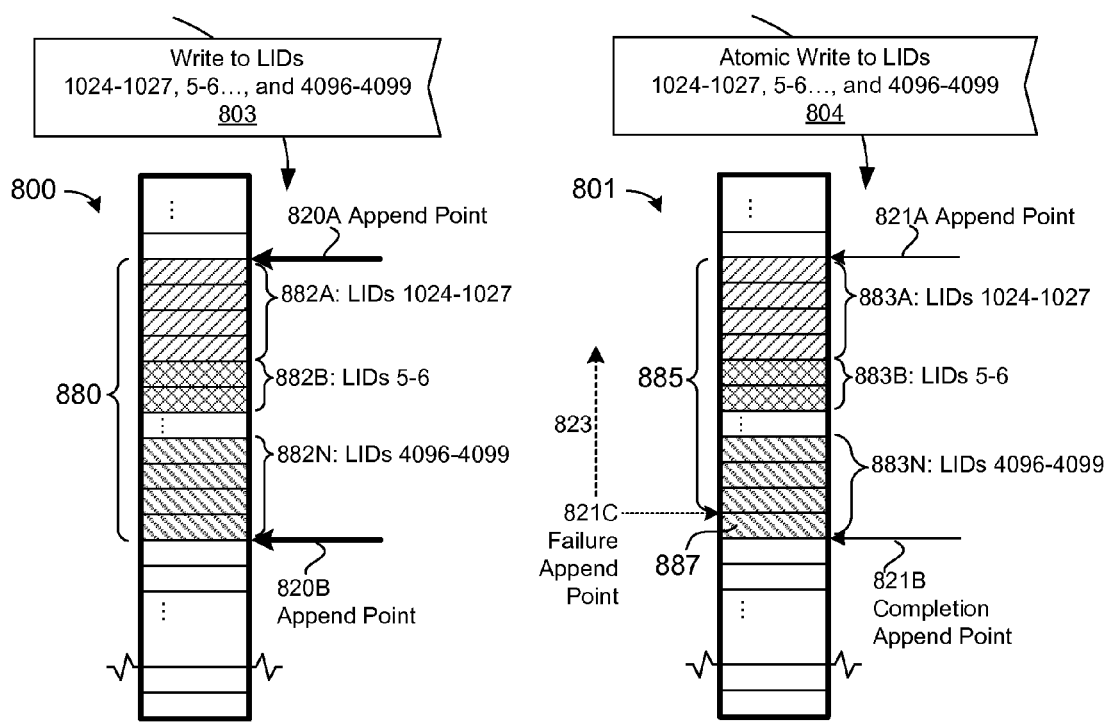
FIGS. 8A-B depict embodiments of data of disjoint, non-adjacent, and/or non-contiguous vectors stored contiguously within a log on a non-volatile storage medium.

FIG. 8A depicts one embodiment of data packets of a vector storage operation stored contiguously in a log 800. The vector storage request 803 of FIG. 8A may comprise a request to write to a plurality of disjoint, non-adjacent and/or non-contiguous vectors: 1024-1027, 5-6 . . . and 4096-4099. The vector storage module 170, and the log storage module 136, may be configured to store data packets 880 of vector storage operations contiguously within the log 800, which may comprise storing data packets 880 pertaining to disjoint, non-adjacent and/or non-contiguous vectors contiguously within the log 800 (e.g., storing data packets 880 sequentially from the starting append point 820A to the completion append point 820B). Storing the data packets 880 contiguously within the log 800 may comprise the vector storage module 170 decomposing the vector storage request 803 into one or more sub-requests or subcommands (e.g., separate write commands for each logical identifier range of the vector storage request 803). The sub-requests may be queued for execution by the storage controller 120 (e.g., in an ordered queue 173, request buffer (described in further detail below), or the like). The log storage module 136 may be configured to service each of the sub-requests in order and/or without interleaving other data packets there between. Accordingly, the log storage module 136 may store data packets 880 pertaining to the first logical identifier range 882A, second logical identifier range 882B, and Nth logical identifier range 882N, which may be disjoint, non-adjacent, and/or non-contiguous with respect to the logical address space 134 contiguously within the log 800 on the non-volatile storage media 140. Servicing the vector storage request 803 may further comprise updating the storage metadata 135 (e.g., forward index 204) to associate the disjoint, non-adjacent, and/or non-contiguous vectors 882A-N with physical storage location(s) of the data packets 880 in the log 800, as described above.

Storing data contiguously within the log 800 may simplify atomic storage operations, including atomic vector storage operations. Referring to FIG. 8B, an atomic vector storage request 804 may comprise a request to write data to two or more disjoint, non-adjacent, and/or non-contiguous vectors, such that either all of the write requests complete successfully, or none of the write requests complete (e.g., any partial sub-requests are rolled back). The atomic storage module 172 may be configured to decompose the atomic vector storage request 804 into sub-requests (e.g., a separate write request for each logical identifier range) to store data packets 885 and 887 of the write requests contiguously in the log 801 from a starting append point 821A to an end append point 821B, as described above (e.g., by use of the vector storage module 170 and/or the log storage module 136).

The storage controller 120 may leverage persistent metadata 714 of the packet format 710 (or other suitable data format) to identify data that pertains to atomic storage operations. In some embodiments, the persistent metadata 714 may be used to identify and exclude data packets pertaining to incomplete, failed atomic storage operations (e.g., during reconstruction of the storage metadata 135 by the restart recovery module 139). The persistent metadata 714 may ensure that atomic storage operations (including atomic vector storage operations) are crash safe, such that data packets of failed atomic operations can be identified and rolled back during restart and/or recovery processing.

In some embodiments, data pertaining to atomic operations may be identified by use of persistent indicators stored on the non-volatile storage media 140. For example, data pertaining to an "incomplete" and/or "in process" atomic storage operation may be identified by use of a persistent metadata indicator in a first state. As used herein, data of an "incomplete" or "in process" atomic storage request refers to data pertaining to an ongoing atomic storage operation, such as data stored on the non-volatile storage media 140 as part of one or more sub-requests of an atomic vector operation and/or other multi-packet operation. Persistent metadata in a second state may be used to signify completion of the atomic storage operation. The indicators may be stored at a pre-determined order within the log, which, as disclosed in further detail herein, may allow data of failed atomic storage operations to be detected, excluded, and/or rolled back.

In some embodiments, the packet format 710 of FIG. 7 may be leveraged to identify data packets of atomic storage operations. Data packets pertaining to incomplete and/or in processes atomic storage operations may comprise a persistent metadata flag 717 in a first state. Data packets pertaining to non-atomic operations and/or data packets that represent completion of an atomic storage operation may comprise a persistent metadata flag 717 in a second state. The metadata flag 717 may comprise a single bit; the first state may be a "0" and the second state may be a "1" (or vice versa).

In the FIG. 8B example, the atomic storage module 172 may configure the write pipeline 240 to store the data packets 885 with the persistent metadata flag 717 in the first state (e.g., the state indicating that the data packets 885 are part of an in-progress atomic storage request 804). The atomic storage module 172 may further configure the write pipeline 240 to set the persistent metadata flag 717 of the data packet 887 of the atomic vector storage request 804 to the second state (e.g., non-atomic or "closed" state), indicating that the atomic storage operation was successfully completed. The data packet 887 comprising the persistent metadata flag 717 in the second state may be the "last," "final," and/or "terminating" data packet of the atomic storage request within the log 801. This data packet may be configured to signify completion of the atomic storage operation. As such, the "last" data packet may be stored at the head of the log with respect to the other packets 885 of the atomic storage operation. Accordingly, when traversing the log in reverse log order 823 from completion append point 821B, the first packet 887 encountered will indicate that the atomic vector storage request 804 is complete (and that the other data packets 885 of the atomic storage request 804 should be retained).

The storage controller 120 may be configured to identify data pertaining to incomplete atomic storage operations using the persistent metadata flags 717, which certain embodiments may include in the packets 885 and 887. The restart recovery module 139 may be configured to identify data of an incomplete atomic storage operation in response to identifying one or more data packets comprising a persistent metadata flag 717 in the first state that do not have corresponding data packets with a persistent metadata flag 717 in the second state (e.g., the log 801 ends with packets comprising persistent metadata flags 717 in the first state). In the FIG. 8B embodiment, a failure condition may occur at the append point 821C, before the data packet 887 was stored in the log 801. The restart recovery module 139 may be configured to traverse the log 801 from the failure append point 821C (in reverse log sequence 823), which results in encountering packets 885 comprising a persistent metadata flag 717 in the first state (without first encountering a packet having a persistent metadata flag 717 in the second state), indicating that the packets 885 are part of an incomplete atomic vector storage request 804, and should be ignored and/or invalidated (as described below).

Although FIGS. 8A-B depict the logs 800 and 801 in contiguous physical storage locations (e.g., contiguous sectors, pages, erases blocks, etc.), the disclosure is not limited in this regard. As described above in conjunction with FIG. 6A, in some embodiments, the logs 800 and/or 801 may not be contiguous in the physical address space of the non-volatile storage media 140. Referring to FIG. 6A, as the log storage module 136 appends data sequentially from the append point 620, the log storage module 136 may skip over certain physical storage locations that are not available for storing data (e.g., the erase block 613 of FIG. 6A). A physical storage location may be unavailable for a number of different reasons including, but not limited to, the physical storage location is currently being used to store other valid data, the physical storage location is not ready to store data (e.g., has not been reclaimed or erased by the groomer module 138), a failure condition (e.g., the physical storage location has been taken out of service), or the like. However, notwithstanding any non-contiguity in the physical address space 600, the log format of the log storage module 136 generates a contiguous log of storage operations as defined by the sequence indicators and sequential storage order of data on the non-volatile storage media 140. Therefore, referring back to FIGS. 8A and 8B, the logs 800 and 801 are contiguous with respect to the sequence of storage operations on the non-volatile storage media 140, regardless of whether the data packets 880, 885, and/or 887 are stored on contiguous physical storage locations of the non-volatile storage media 140.

As described above, the storage controller 120 may leverage the contiguous log format to ensure that atomic storage operations are crash safe with minimal persistent metadata overhead on the non-volatile storage media 140. For example, if a data packet of a non-atomic storage operation were interleaved within the data packets 885 in the log 801, one or more of the data packets 885 could be misidentified as being part of a completed atomic storage operation. However, the log format of the storage controller 120 may ensure that data of atomic storage operations are stored contiguously within the log 801 (without interleaving other packets therein), which may ensure that incomplete atomic operations are crash safe, and can be accurately identified and rolled back.

As described above, in some embodiments, the storage controller 120 may be configured to defer updates to the storage metadata 135 pertaining to an atomic storage operation until completion of the atomic storage operation. Metadata pertaining to storage operations that are in process may be maintained in separate inflight metadata 175. Accordingly, in certain embodiments, the state of the storage metadata 135 is maintained until the atomic storage operation successfully completes, obviating the need for extensive post-failure "rollback" operations.

Metadata pertaining to in-process atomic storage operations may be maintained in an inflight metadata 177, which may be separate from other storage metadata 135. The inflight metadata 177 may be accessed to identify read and/or write hazards pertaining to the atomic storage request.

Figure 9A:
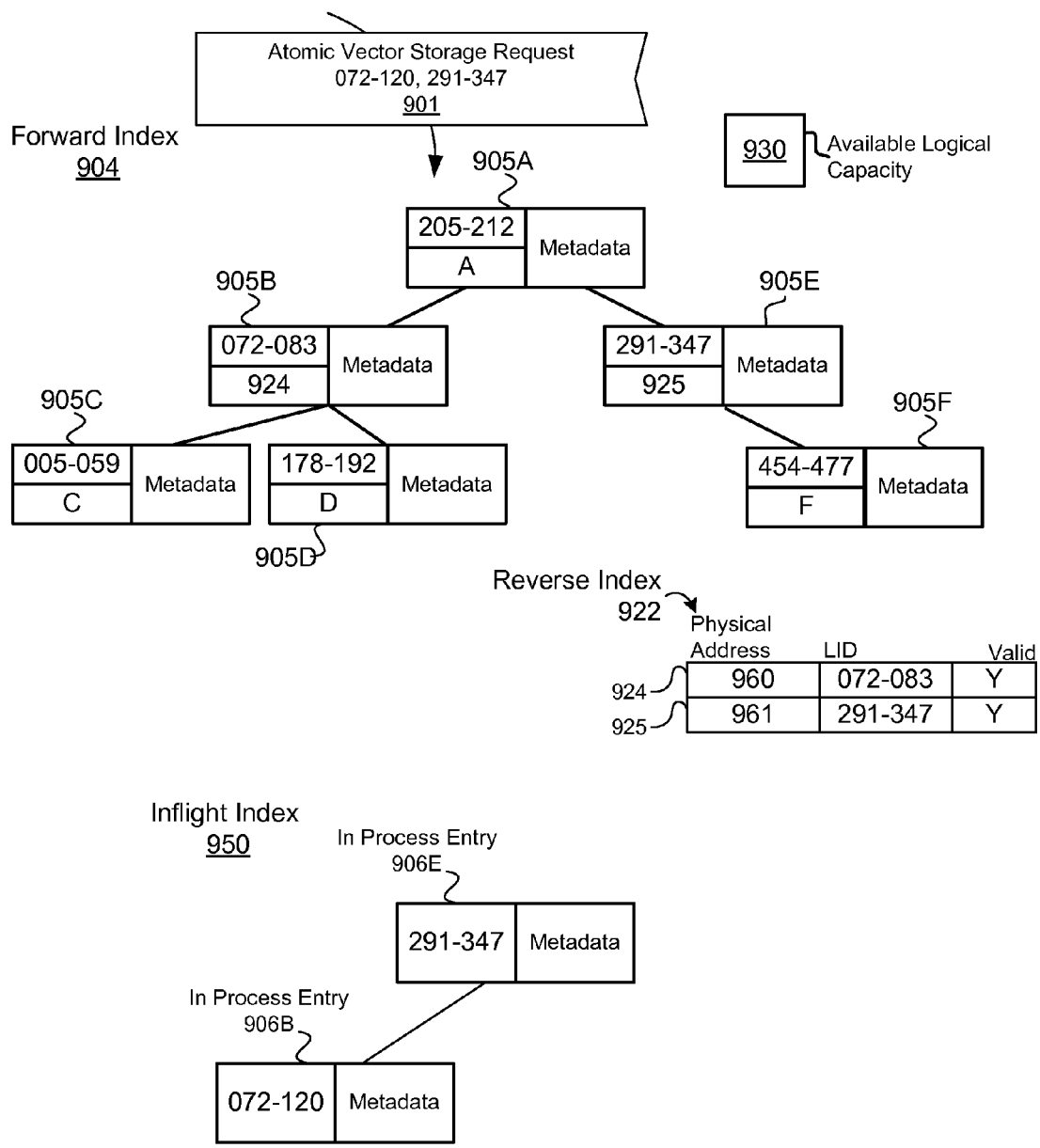
FIGS. 9A-E depict one embodiment a forward index and an inflight index.

FIG. 9A depicts one example of storage metadata 135 that comprises a forward index 904 and a separate inflight index 950. Like the forward index 504 described above, the index 904 is a range-encoded B-tree that tracks allocations of logical identifiers within the logical address space 134. Accordingly, the index 904 may comprise a plurality of entries (e.g., entries 905A-F) to associate logical identifiers with corresponding physical storage locations. The forward index 904 may also track the available logical capacity 930 of the logical address space 134 and/or may include an unallocated index (not shown) to track unallocated portions of the logical address space 134.

Figure 9B:
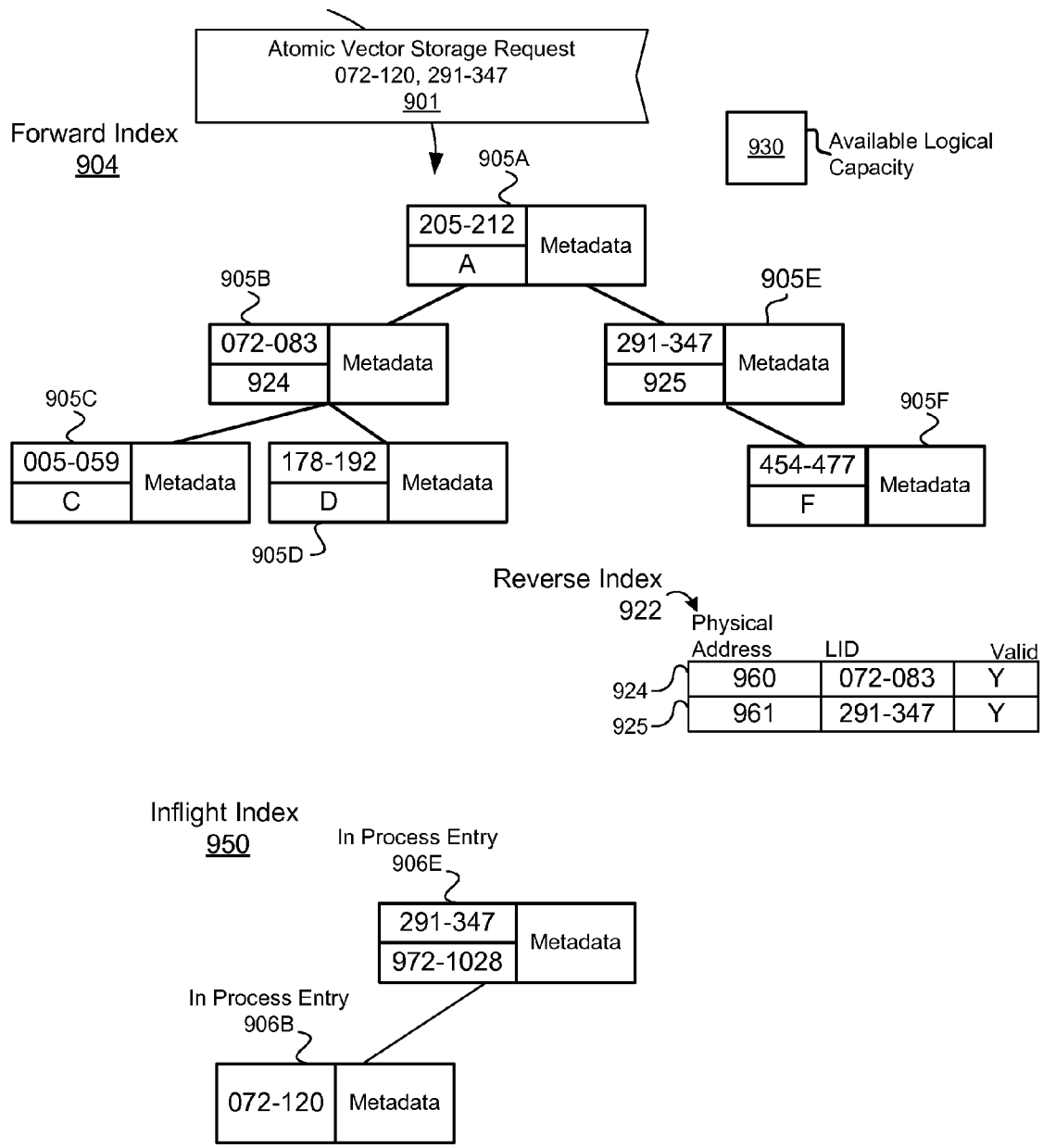
Figure 9C:
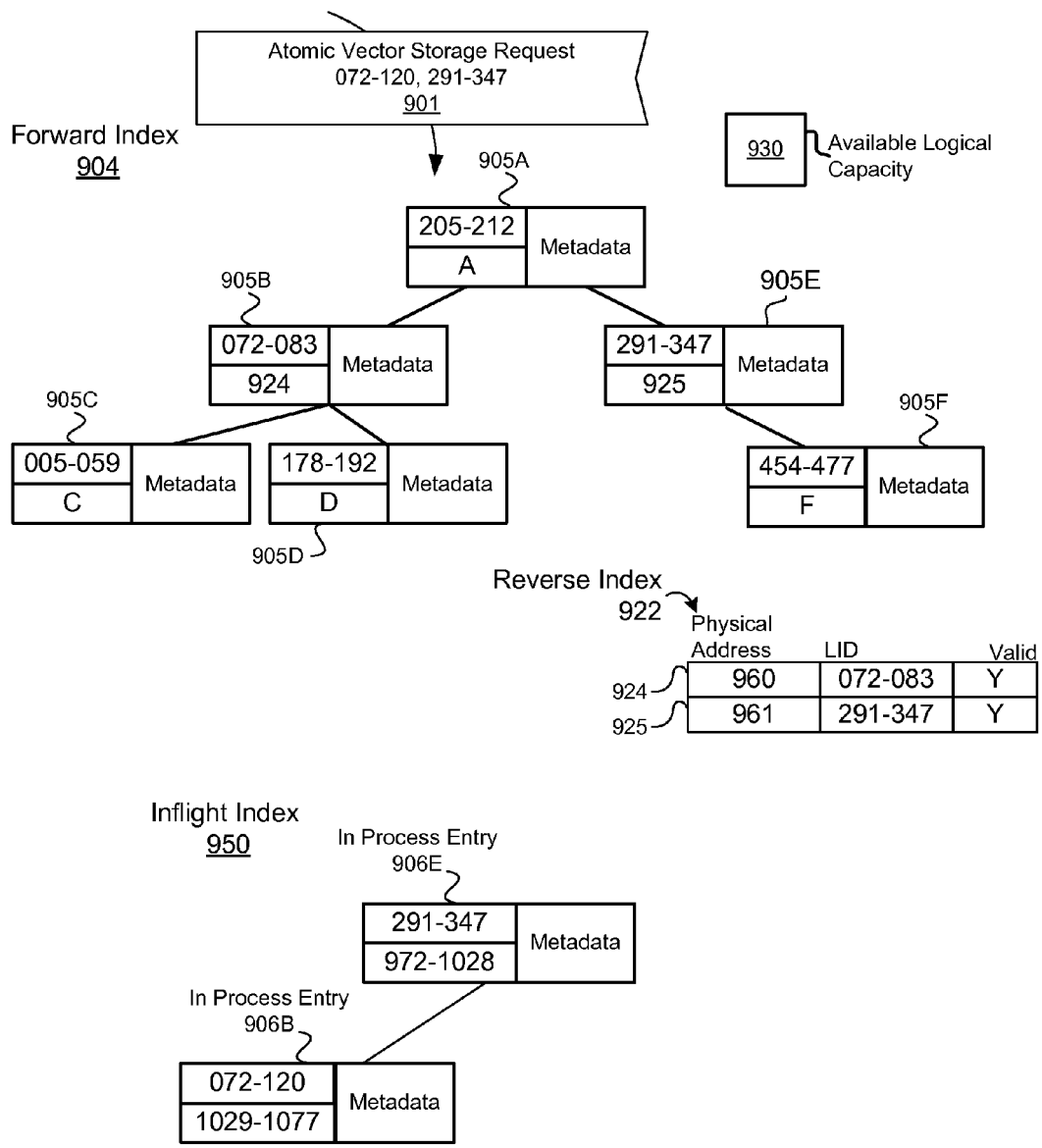

An atomic vector storage request 901 may comprise and/or reference one or more vectors pertaining to one or more disjoint, non-adjacent, and/or non-contiguous ranges of logical identifiers (e.g., an atomic vector storage request). In the FIG. 9A example, the atomic vector storage request 901 comprises a request to store data pertaining to two logical identifier ranges (072-120 and 291-347), portions of which overwrite existing data in the forward index 904. The existing data is referenced by entries 905B and 905E of the forward index 904. The entries 905B and 905E may comprise references to physical storage locations of the data and/or may reference the physical storage locations 960 and 961 of the data using the entries 924 and 925 of a reverse index 922 (for clarity, only a portion of the reverse index 922 and reverse index entries is depicted). As illustrated in FIG. 9A, the atomic vector storage request 901 expands the logical identifier range of 072-083 to 072-120. Servicing the atomic storage request may, therefore, comprise allocating additional logical identifiers in the logical address space 134. Completion of the atomic vector storage request 901 may be predicated on the availability of the additional logical identifiers. The new logical identifiers may be allocated in the forward index 904 (in an unassigned entry (not shown)) or, as depicted in FIGS. 9A-9C, in the inflight index 950.

As disclosed above, the storage metadata 135 may be updated as data is stored on the non-volatile storage media 140, which may comprise updating entries in the forward index 904 to assign logical identifiers to updated physical storage locations, adding and/or removing entries. Updating the storage metadata 135 may further comprise updating the reverse index 922 to invalidate previous versions of overwritten/modified data and to track the physical storage locations of the updated data. These updates modify the state of the storage metadata 135, which may make it difficult to "roll back" a failed atomic storage operation. Moreover, the updates may cause previous versions of the data to be removed from the non-volatile storage media 140 by the groomer module 138 (or other process), such as a cache manager or the like. Removal of the previous version of data overwritten by data of an atomic storage request may make it difficult or impossible to roll back the atomic storage request in the event of a failure.

Use of the inflight index 950 may provide additional advantages over tracking in-process storage operations using the forward index 904 alone. For example, as a storage request is performed, the inflight index 950 may be updated via an "exclusive" or "locked" operation. If these updates were performed in the forward index 904 (or other shared storage metadata 135), the lock may preclude other storage requests from being completed. Isolating these updates in a separate datastructure may free the storage metadata 135 for use in servicing other, potentially concurrent, storage requests. In addition, the inflight index 950 may track in-process operations that may be rolled back in the event of failure (e.g., atomic storage operations). Furthermore, isolating the in-process metadata within the inflight index 950 allows the storage metadata 135 (e.g., forward index 904) to be maintained in a consistent state until the storage request is fully complete, and may allow for more efficient rollback of failed and/or incomplete storage requests.

In some embodiments, the state of the storage metadata 135 is preserved until completion of an atomic storage request. The progress of the atomic vector storage request 901 may be tracked in the inflight index 950. Modifications to the inflight index 950 may be applied to the storage metadata 135 (forward index 904 and/or reverse index 922) upon completion of the atomic storage request (and/or upon reaching a point after which the atomic storage operation is guaranteed to complete).

Entries 906B and 906E are added to the inflight index 950 in response to the atomic vector storage request 901. The entries 906B and 906E identify logical identifiers pertaining to the atomic vector storage request 901. As illustrated in FIG. 9A, the atomic vector storage request 901 comprises writing data to two vectors pertaining to respective disjoint, non-adjacent, and/or non-contiguous logical identifier ranges (072-120 and 291-347). The inflight index 950 comprises respective entries 906B and 906E representing the logical identifier ranges of each vector. The disclosure is not limited in this regard, however, and could be adapted to generate entries for each logical identifier, for sub-ranges of logical identifiers of the atomic vector storage request 901, and so on.

The inflight index 950 is updated in response to completion of one or more portions of the atomic vector storage request 901. FIG. 9B depicts the inflight index 950 after storing a first portion of the data of the atomic vector storage request 901. The entry 906E indicates that the data corresponding to logical identifiers 291-347 has been successfully stored at physical storage locations 972-1028. Alternatively, or in addition, the physical storage locations may be referenced using a secondary datastructure, such as a separate reverse index 922 or the like. The forward index 904 and reverse index 922 of the storage metadata 135 remain unchanged. The inflight index 950 is further updated in response to completion of other portions of the atomic vector storage request 901. FIG. 9C depicts the inflight index 950 as the atomic storage request is completed. The inflight index entry 906B is updated to assign physical storage locations to the logical identifiers 072-083. The forward index 904 and/or reverse index 922 remain unchanged.

The storage metadata 135 may be updated in response to detecting completion of the atomic vector storage request 901 and/or determining that the atomic vector storage request 901 will successfully complete (e.g., data of the atomic vector storage request has been received within a crash/power safe domain, such as within the write pipeline 240 or at write buffer 244).

Figure 9D:
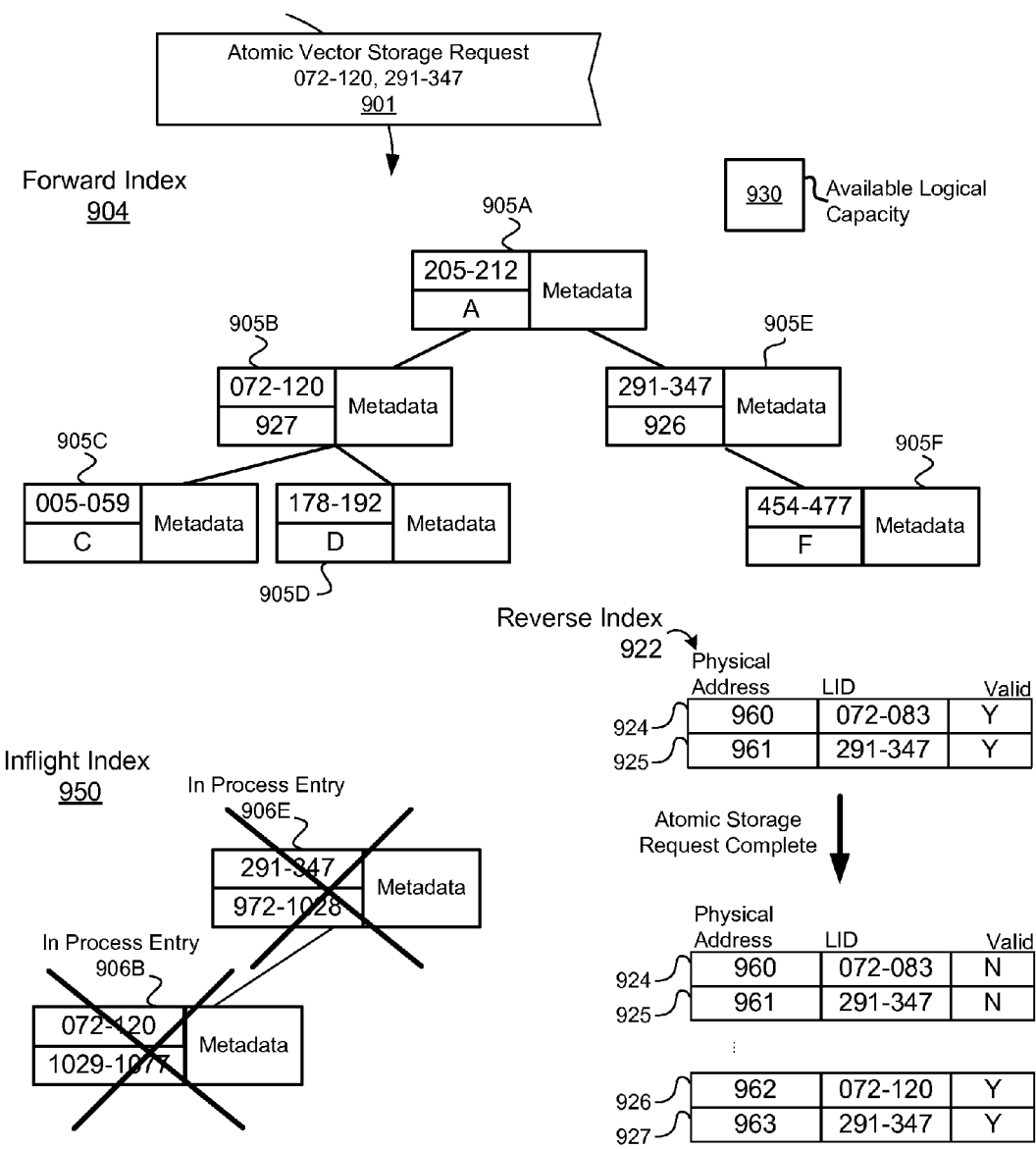

FIG. 9D depicts updated storage metadata 135 following completion of the atomic vector storage request 901. As shown in FIG. 9D, the entries 906B and 906E may be removed from the inflight index 950. In addition, the reverse index 922 may be updated to invalidate data overwritten and/or modified by the atomic vector storage request 901 (e.g., invalidate entries 924 and 925) and to add entries 926 and 927 representing storage locations of the updated data. The entries 905B and 905E of the forward index 904 are updated to assign the logical identifiers of the atomic vector storage request 901 to the updated physical storage locations 926 and 927. The updating may further comprise expanding the entry 905B from a logical identifier range of 072-83 to 072-120. The forward index 904 and/or portions thereof may be locked during the updating. The lock may prevent potential read/write hazards due to concurrent storage requests.

Figure 9E:
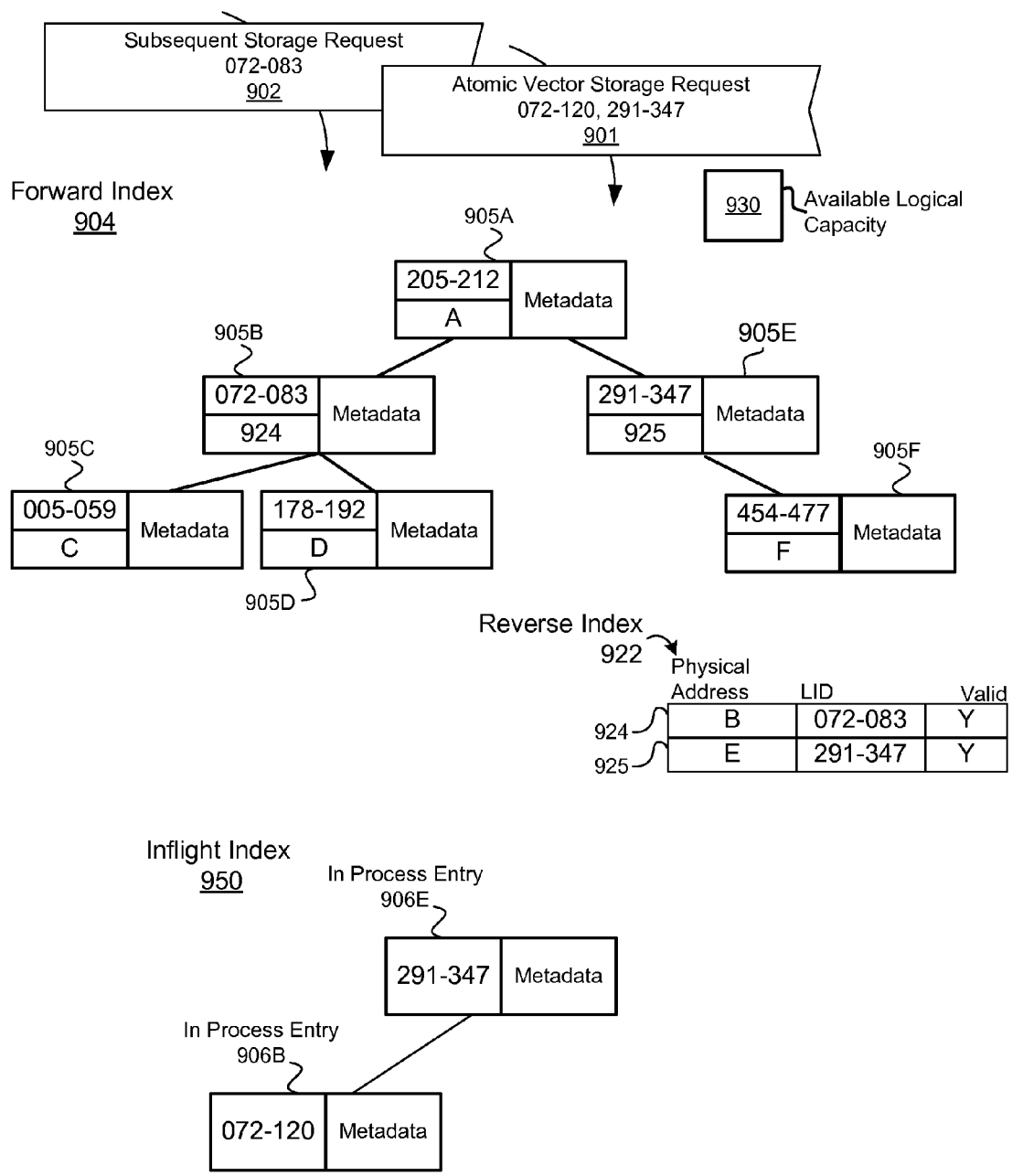

In some embodiments, the inflight index 950 is used to avoid write and/or read hazards. As shown in FIG. 9E, a storage request 902 pertaining to a logical identifier of an atomic vector storage request may be received after or concurrently with the atomic vector storage request 901, but before completion of the atomic vector storage request 901. For example, the subsequent storage request 902 may pertain to logical identifiers 072-083 that are to be overwritten by the atomic vector storage request 901. If the subsequent storage request 902 is to read data of 072-083, the request 902 may pose a read hazard (e.g., read before write), since reading the physical storage location 924 of the entry 905B will return obsolete data. The read hazard may be identified in the inflight index 950, which indicates that the target of the request 902 is in the process of being modified. The storage management layer 130 may be configured to delay and/or defer the subsequent storage request 902 until completion or failure of the atomic vector storage request 901 (and removal of the in-process entry 906B from the inflight index 950). Write hazards may also be detected and addressed by use of the inflight index 950.

The inflight index 950 may also be used to prevent a subsequent storage request from writing data to the logical identifiers of the atomic vector storage request 901. For example, the entry 906B of the inflight index 950 may be accessed to prevent another storage client from allocating logical identifiers 084-120.

Figure 10:
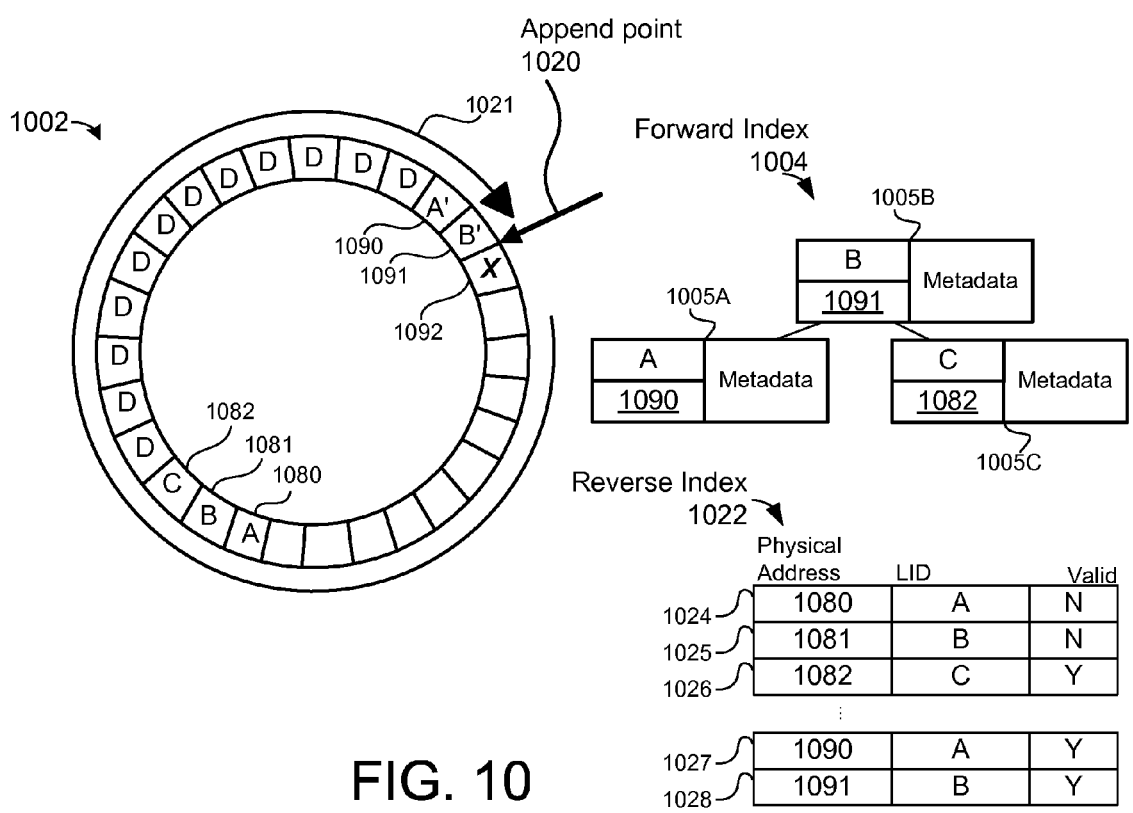
FIG. 10 depicts one embodiment of data of an incomplete atomic storage operation.

As described above, the storage controller 120 may be configured to mark data packets pertaining to atomic storage operations that are in process (vectored or otherwise). Accordingly, atomic storage operations may be crash safe, such that data of incomplete storage operations can be identified within the log (the log format stored on the non-volatile storage media 140). Absent these indicators, data packets pertaining to failed atomic storage operation may appear to be valid. This potential issue is illustrated in FIG. 10. Data A, B, C are stored on physical storage locations 1080, 1081, and 1082 respectively. Other data D is subsequently stored in the log 1002. The data A, B, and C are modified (overwritten) in a subsequent atomic storage request. The atomic storage request stores a portion of the atomic storage request; updated data A' is stored in packet 1090 and updated B' is stored in packet 1091. A failure occurs (with the append point 1020 at physical storage location 1092) before the atomic storage operation is complete, for example, before writing C' to packet 1092. The failure may require the storage metadata (e.g., forward index and/or reverse index through power loss or data corruption) to be reconstructed from the log 1002.

The restart recovery module 139 may be configured to reconstruct the storage metadata (e.g., forward index) from data stored on the non-volatile storage media 140 in the self-describing log format described above. The restart recovery module 139 may be configured to access the log 1002 from the last known append point 1020, which corresponds to the most recent operations in the log 1002. In some embodiments, the append point 1020 location is periodically stored to the non-volatile storage media 140 (or other non-transitory storage medium). Alternatively, or in addition, the append point 1020 may be determined using sequence indicators within the log 1002 (e.g., sequence indicators on erase blocks or other physical storage locations of the non-volatile storage media 140). The storage metadata 135 may be reconstructed by traversing the log 1002 in a pre-determined order (e.g., from storage operation performed furthest in the past to the most recent storage operations (tail to head) or from the most recent storage operations to older storage operations (head to tail)).

As disclosed above, the storage controller 120 may be configured to store data of atomic storage requests contiguously in the log. The storage controller 120 may be further configured to mark data packets with persistent metadata flags 717 to identify data pertaining to in process atomic storage operations (e.g., by use of the atomic storage module 172). The log order of the data A' at 1090 and B' 1091 of the failed atomic storage request in the log 1002 may indicate that data packets 1090 and 1091 comprise the most up-to-date versions of the data A and B (rendering obsolete the previous version(s) of A at 1080 and B at 1081). However, the atomic storage request should have been rolled back to preserve the original data A, B, and C. If the failed atomic storage request is not identified and reconciled, this may result in reconstructing invalid entries 1005A and 1005B in the forward index 1004 that associate A and B with data of the failed atomic storage request (e.g., data packets 1090 and/or 1091). The reverse index 1022 may comprise entries 1024 and 1025 that improperly invalidate the A data at 1080 and the B data at 1081, and entries 1027 and 1028 that improperly indicate that the data of the failed atomic storage request at 1090 and 1091 is valid.

In some embodiments, persistent indicators stored on the non-volatile media are used to track in-process storage requests on the non-volatile storage device and/or to account for loss of storage metadata 135. As used herein, a persistent indicator refers to an indicator that is stored (persisted) on a non-volatile storage medium (e.g., the non-volatile storage media 140). A persistent indicator may be associated with the data to which the indicator pertains. In some embodiments, the persistent indicators are persisted with the data in a packet format, such as the packet format 710 described above. The persistent indicators may be stored with the data in a single storage operation and/or in the smallest write unit supported by the non-volatile storage media 140. Accordingly, persistent storage indicators will be available when the storage metadata 135 is reconstructed from the log 1002. The persistent indicators may identify incomplete and/or failed atomic storage requests despite an invalid shutdown and/or loss of storage metadata 135. For example, and as described above, the packets 1090 and 1091 may comprise persistent metadata flags 717 in the first state, indicating that the packets 1090 and 1091 are part of an in process atomic storage operation. The packet 1092 comprising the metadata flag 717 in the second state was not stored in the log 1002; therefore, when traversing the log 1002 from the append point 1020, the restart recovery module 139 may determine that the packets 1090 and 1091 are part of an incomplete atomic storage request and should be rolled back (e.g., excluded from the storage metadata 135), which may comprise invaliding the association between A and packet 1090 and B and packet 1091 (reverting to the associations to 1080 and 1081, respectively), and invalidating packets 1090 and 1091 in the reverse index 1022.

Figure 11A:
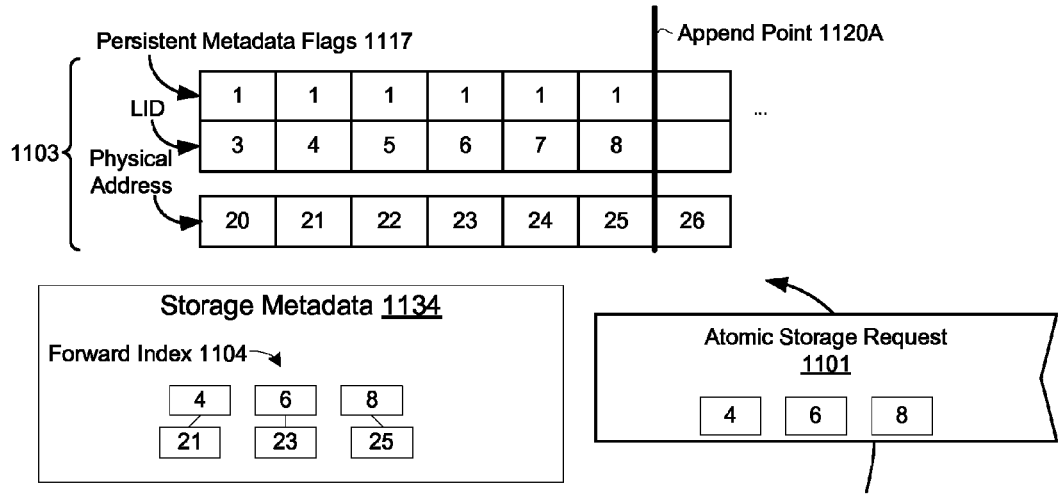
FIGS. 11A-C depict one embodiment of persistent metadata.

FIG. 11A depicts another embodiment of persistent indicators within a log 1103. In FIG. 11A, the log 1103 comprises data pertaining to logical identifiers 3-8 stored on respective physical storage locations 20-25. The append point 1120A is prepared to store data at the next sequential physical storage location 26. A forward index 1104 associates logical identifiers 4, 6, and 8 with respective physical storage locations as described above. The forward index 1104 may include other entries, which are not shown here for clarity.

An atomic storage request 1101 is received to store data in association with one or more disjoint, non-adjacent, and/or non-contiguous logical identifiers (LIDs 4, 6, and 8). In some embodiments, an atomic storage request 1101 is formed by combining one or more storage requests, as described above; for example, the storage requests may be combined into a single atomic vector storage request that is implemented as a whole.

In some embodiments, data of the atomic storage request 1101 is stored contiguously in the log 1103, such that data that does not pertain to the atomic storage request 1101 is not interleaved with data of the atomic storage request 1101. The logical identifiers of the atomic storage request 1101, however, may be disjoint, non-adjacent, non-contiguous, out of order, or the like. Accordingly, while data of the atomic storage request 1101 is being appended to the log 1103, other data that does not pertain to the request 1101, such as groomer bypass data, data of other storage requests, and the like, may be suspended. In some embodiments, suspension is not required if write requests, including grooming, are processed utilizing the ordered queue 173, described above.

Figure 11B:
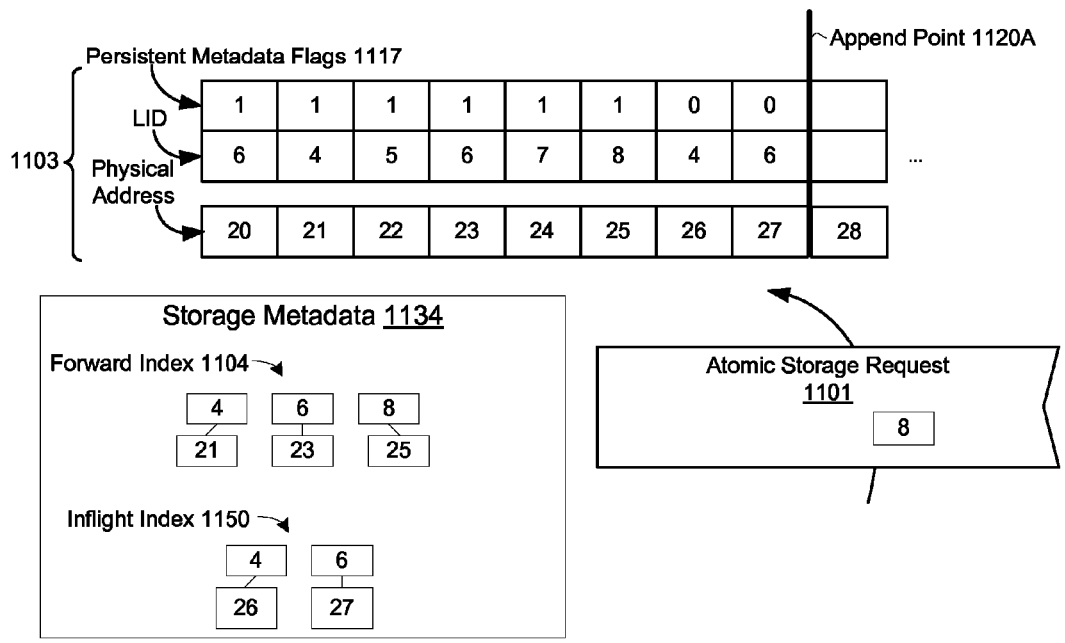

FIG. 11B depicts the state of the storage metadata 1134, inflight index 1150, and log 1103 while the atomic storage request 1101 is in process. In FIG. 11B, data of logical identifiers 4 and 6 have been appended to the log 1103 (e.g., programmed to a physical storage location(s), streamed to a program buffer, or the like). The inflight index 1150 tracks the progress of the atomic storage request 1101 (e.g., assigns the logical identifiers 4 and 6 to the physical storage locations 26 and 27 comprising data of the atomic storage request 1101).

Figure 11C:
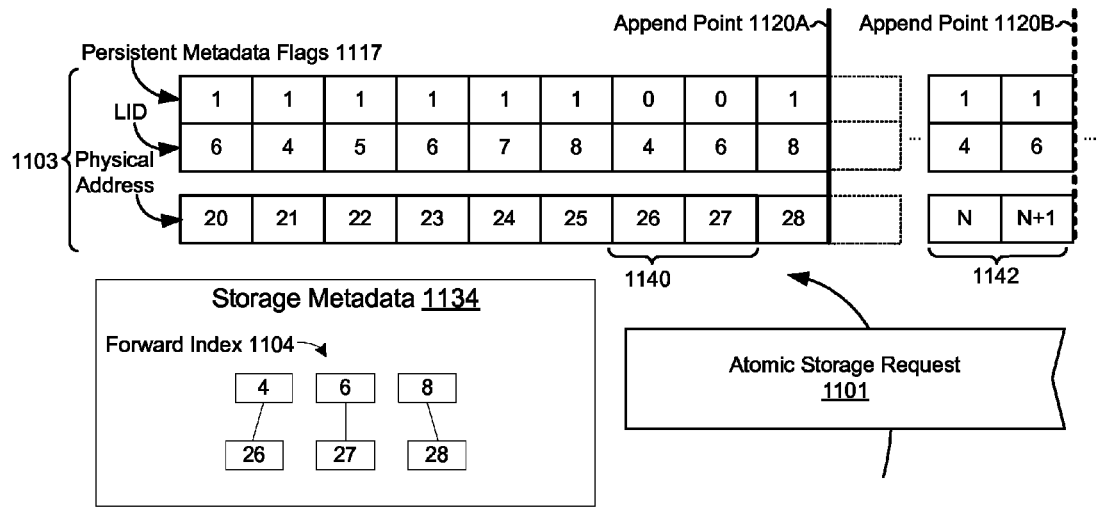

The persistent metadata flag 1117 stored with the data on physical storage locations 26 and 27 indicates that the physical storage locations 26 and 27 comprise data pertaining to an incomplete atomic storage operation because the first encountered persistent metadata flag 1117 is a "0" rather than a "1," reading in reverse log order (reading to the left from the append point 1120, as illustrated in FIG. 11B). If the first persistent metadata flag 1117 preceding the append point 1120A is set to a "1" (as shown in FIG. 11C), this indicates that the atomic storage operation was successfully completed. The persistent metadata flag 1117 may be stored with the data on the physical storage locations 26 and 27.

If a failure were to occur, the persistent metadata flags 1117 are used, together with the contiguous placement of data for the atomic storage request 1101 in the log 1103, to identify data pertaining to the incomplete atomic storage request 1101. When the event log 1103 of FIG. 11B is traversed in reverse log order (e.g., right to left as shown in FIG. 11B or, in other words, from the tail to the head of the sequence), the first persistent metadata flag 1117 will be a "0," indicating that the data pertains to a failed atomic storage request. The data at storage location 27 may, therefore, be invalidated and may not result in reconstructing invalid storage metadata 1134. The data may continue to be invalidated or ignored, until a "1" flag is encountered at physical storage location 25. This approach relies on data of the atomic storage request 1101 being stored contiguously in the log 1103. If data comprising a "1" persistent metadata flag 1117 were interleaved with the atomic storage data (before completion of the atomic storage request 1101), the data at 26 and/or 27 could be misidentified as being valid (e.g., pertaining to a complete atomic storage request 1101).

FIG. 11C depicts one embodiment of completion of the atomic storage request 1101. The final storage operation of the atomic storage request 1101 comprises a "1" flag indicating that the atomic storage request 1101 is complete. The forward index 1104 is updated to assign the logical identifiers 4, 6, and 8 with updated physical storage locations 26, 27, and 28. The inflight index is updated (the entries representing logical identifiers 4, 6, and 8 are removed) to indicate that the atomic storage request 1101 is no longer in process (e.g., is complete).

If a failure were to occur subsequent to persisting the data at physical storage location 28, the storage metadata 1134 could be correctly reconstructed. When traversing the event log 1103 in reverse sequence (e.g., moving left from the append point), the first persistent metadata flag 1117 encountered would be the "1" flag on the physical storage location 28, indicating that the data at physical storage locations 26 and 27 pertain to a successfully completed atomic storage request.

In some embodiments, the data of such an atomic storage request may be limited by storage boundaries of the non-volatile storage media 140 (e.g., page boundaries, logical page boundaries, storage divisions, erase blocks, logical erase blocks, etc.). Alternatively, the size of the data for an atomic storage request may require that the atomic storage request wait until the append point is on a storage division with sufficient free space to fit the atomic storage request before reaching a logical erase block boundary. Accordingly, the size of an atomic storage request may be limited to a logical page size. Additionally, in some embodiments, atomic storage requests do not cross logical erase block boundaries. In another example, the persistent metadata flag 1117 may comprise an identifier, which may allow data to be interleaved with atomic storage requests and/or allow atomic storage requests to be serviced concurrently. In some embodiments, data of atomic storage operations may be allowed to cross storage boundaries, as described below in conjunction with FIGS. 13-16C.

In some embodiments, the persistent metadata flags 1217A of data packets pertaining to atomic storage operations may be modified in response to grooming operations. For example, a grooming operation on a storage division 140 comprising physical addresses 26 and 27 comprising data of an atomic storage operation may comprise relocating the data to another storage division 1142 (data of logical identifiers 4 and 6). When the data is relocated after completion of the atomic storage operation, the persistent metadata flags 1117 of the corresponding data packets may be modified to indicate that the data is part of a complete atomic operation and/or a non-atomic operation, which may comprise updating the persistent metadata flags 1117 of the data packets to a "1" state. Accordingly, when storage metadata 135 is reconstructed from an updated append point 1120B, the relocated data on storage division 1142 will not be misidentified as being part of a failed and/or incomplete atomic storage operation.

In some embodiments, the groomer module 138 may be configured to control grooming operations on storage divisions that comprise persistent metadata indicating completion of atomic storage operation(s). The groomer module 138 may be configured to prevent such storage divisions from being groomed until other storage divisions comprising data of the corresponding atomic storage operation(s) have been relocated and/or updated to indicate that the atomic storage operation(s) are complete. As described in further detail below (in conjunction with FIGS. 13-16C) prohibiting grooming operations on such storage divisions may, inter alia, prevent loss of the completion indicators due to grooming failures.

The storage management layer 130 may be configured to manage subsequent storage operations pertaining to data of atomic storage operations. For example, an operation to TRIM data of logical identifier 8 may result in trimming (e.g., invalidating) the data packet at physical address 28, which indicates completion of the atomic storage request 1101. If the data packet at physical address 28 were to be completely invalidated and/or erased, the corresponding persistent metadata flag 1117 indicating completion of the atomic storage request 1101 may also be lost, which may allow the data at physical addresses 26 and/or 27 to be misidentified as being part of a failed and/or incomplete atomic storage operation. The storage layer 130 may be configured to implement TRIM operations, while preserving information pertaining to atomic storage operations (e.g., persistent metadata flags 1117). In response to the TRIM request, the storage management layer 130 may be configured to invalidate the data at physical address 28, while retaining the completion indicator (e.g., the persistent metadata flag 1117). The storage management layer 130 may be configured to invalidate the data within the index 404 and/or reverse index 506, while retaining storage metadata 135 indicating successful completion of the atomic storage operation. Accordingly, the storage management layer 130 may invalidate the data of logical identifier 8 while retaining the effect of the persistent metadata flag 1117 associated with the data.

In some embodiments, an operation trimming data comprises storing a persistent indicator corresponding to the trim operation (e.g., a persistent TRIM note, packet, or the like). During a restart and recovery operation, the restart recovery module 139 may be configured to exclude trimmed data in response to such indicators (e.g., exclude data stored at physical address 28 in response to a persistent indicator that the data was trimmed). The restart recovery module 139 may be further configured to preserve the persistent metadata of the invalidated data (e.g., apply and/or effectuate the persistent metadata flag 1117), such that the data of logical identifiers 4 and 6 (at physical addresses 26 and 27) are not misidentified as being part of a failed and/or incomplete atomic storage operation. Accordingly, the restart recovery module 139 may utilize the persistent metadata flag 1117 of the invalidated data, while excluding the data itself.

The disclosure is not limited to preserving persistent metadata 1117 through TRIM operations. As disclosed herein, a data packet may be invalidated in response to a number of different storage operations including, but not limited to: overwriting, modifying, and/or erasing the data. As disclosed above, performing any of these types of operations in relation to logical identifier 8 may result in invalidating the data stored at physical address 28 (e.g., the data comprising the persistent metadata flag 1117 indicating completion of the atomic storage request 1101). In response to any such operation, the storage management layer 130 and/or restart reconstruction module 139 may be configured to preserve the effect of the persistent metadata flag(s) 1117, while invalidating the corresponding data. As described above, preserving the persistent metadata flag(s) 1117 may comprise retaining storage metadata 135 indicating that data at physical address 28 is invalid, but that the corresponding atomic storage operation was successfully completed, excluding data at physical address 28 while preserving and/or applying the persistent metadata flag(s) at physical address 28, and so on. Accordingly, the storage management layer may be configured to invalidate a portion of data comprising persistent metadata flags 1117 indicating completion of the atomic storage request (a particular data packet, data segment, or the like), and to utilize the persistent metadata flags 1117 of the invalidated data despite the invalidation operation(s). Preserving the persistent metadata flags 1117 of the invalidated data may comprise identifying other data of the atomic storage request (e.g., other portions of data, such as data packets, data segments, or the like), as being part of a completed atomic storage request (or non-atomic storage request). Preserving the persistent metadata flags 1117 may further comprise the restart recovery module 139 excluding the invalidated portion of data, while identifying other portions of the corresponding atomic storage request as valid (e.g., by applying the persistent metadata flags 1117 of the invalidated data portion).

Figure 12A:
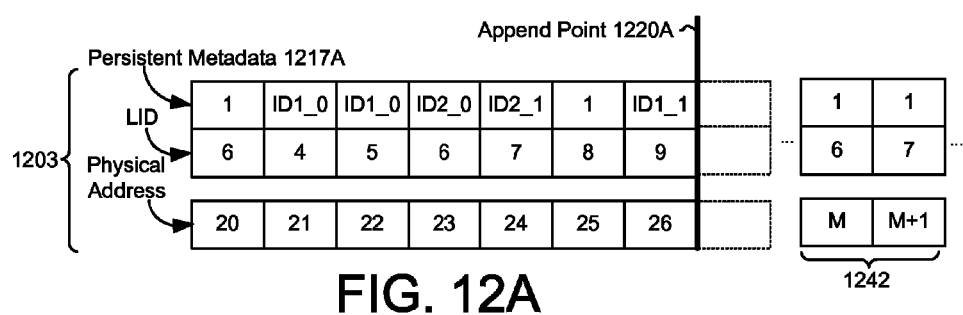
FIG. 12A depicts another embodiment of persistent metadata.

FIG. 12A depicts one example of a log 1203 comprising persistent metadata 1217A (e.g., persistent metadata flags). The log 1203 comprises data pertaining to two atomic operations having respective identifiers ID1 and ID2. ID1 corresponds to an atomic storage request pertaining to logical identifiers 4, 5, and 9, and ID2 corresponds to an atomic storage request pertaining to logical identifiers 6 and 7.

The ID1_0 persistent metadata flag 1217A on physical storage locations 21 and 22 identifies data pertaining to the atomic storage operation ID1 that has not yet been completed. The persistent metadata flag 1217A ID 1_1 on the physical storage location 26 indicates successful completion of the atomic storage operation ID1. Another persistent metadata flag 1217A ID2_0 identifies data pertaining to a different, interleaved atomic storage operation. The persistent metadata flag 1217A ID2_1 of physical storage location 24 indicates successful completion of the atomic storage request ID2. Data that does not pertain to an atomic storage operation may comprise a "1" persistent metadata flag 1217A or other predetermined identifier. When reconstructing storage metadata from the event log 1203 (at the append point 1220A), if an atomic storage request identifier comprising a "0" flag (e.g., ID1_0) is encountered before (or without) encountering a completion persistent metadata flag 1217A (e.g., ID1_1), all data associated with the persistent metadata flag 1217A ID1 may be invalidated. By contrast, after encountering the ID1_1 flag, all data associated with the ID1 persistent metadata flag 1217A may be identified as pertaining to a completed atomic storage request. The persistent metadata 1217A of data pertaining to atomic storage operations may be updated in response to grooming operations, as described above. Accordingly, relocating data of logical identifiers 6 and 7 to storage division 1242 after completion of the atomic storage operation ID2 may comprise updating the respective persistent metadata flags 1217A of the corresponding data packets to indicate that the data is part of a completed atomic storage operation (or non-atomic storage operation). Although the extended persistent metadata flags 1217A of FIG. 12A may provide for more robust support for atomic storage operations, they may impose additional overhead.

Figure 12B:
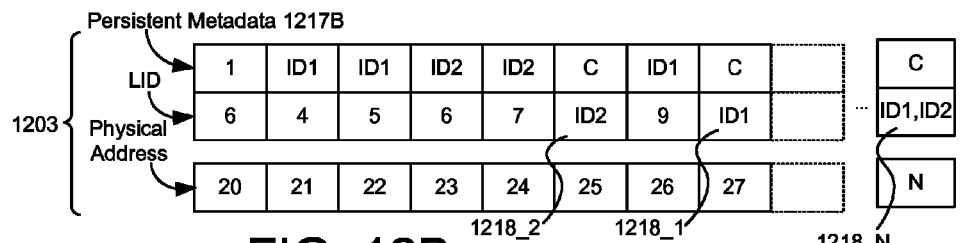
FIG. 12B depicts another embodiment of persistent metadata.

FIG. 12B depicts another embodiment of persistent metadata. As described above in conjunction with FIG. 12A, the log 1203 may comprise data pertaining to two atomic operations having respective identifiers ID1 and ID2, wherein ID1 corresponds to an atomic storage request pertaining to logical identifiers 4, 5, and 9, and ID2 corresponds to an atomic storage request pertaining to logical identifiers 6 and 7.

As indicated in FIG. 12B, data associated with logical identifiers 4, 5, and 9 may comprise and/or be associated with persistent metadata 1217B that indicates that the data pertains to the atomic storage operation ID1. In some embodiments, the persistent metadata 1217B may comprise persistent metadata flag(s) within a packet header. The disclosure is not limited in this regard, however; the persistent metadata 1217B may be embodied in other forms. In some embodiments, for example, the persistent metadata 1217B may be embodied in a persistent index, reverse index, separate data packet or segment, or the like.

In the FIG. 12B embodiment, completion of the atomic storage operations ID1 and ID2 may be indicated by persistent metadata 1218_1 and 1218_2. The persistent metadata 1218_1 and 1218_2 may be embodied as persistent metadata within the log 1203. The persistent metadata 1218_1 and/or 1218_2 may be embodied as separate data packets, data segments, persistent flags within other data packets, or the like. The completion indicators 1218_1 and/or 1218_2 may be configured to indicate completion of one or more atomic storage operations; the completion indicator 1218_1 may indicate completion of the atomic storage operation ID1 and the completion indicator 1218_2 may indicate completion of the atomic storage operation ID2. Accordingly, the completion indicators 1218_1 and/or 1218_2 may comprise and/or reference the identifier(s) of one or more completed atomic storage operations ID1 and ID2. Data of a failed and/or incomplete atomic storage operation may be detected in response to identifying data comprising an atomic storage operation identifier that does not have a corresponding completion indicator.

In some embodiments, the completion indicators 1218_1 and/or 1218_2 may be configured to indicate completion of an atomic storage operation regardless of the log order of the indicator(s) 1218_1 and/or 1218_2 within the log 1203. The atomic storage module 172 may be configured to append the persistent metadata 1218_1 and/or 1218_2 to the log 1203 in response to completing the respective atomic storage operations ID1 and/or ID2. Completion of an atomic storage operation may comprise transferring data of the atomic storage operation into a powercut- and/or crash-safe domain, such as the media controller 123, write buffer 244, media write buffer, queue 173 (described below), request buffer 1780 (described below), or the like. Accordingly, an atomic storage operation may be considered to be complete before all of the data pertaining the atomic storage operation has been actually written to the non-volatile storage medium 140, which may result in storing the completion indicator(s) 1218_1 and/or 1218_2 before data of the corresponding atomic operations within the log 1203. The restart recovery module 139 may be configured to apply and/or effectuate completion indicators 1218_1 and/or 1218_2 regardless of their order within the log 1203.

In some embodiments, completion indicators 1218_1 and/or 1218_2 may be consolidated. As described above, grooming data pertaining to an atomic operation may comprise modifying persistent metadata of the data, which may comprise updating persistent metadata flags 1217B to indicate that the data packets are part of a completed atomic storage operation and/or non-atomic storage operation. Grooming may further comprise combining and/or coalescing persistent metadata 1218_1 and/or 1218_2. For example, the persistent metadata 1218_1 and 1218_2 may be combined into a single persistent metadata entry (persistent note or data packet) 1218_N that indicates completion of a plurality of atomic storage operations (e.g., atomic storage operations ID1 and ID2). The persistent indicator(s) 1218_1, 1218_2, and/or 1218_N may be removed from the log 1203 in response to updating the persistent metadata 1217B of the data corresponding to the atomic storage operations (e.g., updating the respective persistent metadata flags 1217B of the data packets in grooming operation(s), as described above), such that the persistent indicator(s) are no longer required to determine that the corresponding atomic storage operations were successfully completed.

Figure 13A:
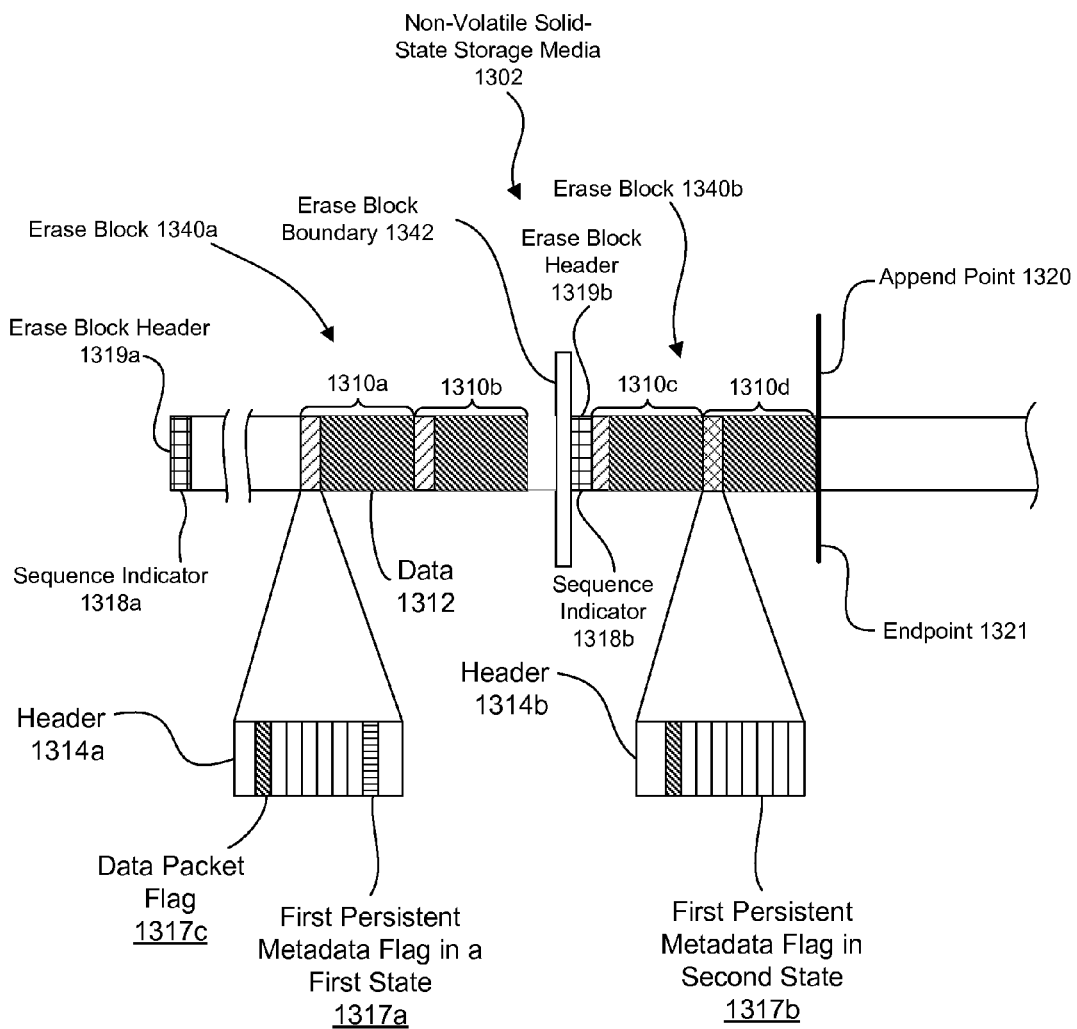
FIG. 13A depicts one embodiment of data of an atomic storage request spanning erase blocks of a non-volatile storage medium.

FIG. 13A is a diagram illustrating data of an atomic storage operation stored within multiple logical erase blocks 1340a-b of a non-volatile storage media 1302 in response to an atomic storage request. It should be noted that in connection with FIGS. 13-15 certain components are marked with the same fill pattern to identify these components throughout these figures, although, for simplicity and clarity, a reference number has not been placed on each such area.

As illustrated in FIG. 13A, two data packets 1310a-b are stored in a first logical erase block 1340a and two different data packets 1310c-d are stored in a second logical erase block 1340b. In the illustrated embodiment, all four of the data packets 1310a-d are stored as a result of a single atomic storage request (e.g., an atomic vector storage request). As indicated above, the append point 1320 indicates where additional data may be written to the storage media 1302.

Each logical erase block 1340a-b comprises two or more physical erase blocks (e.g., erase blocks 330, as depicted in FIG. 3). A logical erase block boundary 1342 separates each logical erase block 1340a-b. The logical erase block boundary 1342 may comprise a virtual or logical boundary between each logical erase block 1340a-b.

As illustrated in the embodiment of FIG. 13A, each data packet 1310a-d includes a header 1314a-b. Each header 1314a-b may comprise persistent metadata related to data 1312 within each packet 1310a-d. The data 1312 may comprise user data to be stored on and potentially retrieved from the storage media 1302 in response to requests by, for example, storage clients 118A-N. In some embodiments, a header 1314a and its associated data 1312 are both stored to the storage media 1302 in a single write operation (e.g., in a packet format 710).

In FIG. 13A, a header 1314a of a first data packet 1310a is illustrated. The header 1314a may comprise persistent metadata including various flags 1317a-c. For example, one or more bits of the header 1314a may comprise a data packet flag 1317c that, when set to a particular value, indicates when an associated data packet 1310a-d comprises user data. The position and number of the bits for each data packet flag 1317c within the header 1314a may be varied within the scope of the disclosed subject matter. Also, in one embodiment, the data packet flag 1317c may be located in the same position (i.e., the same bit position) within each header 1314a-b of each data packet 1310a-d.

The illustrated headers 1314a-b also include either a first persistent metadata flag in a first state 1317a or the first persistent metadata flag in a second state 1317b. The first persistent metadata flag 1317a-b may comprise a single bit within each header 1314a-b. For example, the first persistent metadata flag in the first state 1317a may comprise a particular bit position (such as the 56th bit) within a header 1314a set to a high value (a "1"), while the first persistent metadata flag in the second state 1317b may comprise the same bit position in a different header 1314b set to a low value (a "0"). Alternatively, the first persistent metadata flag in the first state 1317a may comprise a particular bit position within the header 1314a set to a low value, while the first persistent metadata flag in the second state 1317b may comprise the same bit position in a different header 1314b set to a high value. In one embodiment, the first persistent metadata flag in the first or second state 1317a-b may each comprise a pattern of multiple bits or separate and distinct bit positions. Use of a single bit within each packet 1310a-d, when data packets 1310a-d associated with an atomic storage request are stored contiguously, provides the advantage that a very small amount of data is used on the storage media 1302 to indicate whether an atomic write operation failed or succeeded.

As illustrated in FIG. 13A, each header 1314a of the first three data packets 1310a-c comprises the first persistent metadata flag in the first state 1317a, while the last data packet 1310d comprises the first persistent metadata flag in the second state 1317b. In one embodiment, each of data packets 1310a-c, except the last data packet 1310d, stored on the storage media 1302 pursuant to an atomic storage request comprises the first persistent metadata flag in the first state 1317a. As illustrated, the last packet 1310d includes the first persistent metadata flag in the second state 1317b, which signals the end or completion of data written pursuant to an atomic write request. This embodiment is advantageous in that only one bit within each packet 1310a-d is needed to signal whether an atomic storage request was completed successfully. The first persistent metadata flags in the first and second states 1317a-b indicate not only that the data 1312 of these packets 1310a-d pertain to an atomic storage request, but also identify a beginning and end, or successful completion, of the data associated with the atomic storage request.

However, a problem may arise if the third and fourth data packets 1310c-d of the second logical erase block 1340b are erased. Some background information may be helpful to understand this problem. For example, during a recovery or other process the event log (e.g., the data stored sequentially together with persistent metadata as illustrated in the event 1103 of FIG. 11) may be accessed to reconstruct a logical sequence of logical erase blocks 1340a-b (e.g., from head to tail). This may be achieved through a scan of the erase blocks 1340a-b and, in particular, through examination and processing of metadata and sequence indictors stored in the erase block headers 1319a-b of the event log 1103. The logical sequence of erase blocks 1340a-b may be formulated before performing recovery following an invalid shutdown or a restart operation (such as a shutdown resulting from a power failure) using either a forward or reverse sequence scan of the logical erase blocks 1340a-b stored on the media 1302. After the logical sequence of erase blocks 1340a-b has been formulated, reverse sequence scanning the event log 1103 or logical sequence of logical erase blocks 1340a-b based on the event log 1103 from the append point 1320 (i.e., the tail) in reverse sequence toward the head or beginning of the log 1103, in certain embodiments, is initiated to identify failed atomic requests. In such a case (if third and fourth data packets 1310c-d of the second logical erase block 1340b are erased), the reverse sequence scanning from an append point 1320 could erroneously identify the first and second data packets 1310a-b as being associated with a failed atomic storage request because the first encountered packet 1310b does not include the first persistent metadata flag in the second state 1317b. Accordingly, in one embodiment, grooming or deletion of a logical erase block 1340b that includes an endpoint 1321 is prohibited.

As used in this application, an endpoint 1321 may comprise the point immediately after the last packet 1310d, which may be stored or identified in a volatile memory. Alternatively, the final or last packet 1310d of an atomic write operation may comprise the endpoint.

As an alternative to prohibiting grooming or deletion of a logical erase block 1340b that includes an endpoint 1321, an incorrect determination that the first and second data packets 1310a-b relate to a failed atomic storage request is avoided by reference to sequence indicators (such as the sequence indicators 718 illustrated in FIG. 7). As noted above, the sequence indicators 718 identify or specify a log order of physical storage locations (e.g., erase blocks) 1340a-b. In particular, in one embodiment, sequence indicators 1318a-b of each erase block header 1319a-b comprise monotonically increasing numbers spaced at regular intervals. In view of the foregoing, if a sequence indicator 1318b for a next logical erase block 1340b in the event log 1103, moving from left to right (from the head to the tail of logical chain of erase blocks, as specified by the event log 1103), is not a next sequence number in the sequence, then, for example, the storage management layer 130 recognizes that prior logical erase block 1340a does not end with a failed atomic request, i.e., the first and second packets 1310a-b do not comprise a part of a failed atomic write.

Figure 14:
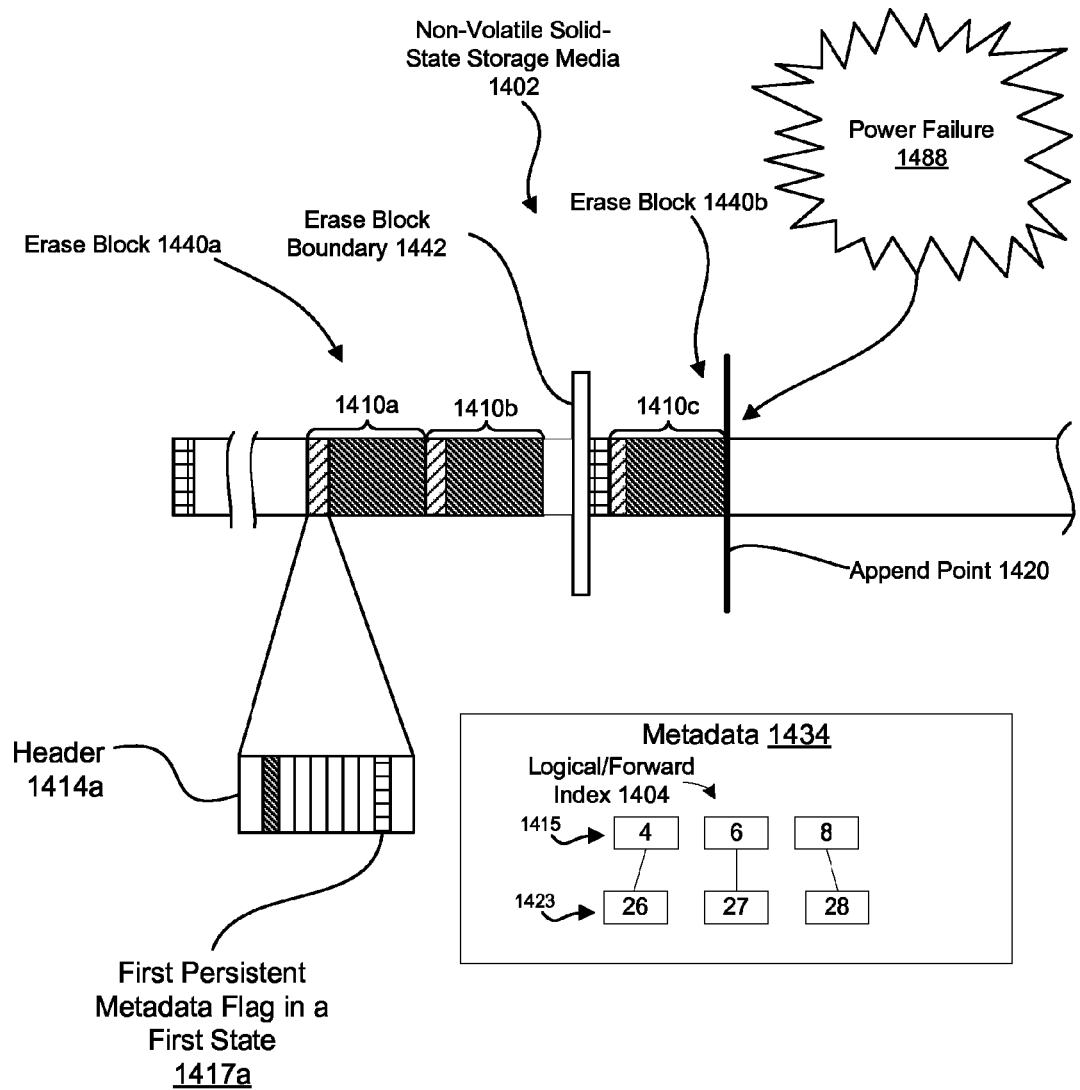
FIG. 14 depicts a failed atomic write that spans an erase block boundary of a non-volatile storage medium.

FIG. 14 illustrates a failed atomic write to a non-volatile solid-state storage media 1402 that spans a logical erase block boundary 1442. As indicated in FIG. 14, the atomic write request, in the illustrated case, failed because of a power failure 1488. A power failure 1488 may comprise any event that can cause the loss of data stored within volatile memory of a system, apparatus, or computing device (e.g., a hard reset or other interruption of power). The power failure 1488 may comprise a power failure 1488 of a primary power source of a computing device 110 and/or the storage controller 120. Alternatively, the atomic write may have failed for other reasons. As shown in FIG. 14, the first and second data packets 1410a-b may be stored in the first logical erase block 1440a and a third data packet 1410c may be stored in a second logical erase block 1440b. Each of the data packets 1410a-c comprises a persistent metadata flag in a first state 1417a; FIG. 14 illustrates a persistent metadata flag 1417a in the header 1414a of packet 1410a. The last packet 1410c shown in FIG. 14 does not include a persistent metadata flag in a second state 1317b, indicating that the atomic write at issue was not successfully completed. As a consequence, if a reverse sequence scan of the storage media 1402 is initiated from, or based on, the append point 1420 during a restart recovery, the packets 1410a-c will be identified as comprising part of a failed atomic write. Accordingly, the data packets 1410a-c will be excluded from (i.e., removed from or otherwise not included in) a logical or forward index 1404 that maps logical identifiers 1415 to physical locations or addresses 1423 of the data packets 1410a-c of the storage media 1402. As indicated above, index 1404 may be contained in or derived from the metadata 1434 stored on the non-volatile solid-state storage media 1402.

In some embodiments, excluding from the index 1404 may comprise bypassing each data packet 1410a-c associated with the failed atomic storage request during a scan of a log-based structure (e.g., the event log 1103 illustrated in FIGS. 11A-C or the ordered sequence of logical erase blocks 1440a-b specified by the log 1103) used to create the index 1404. In another embodiment, excluding from the index 1404 may further comprise removing each logical identifier 1415 that maps to each data packet 1410a-c associated with the failed atomic storage request from the index 1404 created by way of a scan of the log-based structure. In yet another embodiment, excluding from the index 1404 may further comprise erasing each data packet 1410a-c associated with the failed atomic storage request from the storage media 1402 by way of a storage space recovery operation (which will be explained further below). Of course, one or more of the foregoing embodiments may be combined or used with other embodiments for excluding the data packets 1410a-c from the index 1404.

Figure 15:
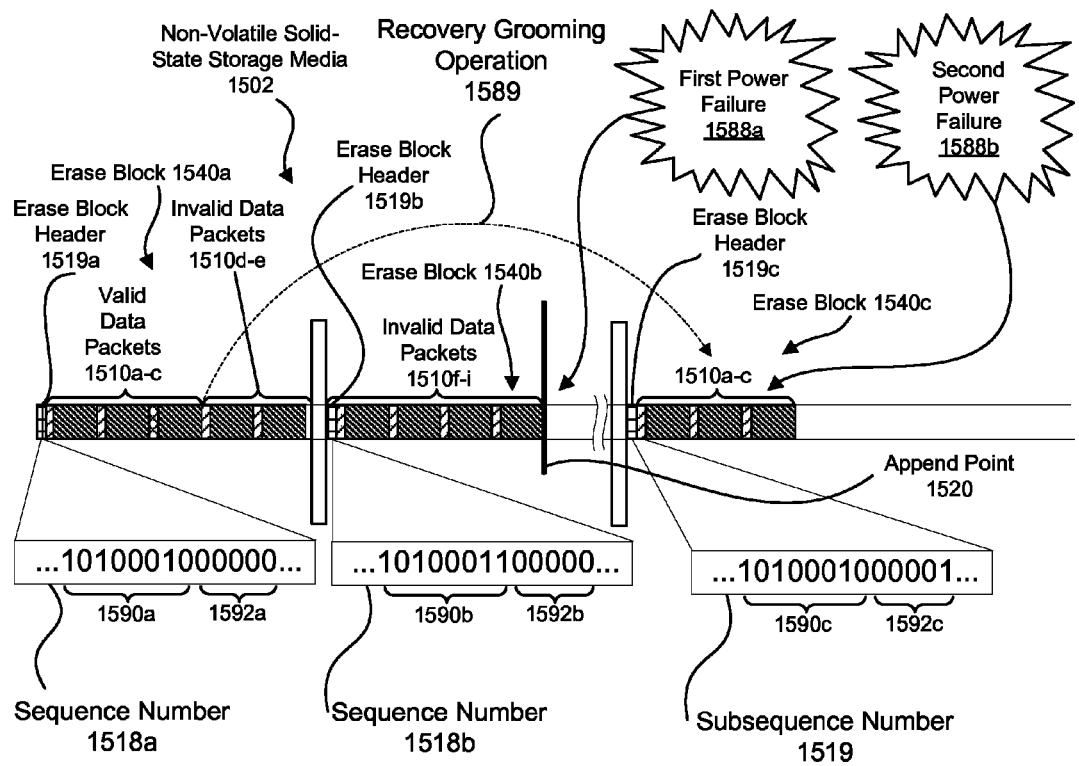
FIG. 15 depicts one embodiment of a restart recovery process.
Figure 15:
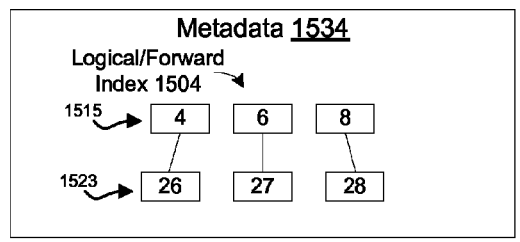

FIG. 15 comprises a diagram illustrating a restart recovery process related to a first power failure 1588a and a second power failure 1588b. As illustrated in FIG. 15, a first power failure 1588a interrupts an atomic write operation such that data packets 1510d-e, 1510f-i associated with the failed atomic write are stored on the non-volatile solid-state storage media 1502. During a restart recovery operation, such as during a subsequent power-on operation, an ordered sequence of logical erase blocks 1540a-c (e.g., the ordered sequence of erase blocks in the log) are formulated using metadata 1534 stored on the storage media 1502. An append point 1520 is identified at the end of the ordered sequence of logical erase blocks 1540a-c. Thereafter, reverse sequence scanning of the ordered sequence of logical erase blocks 1540a-b (or the log 1103) will be initiated from the append point 1520 to identify data packets 1510d-e, 1510f-i associated with a failed atomic request. As a consequence, data packets 1510d-e of the first logical erase block 1540a and data packets 1510f-i of the second logical erase block 1540b will be identified as being associated with a failed atomic write operation. As indicated above, this may occur, for example, by determining that the first packet found in the reverse sequence scan (i.e., data packet 1510i) satisfies a failed atomic write criteria (e.g., includes a first persistent metadata flag in a first state 1417a, as explained in connection with FIG. 14). Thereafter, the remaining data packets 1510d-e, 1510f-h of the failed atomic storage request will be identified as being associated with the failed atomic storage request because, for example, each of these packets 1510d-e, 1510f-h also includes the first persistent metadata flag in the first state 1417a.

Thereafter, a recovery grooming operation 1589 may be initiated to transfer the valid data packets 1510a-c (but not the invalid data packets 1510d-e) from the first logical erase block 1540a to the third logical erase block 1540c. More specifically, the grooming operation 1589, for example, may involve transfer of valid packets 1510a-c from the first logical erase block 1540a to the third logical erase block with a newly assigned sequence number (e.g., a logical erase block immediately after the append point 1520), while data packets 1510d-e, 1510f-i that are associated with a failed atomic write are not transferred to the logical erase block with the newly assigned sequence number. The recovery grooming operation 1589 may be performed as part of a storage recovery operation, in response to a storage request (e.g., a request to TRIM and/or erase data on the erase block 1540a, or the like).

As noted above, a sequence number 1518a-b may be assigned to each erase block 1540a-c. The sequence numbers 1518a-b may be stored in logical erase block headers 1519a-b, as illustrated in FIG. 15, or at another location on the non-volatile solid-state storage media 1502. The sequence numbers 1518a-b are utilized to create an ordered sequence of the logical erase blocks 1540a-c. The ordered sequence may be identified or specified by the log 1103. The sequence numbers 1518a-b for each logical erase block 1540a-c, in one embodiment, are spaced at regular intervals. For example, a consecutive series of logical erase blocks 1540a-c may be assigned the following sequence numbers: 1, 65, 129, 193, 257, 321, 385, and 449. When it is determined that a new logical erase block 1540c needs be to utilized for the storage of data, the new logical erase block 1540c may be assigned the next available sequence number 1518a-b in the series of sequence numbers 1518a-b. Accordingly, in such an embodiment, if the last sequence number assigned to a logical erase block is the sequence number 385, a newly assigned erase block 1540c may be assigned the sequence number 449. Of course, in alternative embodiments, spacing between the sequence numbers 1518a-b may be at an interval other than 64 (such as 32) or at irregular or varying intervals. Also, the sequence numbers 1518a-b may be assigned in the cyclic fashion such that when the highest sequence number is utilized (given the number of bits of metadata 1534 allocated for the sequence numbers 1518a-b), the lowest sequence number no longer in use may be assigned to a newly identified erase block 1540c.

In view of this background, as illustrated in FIG. 15, during the recovery grooming operation 1589, which is intended to transfer the valid data packs 1510a-c from the first logical erase block 1540a to the third logical erase block, a second power failure 1588b may occur, resulting in a failure of the grooming operation 1589. Accordingly, a technique for identification of such a failure would be helpful to prevent use of the invalid or partially written data 1510a-c saved in the third logical erase block 1540c or confusion as to whether the data in the first logical erase block 1540a or the third logical erase block 1540c should be utilized.

One such technique involves assigning a subsequence number 1519 (rather than a sequence number 1518a-b) to the logical erase block 1540c to which the valid data 1510a-c will be or is intended to be transferred. As indicated above, in one embodiment, the sequence numbers 1518a-b are spaced at regular intervals, such as at intervals of 64 or at intervals of 32, as illustrated in FIG. 15. For example, consecutive sequence numbers may increment the most significant bits 1590a-b of a fixed size sequence number by a particular increment, while leaving the least significant bits 1592a-b unchanged. The subsequence number 1519 may be derived from a sequence number 1518a by incorporating the most significant bits 1590a of the sequence number 1518a from which the subsequence number 1519 is derived and altering (such as incrementing or decrementing) the least significant bits 1592a of the sequence number 1518a. As illustrated in FIG. 15, the subsequence number 1519 may incorporate the most significant bits 1590a of the first sequence number 1518a and increment the least significant bits 1592a of the first sequence number 1518a, to yield the subsequence number 1519 (e.g., 1010001000001) comprising the same high-order bits 1590c and incremented low-order bits 1592c. By assigning the subsequence number 1519 to the third logical erase block 1540c, the sequencing order of the erased blocks 1540a-c is maintained because the subsequence number 1519 is greater than the first sequence number 1518a from which the subsequence number 1519 is derived, and is less than the next sequence number 1518b. Accordingly, the subsequence number 1519 maintains an ordered sequence among logical erase blocks 1540a-c of the log-based structure (e.g., the log 1103 illustrated in FIGS. 11A-C) such that an ordered sequence of storage operations completed on the storage media 1502 is preserved on the storage media 1502.

It should also be noted that a subsequence number 1519 may be derived in various ways from a sequence number 1518a. For example, a subsequence number 1519 could decrement the most significant bits 1590a of the first sequence number 1518a from which the subsequence number 1519 is derived and increment the least significant bits 1592a of the sequence number 1518a from which the subsequence number 1519 is derived.

In due course, all of the data packets 1510a-c, 1510d-e of the first logical erase block 1540a will be erased, including erase block header 1519a, from the storage media 1502 if the grooming operation 1589 were completed successfully. However, erasure of the data packets 1510a-c, 1510d-e and the erase block header 1519a of the first logical erase block 1540a may not occur immediately if the grooming operation 1589 is completed successfully. Moreover, if the second power failure 1588b occurs during grooming (e.g., while relocating the valid data 1510a-c from the first logical erase block 1540a to the third logical erase block 1540c), the data packets 1510a-c in the third logical erase block 1540c could potentially be corrupt or incomplete.

Accordingly, during a power-on operation following the second power failure 1588b, a restart recovery process may be initiated. During the restart recovery process, the log will be created to formulate an ordered sequence of the logical erase blocks 1540a-c. During this process, it may be determined that the first logical erase block 1540a has been assigned the first sequence number 1518a and the third logical erase block 1540c has been assigned the subsequence number 1519 derived from the first sequence number 1518a. As explained above, this may indicate that either the data of the first logical erase block 1540a was not erased or that a grooming operation was interrupted. In either case, the data packets 1510a-c of the third logical erase block 1540c are potentially corrupted or incomplete and should not be relied on as being valid. As a result, the data packets 1510a-c, erase block header 1519c, and any other data stored in the third logical erase block 1540c should be erased or scheduled for erasure and should be excluded from the index 1504. (As indicated previously, the index 1504 maps logical identifiers 1515 to physical locations or addresses 1523 and may comprise or be based on metadata 1534 stored on the media 1502.)

Thereafter, the append point 1520 would be positioned immediately to the right of invalid data packet 1510i, as shown in FIG. 15. Reverse sequence scanning of the non-volatile storage media 1502 from the append point 1520 would be commenced and would identify data packets 1510d-e of the first logical erase block 1540a and data packets 1510f-i of the second logical erase block 1540b as comprising a portion of a failed atomic write operation as a result of the first power failure 1588a. The valid data packets 1510a-c of first logical erase block 1540a will be groomed 1589 to the third logical erase block 1540c without transferring the invalid data packets 1510d-e to the third logical erase block 1540c. In one embodiment, when the valid data packets 1510a-c are groomed 1589 to the third logical erase block 1540c, the first persistent metadata flag for each of the valid data packets 1510a-c is set to a second state 1317a.

In view of the foregoing, it should also be observed that excluding from the forward or logical index 1504 during a restart recovery may comprise erasing each logical erase block 1540a-b of the non-volatile solid-state storage media 1502 comprising one or more data packets 1510d-e, 1510f-i associated with the failed atomic storage request and transferring data packets 1510a-c (e.g., valid data packets) from the each logical erase block 1540a-b to a different location or logical erase block 1540c on the storage media 1502. Also, erasing each logical erase block during restart recovery may comprise assigning a subsequence number 1519 to a destination logical erase block 1540c configured to store transferred data packets 1510a-c (i.e., valid data 1510a-c). Further, erasing each logical erase block 1540a-c during a restart recovery process may comprise, in response to identifying a first logical erase block 1540a having a sequence number 1518a and a third logical erase block 1540c having a subsequence number 1519, grooming 1589 the first logical erase block 1540a and, as described above, excluding each data packet 1510d-e of the first logical erase block 1540a associated with the failed atomic storage request from the index 1504. Again, the invalid data packets 1510d-e of the first logical erase block 1540a may immediately or eventually be erased from the media 1502 after the grooming operation 1589 is performed.

The recovery grooming operation 1589, if completed before normal input-output operations commence, in one embodiment, avoids a scenario in which data packets 1510d- e, 1510f-i associated with a failed atomic write operation could be considered valid because those data packets are removed from the media 1502 by the recovery grooming operation 1589. The following example illustrates this point.

First, a failed atomic write operation commences and is interrupted, resulting in the invalid data packets 1510d-e, 1510f-i being stored on the storage media 1502. Second, a power-on operation is performed and, through a scan, the event log 1103 is formulated without engaging in the recovery grooming operation 1589 such that the invalid data packets 1510d-e, 1510f-i are included in the event log 1103 and forward index 1504. Third, a second atomic write operation is commenced and successfully completed. Finally, a reverse-sequence scan from the append point 1520 (which is positioned after the data packets associated with the second successful atomic write operation) is subsequently initiated to identify packets associated with a failed atomic write operation. In this scenario, the invalid packets 1510d-e, 1510f-i will not be identified and removed from the storage media 1502. This is because the reverse sequence scanning from the append point 1520 will encounter the packets associated with the second successful atomic write operation, and determine that the second atomic write operation was successfully completed. In certain embodiments, identifying the second successful atomic write operation may result in termination of the reverse sequence scanning and the invalid data packets 1510d-e, 1510f-i will not be identified as being associated with a failed atomic write operation. Accordingly, the invalid data packets 1510d-e, 1510f-i will not be removed, or otherwise excluded, from the forward index 1504 or from the storage media 1502.

Figure 13B:
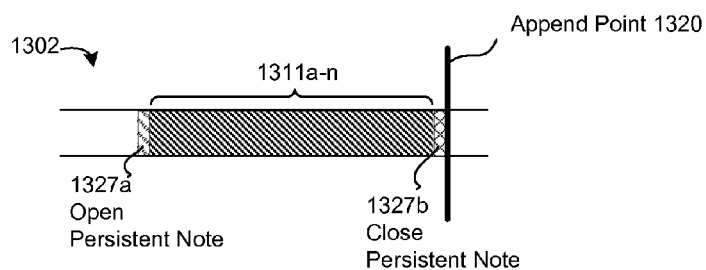
FIG. 13B depicts one embodiment of persistent notes for managing atomic storage operations.

Although FIGS. 8B, 13A, 14, and 15 depict embodiments for managing atomic storage operations using, inter alia, persistent metadata flags (e.g., persistent metadata flags 1317a, 1317b, 1417a, and so on), the disclosure is not limited in this regard. The embodiments disclosed herein may be adapted to use other mechanisms for managing atomic storage operations. For example, in some embodiments, an atomic storage operation may comprise storing one or more persistent notes on the non-volatile storage medium (e.g., in the log). An "open" persistent note may indicate the start of an atomic operation, and a "close" persistent note may indicate completion of the atomic storage operation. Packets of the atomic storage operation may be stored contiguously between the "open" and "close" persistent notes. If a "close" persistent note is not found, packets after the "open" persistent note may be identified as part of an incomplete atomic storage operation, and may be excluded, as described above. FIG. 13B depicts one embodiment of persistent notes for managing an atomic storage operation. The persistent note 1327a identifies the beginning of an atomic storage operation on the non-volatile storage medium (log) 1302. Accordingly, the packets 1311a-n following the open persistent note 1327a are identified as part of an atomic storage operation. A close persistent note 1327b may be stored on the non-volatile storage medium 1302 in response to completion of the atomic storage operation. If an open persistent note 1327a is not closed with a corresponding close persistent note 1327b, the packets 1311a-n may be identified as being part of an incomplete atomic storage operation and excluded as described above.

In some embodiments, the packets 1311a-n may comprise respective headers, as described above (e.g., headers 1314a-b). The headers may comprise persistent metadata indicating that the packets 1311a-n are part of an atomic storage operation. Alternatively, persistent flags indicating membership in an atomic storage operation may be omitted, since this information may be determined based upon the open persistent note 1327a. However, in some embodiments, a persistent flag indicating membership in the atomic storage operation may be included (e.g., a persistent metadata flag in a first state 1317a). Other packets that are not part of the atomic storage operation may be interleaved with the packets 1311a-n. These packets may comprise respective persistent metadata flags to indicate that the packets are not part of the atomic storage operation (e.g., persistent metadata flags in a second state 1317b). Accordingly, when excluding packets due to a failed or incomplete atomic storage request, the interleaved packets that were not part of the atomic storage operation may be retained (not excluded, as described above).

The embodiments disclosed herein may be configured to efficiently process vector storage requests. As disclosed herein, a vector storage request refers to a storage request pertaining to one or more vectors (I/O vectors). A vector may pertain to a group, set, and/or range of identifiers (e.g., logical identifiers, physical addresses, buffer addresses, or the like). A vector may be defined in terms of a base identifier (e.g., starting point) and length, range, and/or extent. Alternatively, a vector may be defined in set notation (e.g., a set of one or more identifiers or ranges of identifiers). A vector storage request may, therefore, refer to a storage request comprising a plurality of "sub-requests" or "subcommands," each of which pertains to a respective one of the vectors. For example, a vector write operation may comprise writing data to each of a plurality of vectors, each vector pertaining to a respective logical identifier range or extent. As described above in conjunction with FIGS. 8A and 8B, the storage controller 120 may be configured to store data of vector storage requests contiguously within a log on the non-volatile storage media 140. Therefore, data packets pertaining to disjoint, non-adjacent, and/or non-contiguous vectors with respect to the logical address space 134 may be stored contiguously within the log on the non-volatile storage media 140.

The storage management layer 130 may provide an interface through which storage clients may issue vector storage requests. In some embodiments, the vector storage request interface provided by the storage management layer 130 may include, but is not limited to, API, library, remote procedure call, user-space API, kernel space API, block storage interface or extension (e.g., IOCTL commands and/or extensions), or the like. A vector may be defined as a data structure, such as:

```
struct iovect {
    uint64 iov_base;   // Base address of memory region for input or
                       output
    uint32 iov_len;    // Size of the memory referenced by iov_base
    uint64 dest_lid;   // Destination logical identifier
}
```

The iov_base parameter may reference a memory or buffer location comprising data of the vector, iov_len may refer to a length or size of the data buffer, and dest_lid may refer to the destination logical identifier(s) for the vector (e.g., base logical identifier, the length of the logical identifier range may be implied and/or derived from the input buffer iov_len).

A vector storage request to write data to one or more vectors may, therefore, be defined as follows:

```
vector_write(
    int fileids,
    const struct iovect *iov,
    uint32 iov_cnt,
    uint32 flag)
```

The vector write operation above may be configured to gather data from each of the vector data structures referenced by the *iov pointer and/or specified by the vector count parameter (iov_cnt), and write the data to the destination logical identifier(s) specified in the respective iovect structures (e.g., dest_lid). The flag parameter may specify whether the vector write operation should be implemented as an atomic vector operation.

As illustrated above, a vector storage request may comprise performing the same operation on each of a plurality of vectors (e.g., implicitly perform a write operation pertaining to one or more different vectors). In some embodiments, a vector storage request may specify different I/O operations for each constituent vector. Accordingly, each iovect data structure may comprise a respective operation indicator. In some embodiments, the iovect structure may be extended as follows:

```
struct iovect {
    uint64 iov_base;    // Base address of memory region for input or
                        output
    uint32 iov_len;     // Size of the memory referenced by iov_base
    uint32 iov_flag;    // Vector operation flag
    uint64 dest_lid;    // Destination logical identifier
}
```

The iov_flag parameter may specify the storage operation to perform on the vector. The iov_flag may specify any suitable storage operation, which include, but is not limited to, a write, a read, an atomic write, a trim or discard request, a delete request, a format request, a patterned write request (e.g., request to write a specified pattern), a write zero request, or an atomic write operation with verification request, allocation request, or the like. The vector storage request interface described above, may be extended to accept vector structures:

```
vector_request(
    int fileids,
    const struct iovect *iov,
    uint32 iov_cnt,
    uint32 flag)
```

The flag parameter may specify whether the vector operations of the vector_request are to be performed atomically.

Figure 16A:
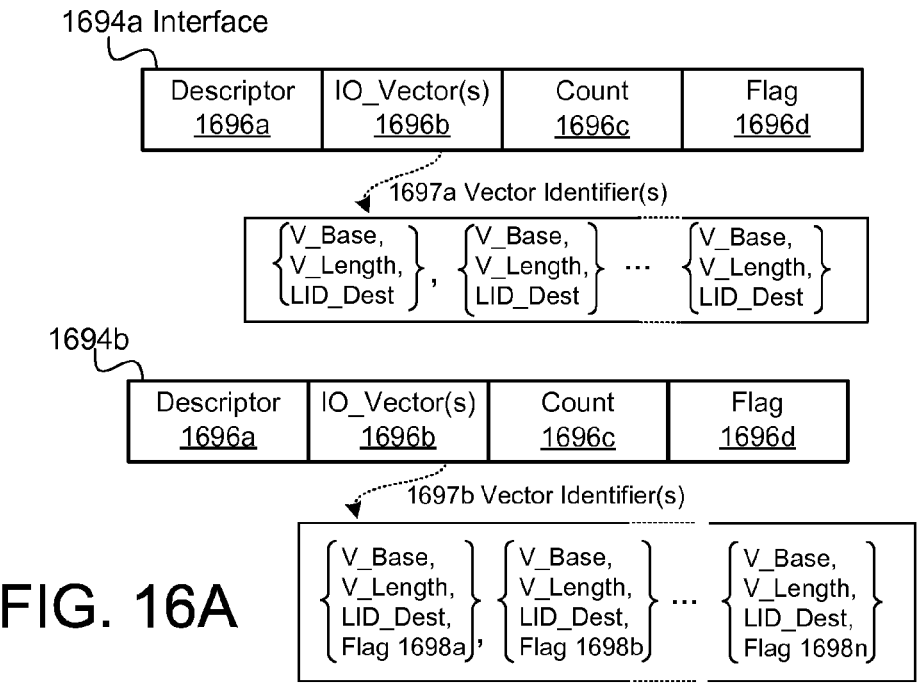
FIG. 16A depicts embodiments of interfaces for storage requests.

FIG. 16A depicts exemplary interfaces 1694a and 1694b for vector storage requests. As described above, the vector storage requests disclosed herein may be atomic or non-atomic (as indicated by a flag parameter). An atomic vector storage request may comprise a request to perform one or more storage operations on one or more vectors as an atomic operation (all operations are completed on each vector, or none of the vectors). Alternatively, a vector storage request may be non-atomic (e.g., each vector operation may be implemented and/or completed independently). The interfaces 1694a and/or 1694b may be utilized by storage client 118A-N to request vector storage operations via the storage management layer 130. The parameters 1696a-d of the interfaces 1694a-b may be arranged in any suitable order, may be provided in any suitable format, and may be adapted for use with any suitable programming language and/or interface. Moreover, the interfaces 1694a-b may include other parameters not specifically identified in FIG. 16A. The interfaces 1694a-b may be implemented within one or more existing interfaces (e.g., a block device interface) or may be provided as extensions to an existing application program interface and/or as part of a separate application program interface. A descriptor parameter 1696a may comprise a reference and/or handle to a storage entity pertaining to a request. The descriptor 1696a may comprise and/or reference a file descriptor, file identifier, file name, database entity identifier, or the like. The IO_Vector(s) parameter 1696b may reference one or more vector storage operations. The IO_Vector(s) parameter 1696b may comprise and/or reference a set or list of vector identifiers 1697a. The vector identifiers 1697a may specify memory and/or buffer addresses pertaining to a vector storage operation using, for example, a base identifier, "V_Base," which may comprise a source address, source LID, or the like, and length "V_Length," which may comprise a range, extent, or other length and/or size indicator. The LID_Dest parameter may specify a source of the vector operation (e.g., write the data of V_Length from V_Base starting at LID_Dest). Accordingly, each IO_Vector 1696b may define a vector storage request, as described above (e.g., a subcommand or suboperation of a vector storage request).

The IO_Count 1696c parameter may specify the number of vector storage operations encapsulated within the IO_Vector 1696b (e.g., the number of vector identifiers 1697a). The flag parameter 1696d may identify the storage operation to be performed on the IO_Vector(s) 1696b. The flag parameter 1696b may specify any storage operation, including, but not limited to, a write, a read, an atomic write, a trim or discard request, a delete request, a format request, a patterned write request (e.g., request to write a specified pattern), a write zero request, or an atomic write operation with verification request, allocation request, or the like. The atomic write operation with verification request completes the atomic write operation and then verifies that the data of the request was successfully written to the storage media. As illustrated above, the flag parameter 1696d may specify either atomic or non-atomic storage operations.

The storage operation specified by the flag 1696d may be implemented on each of the IO_Vector(s) 1696b. Accordingly, the interface 1694 may be used to minimize the number of calls needed to perform a particular set of operations. For example, an operation to store data pertaining to several contiguous or disjoint, non-adjacent, and/or non-contiguous ranges may be encapsulated into a single vector storage request through the interface 1696a. Moreover, the use of a flag parameter 1696d provides flexibility such that the interface 1694a may be utilized for various purposes, such as atomic writes, a trim or discard request, a delete request, a format request, a patterned write request, a write zero request, or an atomic write operation with verification request.

In some embodiments, an interface 1694b may provide for specifying a different storage operation for each IO_Vector 1696b. The interface 1694b may include vector identifier(s) 1697b comprising respective flag parameters 1698a-n. The flag parameter(s) 1698a-n may specify a storage operation to perform on a particular IO_Vector 1696*b*; the flag parameters 1698*a-n* may be different for each IO_Vector 1696*b*. Accordingly, the interface 1694*b* may be configured to implement vector storage operations, such that each sub-request and/or sub-operation of the vector storage request may involve a different type of storage operation. For example, the flag 1698*a* of a first IO_Vector 1696*b* may specify a TRIM operation, the flag 1698*b* of second IO_Vector 1696*b* may specify a write operation, and so on. The interface 1694*b* may comprise a top-level flag parameter 1696*d*, which may be used to specify default and/or global storage flag parameters (e.g., specify that the vector storage request is to be performed atomically, as described above).

In some embodiments, one or more of the operations of a vector storage request may comprise operations that do not directly correspond to storage operations on the non-volatile storage media 140. For example, the vector storage request may comprise a request to allocate one or more logical identifiers in the logical address space 134 (e.g., expand a file), deallocate logical identifiers (e.g., TRIM or delete data), and so on. If the vector storage request is atomic, the allocation/deallocation operation(s) may not be reflected in the storage metadata 135 until other operations of the atomic vector storage request are complete. In another example, a TRIM subcommand may comprise modifying the storage metadata 135 to indicate that data of one or more logical identifiers no longer needs to be preserved on the non-volatile storage media 140. Modifying the storage metadata 135 may comprise removing one or more entries from a forward index, invaliding one or more packets, and so on. These metadata operations may not be reflected in the storage metadata 135 until other operations of the request are complete (e.g., index entries may not be removed until other operations of the atomic storage request are complete). In some embodiments, the allocation, deallocation, and/or TRIM operations may be maintained in inflight metadata 175 until completion of the atomic vector storage request, as described above.

In some embodiments, flags 1696*d* and/or 1698*a-n* may specify an order of the vector storage request. For example, the flags 1696*d* and/or 1698*a-n* may indicate that operations of the vector storage request are to be completed in a particular order and/or may be completed out-of-order. Ordering of the vector storage requests may be enforced by the storage management layer 130 by use of the ordered queue 173, a request buffer (described below), or the like.

Figure 16B:
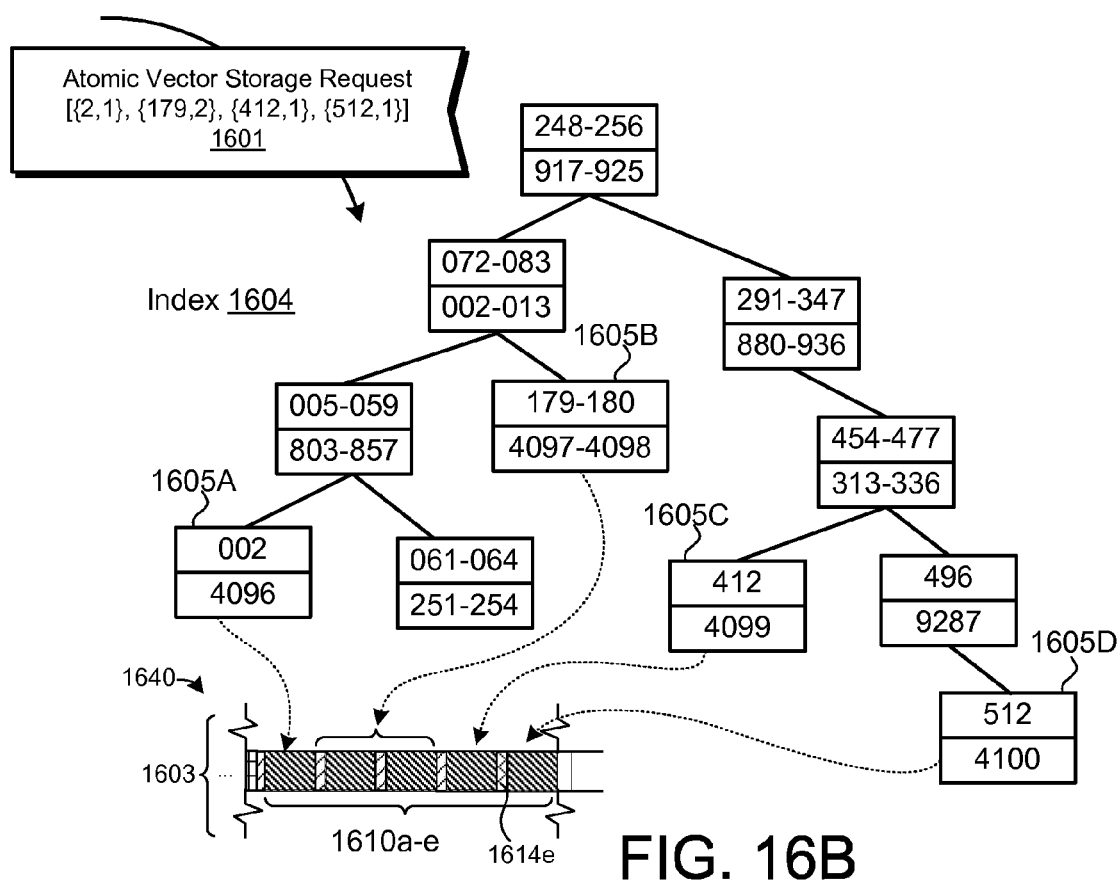
FIG. 16B depicts one embodiment of an atomic vector storage operation.

As described above in conjunction with FIGS. 8A and 8B, the storage controller 120 may be configured to store data packets pertaining to disjoint, non-adjacent, and/or non-contiguous logical identifier ranges (vectors) contiguously within a log on the non-volatile storage media 140. FIG. 16B depicts execution of an atomic vector storage request 1601, which comprises appending data packets to a log on a non-volatile storage media 140. In the FIG. 16B example, an atomic vector storage request 1601 may specify atomic write operations pertaining to a plurality of vectors, including a vector at LID 2, length 1; a vector at LID 179, length 2; a vector at LID 412, length 1; and a vector at LID 512, length 1. As illustrated in the index 1604, the vectors of the request 1601 correspond to disjoint, non-adjacent, and non-contiguous ranges with respect to the logical address space 134.

In response to the request 1601, the storage management layer 130 may queue the sub-requests of the atomic vector storage request 1601, which may comprise a TRIM storage request, write storage request, zero storage request. The storage requests may be queued in an ordered queue 173 and/or in a request buffer (described below). Alternatively, if the request 1601 is not an atomic operation (or is being managed using an inflight index, as described above), the ordered queue 173 may not be used.

The storage controller 120 may be configured to service the atomic vector storage request 1601 by executing the sub-requests of the vector storage request 1601. The log storage module 136 may be configured to append data packets 1610*a-e* pertaining to the vector storage request 1601 to the log 1603 on the non-volatile storage medium 1640.

For clarity of illustration, in the FIG. 16B example, each logical identifier corresponds to data of a respective data packet 1610*a-e* (e.g., each logical identifier references the same or less data as stored in a data packet segment 712, described above). The disclosure, however, is not limited in this regard, and could be adapted to implement any fixed and/or variable mapping between logical identifiers and data segment size.

The logical-to-physical translation module 132 may be configured to associate physical storage locations of the data packets 1610*a-e* with respective logical identifiers in the index 1604. The index 1604 may comprise entries 1605A-D corresponding to the vectors of the request 1601. The any-to-any mappings between logical identifiers and physical storage locations may allow data of the disjoint, non-adjacent, non-contiguous vectors to be stored contiguously within the log 1603; as illustrated in FIG. 16B, the entries 1605A-D may comprise respective mappings to arbitrary physical storage locations on the non-volatile media 1640, such that the logical identifier ranges map to packets 1610*a-e* that are arranged contiguously within the log 1603. The packets 1610*a-e* may comprise self-describing, persistent metadata (e.g., headers), to persist the association between the logical identifier(s) and the packets 1610*a-e*, such that the any-to-any mappings of entries 1605A-D can be reconstructed.

The contiguous log format of the packets 1610*a-e* may facilitate tracking completion of the atomic vector storage request 1601. As described above, the packets 1610*a-d* may comprise a persistent metadata flag in a first state indicating that the packets 1610*a-e* are part of an "incomplete" or "in process" atomic storage request. The last, final, or termination packet 1610*e* written as part of the atomic vector storage request 1601 may comprise a persistent metadata flag in a second state indicating successful completion of the atomic vector storage request 1601. As disclosed above, the "last" packet 1610*e* may be the final data packet pertaining to the atomic vector storage request 1601 within the log 1603. In some embodiments, the packet 1610*e* may be the "termination" data packet of the atomic storage request 1601 (e.g., the final packet written to the non-volatile storage medium as part of the atomic vector storage request 1601). Accordingly, the packet 1610*e* may the "last" packet pertaining to the atomic vector storage request 1601 with respect to the log-order of the packets 1610*a-e*. Alternatively, or in addition, the data packet 1610*e* may comprise separate persistent metadata, such as a persistent note, data packet, and/or data segment configured to indicate completion of the atomic vector storage request 1601, as described above in conjunction with FIGS. 12A and 12B.

As described above, the contiguous layout of the packets 1610*a-e* (and the corresponding flags) in the log 1603 may allow incomplete atomic storage requests to be identified and rolled back, such that data pertaining to the incomplete atomic storage requests are excluded from the storage metadata 135 (e.g., excluded from the index 1604). For example, if the persistent metadata flag in the second state 1614*e* is not found on the non-volatile storage media 1640, the entries 1605A-D may be removed (or omitted) from the index 1604 and the packets 1610a-e may be invalidated, as described above. The persistent metadata may be further leveraged to allow atomic storage operations to cross media boundaries (e.g., erase block boundaries), allow TRIM and/or grooming operations, and so on, as described herein.

Figure 16C:
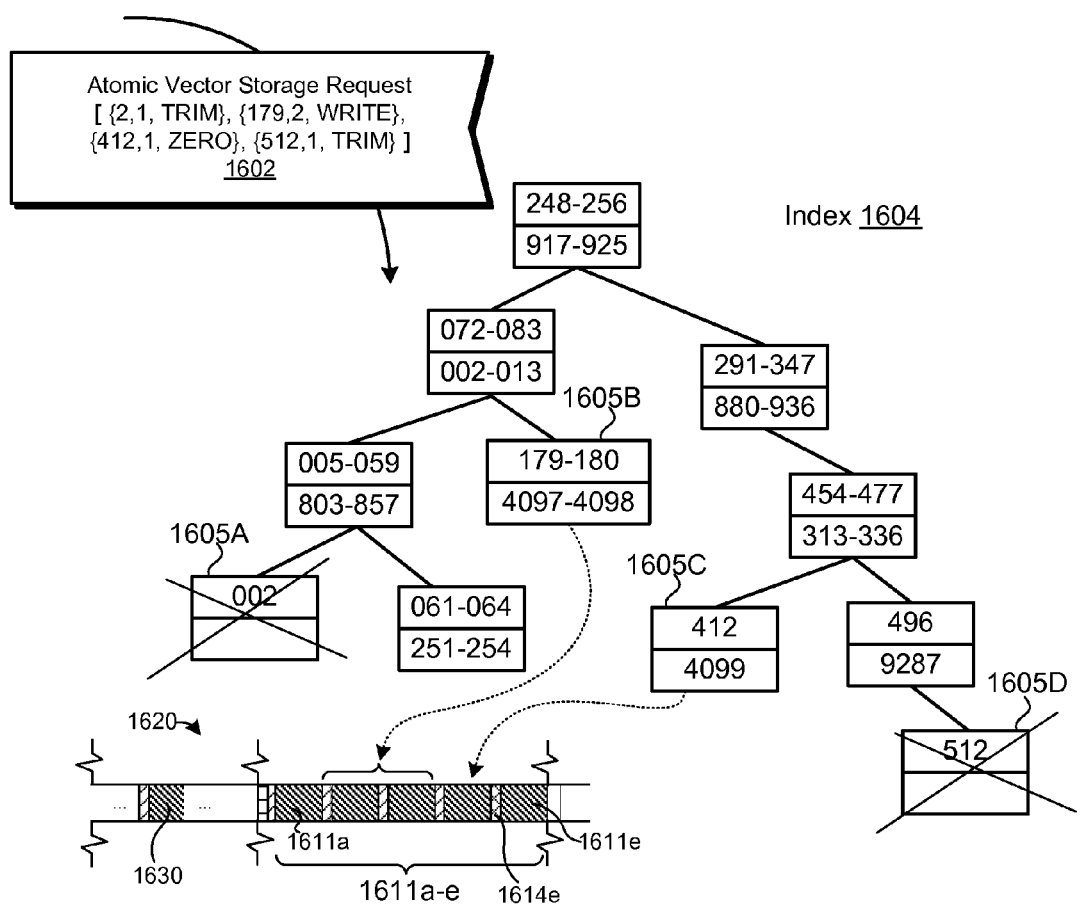
FIG. 16C depicts another embodiment of an atomic vector storage operation.

FIG. 16C depicts another embodiment of an atomic vector storage request 1602. The atomic vector storage request 1602 of FIG. 16C may comprise a plurality of vectors, each comprising a respective operation flag. The atomic vector storage request 1602 may comprise a vector comprising an atomic TRIM operation at LID 2, length 1; an atomic write to the LID 179, length 2; an atomic ZERO fill to the LID 412, length 1; and an atomic TRIM at LID 512, length 1. In response to the request 1602, the storage controller 120 may queue the individual storage requests of the atomic vector storage request 1602 in an ordered queue 173 (or request buffer), and may append data packets pertaining to the atomic storage vector request 1602 onto the log 1603, as described above. Performing an atomic TRIM operation may comprise modifying storage metadata 135, which may comprise removing the entry 1605 from the index 1604, invalidating one or more packets comprising data associated with the entry 1605, and so on. The modifications to the storage metadata 135 may be deferred until after other atomic operations of the request 1602 are complete. Performing the atomic TRIM may further comprise appending a persistent note 1611a to the log 1603. The persistent note 1611a may indicate that data of LID 2 does not need to be preserved on the non-volatile storage medium 1640. Therefore, if the index 1604 is reconstructed from the contents of the non-volatile storage media 1620, the persistent note 1611a may be used to invalidate data of LID 2 (e.g., exclude entry 1605A from the index 1604), and/or invalidate one or more packets comprising the data. For example, while reconstructing the storage metadata 135 (e.g., index 1604), a packet 1630 corresponding to LID 2 may be identified and, in response, the entry 1605A may be added to the index 1604. In the absence of the persistent note 1611a, the entry 1605A may remain in the index 1604 (and the packet 1630 may remain on the medium 1620), negating the TRIM operation. However, the persistent note 1611a on the non-volatile storage medium 1620 may indicate that the LID 2 was TRIMed and, as such, the entry 1605A may be removed from the index 1604, and the packet 1630 may be invalidated.

The persistent note 1611a (and other persistent notes and/or data of the atomic vector storage request 1602) may comprise and/or reference persistent metadata flags, which, as described above, may indicate that the persistent note (and/or data) is part of an atomic storage operation. If a corresponding persistent metadata flag in a state indicative of completing the atomic storage operation is not found (e.g., persistent flag 1614e does not exist on the medium 1620), the TRIM operation of the persistent note 1611a (as well as other operations) may be rolled back or excluded. Accordingly, in the absence of the persistent metadata flag 1614e in the appropriate state (or other condition indicating closure of the atomic storage operation), the entry 1605 may not be removed from the index 1604, and the data packet 1630 may not be invalidated (e.g., the TRIM operation will be rolled back).

The other storage operations of the atomic vector storage request 1602 may proceed as described above. The "ZERO" operation may comprise associating LID 412 with a particular data pattern (e.g., zeros) by storing the data pattern in one or more packets on the log 1603 and/or storing an indicator of the pattern (e.g., a persistent note), as described above. Completion of the composite, atomic storage request 1602 may comprise storing a packet (or other persistent data) comprising a persistent metadata flag indicating completion of the request 1602, as described above.

Figure 17A:
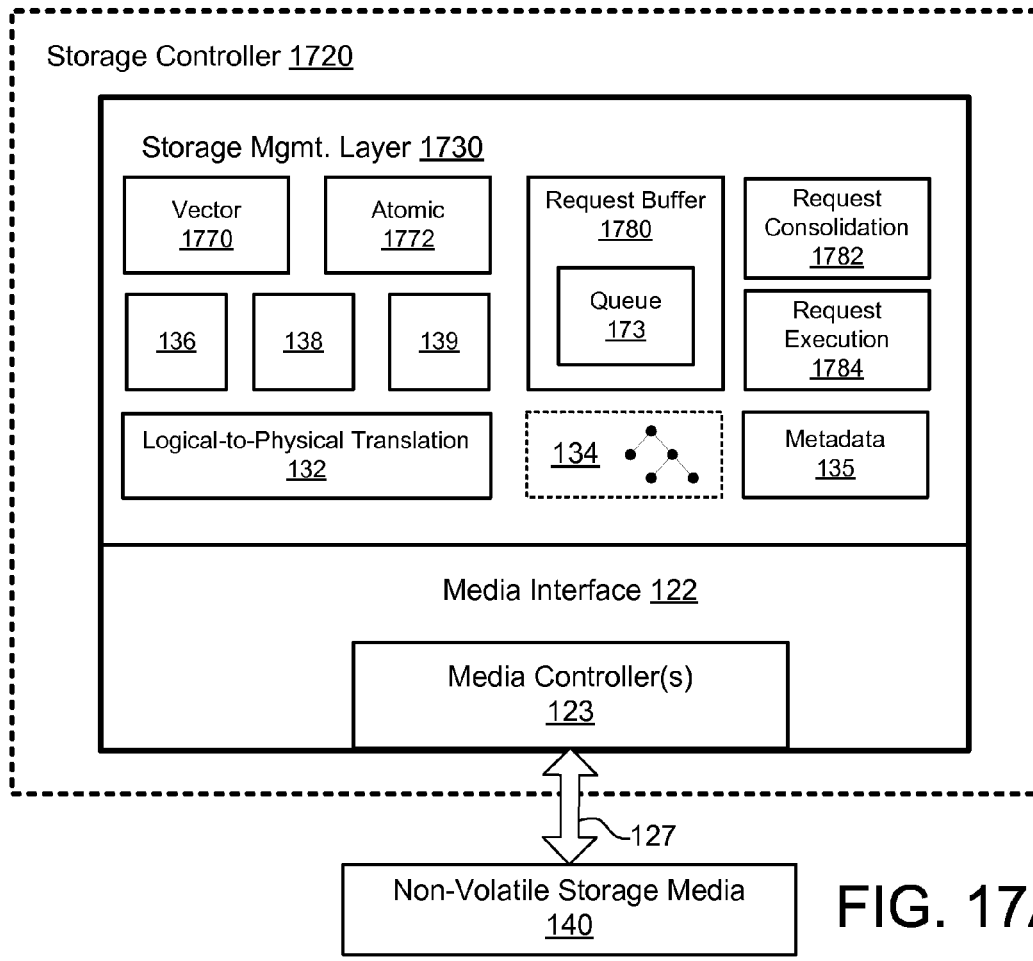
FIG. 17A is a block diagram of another embodiment of a storage controller.

FIG. 17A is a block diagram of another embodiment of a storage controller 1720. The storage controller 1720 may comprise a logical-to-physical translation module 132, logical address space 134, storage metadata 135, log storage module 136, groomer 138, and restart recovery module 139, as described above. The storage management layer 1730 may further comprise a request buffer 1780 configured to buffer requests directed to the storage controller 1720 from the storage clients 118A-N. In some embodiments, the request buffer 1780 may comprise an ordered queue 173, as described above. The request buffer 1780 may be configured to buffer and/or cache storage requests, vector storage requests, atomic storage requests, atomic vector storage requests, and so on. The request buffer 1780 may be configured to buffer storage requests for execution in an order in which the requests were received (e.g., using a first-in-first-out buffer, or the like). Alternatively, the request buffer 1780 may comprise a plurality of different request buffers and/or queues that may, or may not, be ordered.

The storage management layer 130 may be configured to modify a storage request within the request buffer 1780 in response to one or more other storage requests by use of a request consolidation module 1782. The consolidation module 1782 may be configured to selectively modify storage requests in response to other pending storage requests (e.g., other storage requests in the request buffer 1780). In some embodiments, modifying a storage request comprises consolidating and/or combining two or more storage requests, removing or deleting one or more storage requests, modifying the range, extent, and/or set of logical identifiers pertaining to a storage request, or the like. Modifying a vector storage request may comprise modifying one or more vectors provided in the vector storage request in response to other pending storage requests within the request buffer 1780 and/or in response to other vectors within the vector storage request itself. The storage request consolidation module 1782 may improve efficiency by consolidating and/or removing certain storage requests. For example, certain storage clients 118A-N, such as file system storage clients 118B, may make heavy use of certain types of storage requests (e.g., TRIM storage requests). The storage requests may pertain to adjacent and/or overlapping logical identifier ranges in the logical address space 134. Accordingly, one or more storage requests (and/or portions thereof) may be overridden, subsumed, made obsolete, and/or made redundant by other pending storage requests within the same logical address range or namespace (e.g., other pending storage requests within the request buffer 1780). The request consolidation module 1782 may modify the storage requests in the request buffer 1780 (e.g., join, combine, and/or remove buffered storage requests), to thereby reduce the overall number of storage requests processed by the storage controller 120, which may improve performance and reduce wear on the non-volatile storage media 140. In some embodiments, modifying a storage request comprises acknowledging completion of the storage request without actually performing and/or implementing the storage request (e.g., acknowledging a TRIM storage request made redundant by one or more other pending storage requests without actually implementing the redundant TRIM request).

The storage management layer 1730 may be configured to selectively buffer and/or modify storage requests. In some embodiments, the storage management layer 1780 may be configured to receive storage requests from different storage clients 118A-N (both within the same host or on other hosts).

The storage management layer 1730 may be configured to buffer and/or modify the storage requests of select storage client(s) 118A-N (to the extent that the storage client(s) 118A-N are configured to operate using the same logical identifiers namespace, and/or the like. Storage requests of other unselected storage clients (e.g., file system storage client 118B) may not be buffered in the request buffer 1780 and/or modified by the request consolidation module 1782. In some embodiments, the storage management layer 1730 may be configured to selectively buffer storage requests of a particular type. For example, the request buffer 1780 may be configured to only buffer TRIM storage requests. Alternatively, or in addition, the request buffer 1780 may comprise a plurality of separate request buffers 1780 for different storage client(s) 118A-N and/or different types of storage requests. For example, the request buffer 1780 may be configured to buffer sub-requests or subcommands of vector storage requests and/or atomic vector storage requests. The request consolidation module 1782 may be configured to consolidate the sub-requests and/or subcommands as described herein.

In some embodiments, the request consolidation module 1782 may be configured to modify a vector storage request and/or one or more vectors of a vector storage request (e.g., one or more sub-requests and/or subcommands of the vector storage request). The request consolidation module 1782 may be configured to identify and/or analyze the respective vectors of the vector storage request by use of the vector storage module 1770 and/or atomic storage module 1772. The storage requests corresponding to the vector storage request may be buffered in the request buffer 1780 along with, or separately from, similar other non-vector storage requests and/or storage requests of other vector storage requests. Buffering a vector storage request may, therefore, comprise generating sub-requests and/or subcommands (separate storage requests) corresponding to each of the vectors of the vector storage request. For example, a vector storage request to TRIM data in vectors 1 . . . N may correspond to N separate storage requests, wherein each of the N storage requests is configured to TRIM a range of logical identifiers specified in a respective one of the 1 . . . N vectors. The constituent storage requests of atomic vector storage requests may be similarly buffered in the request buffer 1780. The storage requests of an atomic vector storage request may be buffered in an ordered queue 173 (and/or ordered buffer), as described above.

Figure 17B:
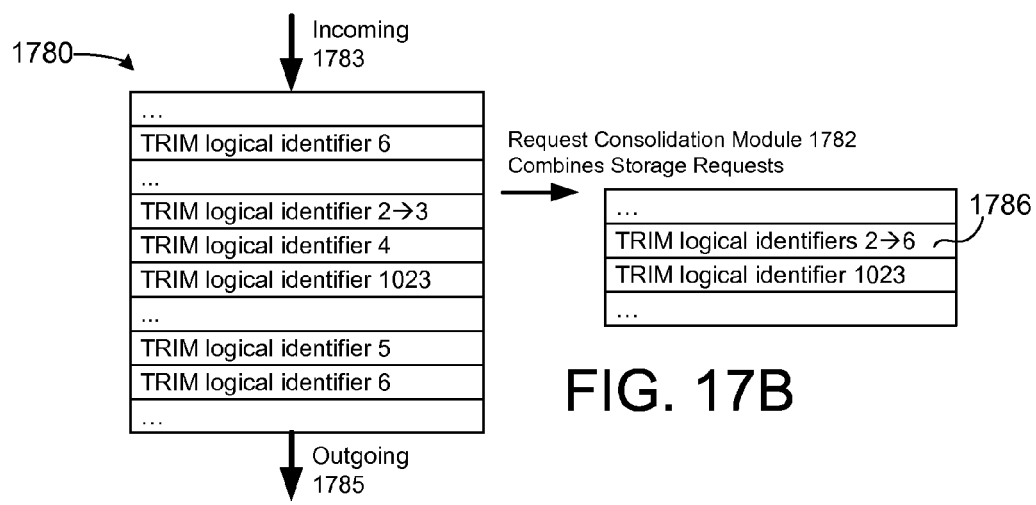
FIGS. 17B-17D depict storage request consolidation in a request buffer.

The request consolidation module 1782 may be configured to modify one or more storage requests in the request buffer 1780 based on one or more other storage requests within the request buffer 1780. The storage requests may comprise storage requests of vector storage requests and/or non-vector storage requests. Modifying a storage request may comprise combining and/or coalescing two or more of the storage requests. For example, individual storage requests pertaining to overlapping and/or contiguous sets of logical identifiers in the logical address space 134 may be combined into a single storage request, which may include and/or combine the overlapping ranges. FIG. 17B depicts one embodiment of a request buffer 1780. The request buffer 1780 may be ordered, such that storage requests are executed and/or serviced by the request execution module 1784 (described below) in the order in which the storage requests were received (e.g., in a first-in-first-out (FIFO) configuration in which storage requests are pushed into the request buffer 1780 at the incoming end 1783 of the request buffer 1780 and are popped for execution at the outgoing end 1785 of the request buffer 1780).

Storage requests may be added to the request buffer 1780 as they are received at the storage controller 1720. Adding a vector storage request to the request buffer 1780 may comprise adding storage requests corresponding to each of a plurality of vectors of the vector storage request to the request buffer 1780. The storage controller 1720 may be configured to execute and/or service the storage requests, as described herein, which may comprise appending one or more data packets to a log on the non-volatile storage media 140, modifying the storage metadata 135, and so on. In some embodiments, the storage controller 1720 comprises a request execution module 1784 configured to service and/or execute storage requests in the request buffer 1780. The request execution module 1784 may be configured to execute buffered storage requests in a particular order (e.g., in the order in which the storage requests were received); for example, the request execution module 1784 may be configured to pop buffered storage requests from an end of an ordered queue 173, FIFO, or the like. Alternatively, or in addition, the request execution module 1784 may be configured to service and/or execute storage requests out of order. Alternatively, or in addition, the request execution module 1784 may be configured to change the order of storage requests within the request buffer 1780 based on criteria that optimizes use of the storage media 140 and preserves the integrity of the storage operations. Executing or servicing a storage request may comprise performing one or more storage operations specified by the store request, which, as described herein, may comprise appending one or more data packets to a log on the non-volatile storage medium 140 (by use of the log storage module 136), reading portions of the non-volatile storage medium 140, transferring data pertaining to a storage request, updating storage metadata 135, and so on. The request execution module 1784 may be further configured to execute and/or service atomic storage requests by use of the atomic storage module 1772, which may comprise storing persistent metadata on the non-volatile storage medium to track completion of the atomic storage request(s), as described herein.

In some embodiments, the request execution module 1784 is configured to execute storage requests according to a particular interval and/or schedule. The scheduling may be adaptive according to operating conditions of the storage controller 120 and/or in response to trigger conditions, such as filling the request buffer 1780 (and/or ordered queue 173), buffering a threshold number of storage requests, and so on.

As disclosed above, the request consolidation module 1782 may be configured to modify one or more of the storage requests within the request buffer 1780. The request consolidation module 1782 may be configured to modify the storage requests in response to other pending storage requests within the request buffer 1780, which may comprise combining and/or joining two or more storage requests into a single storage request that operates on a logical union of the overlapping and/or adjacent set(s) of logical identifiers. In the FIG. 17B example, the storage request buffer 1782 comprises TRIM storage requests pertaining to logical identifiers 2 . . . 6. The request consolidation module 1782 may be configured to aggregate the TRIM storage requests in the request buffer 1780 to form a single, combined TRIM storage request 1786. The storage request to TRIM logical identifier 1023 is not adjacent with and/or overlap the logical identifiers 1 . . . 6 and, as such, may remain as a separate storage request. Coalescing the TRIM storage requests as described herein may reduce wear on the non-volatile storage media 140. For example, if the TRIM storage requests are persistent (e.g., comprise storing a persistent note on the non-volatile storage media 140), forming the aggregate TRIM storage request 1786 may reduce the total number of persistent notes stored on the non-volatile storage medium 140. In some embodiments, a persistent TRIM note may be configured to TRIM one or more disjoint, non-adjacent, and/or non-contiguous logical identifier ranges or vectors. Accordingly, the storage request consolidation module 1782 may be configured to join the trim storage request pertaining to logical identifier 1023 into a vector TRIM storage request (e.g., request to TRIM logical identifiers 1 . . . 6 and 1023, not shown in FIG. 17B).

Figure 17C:
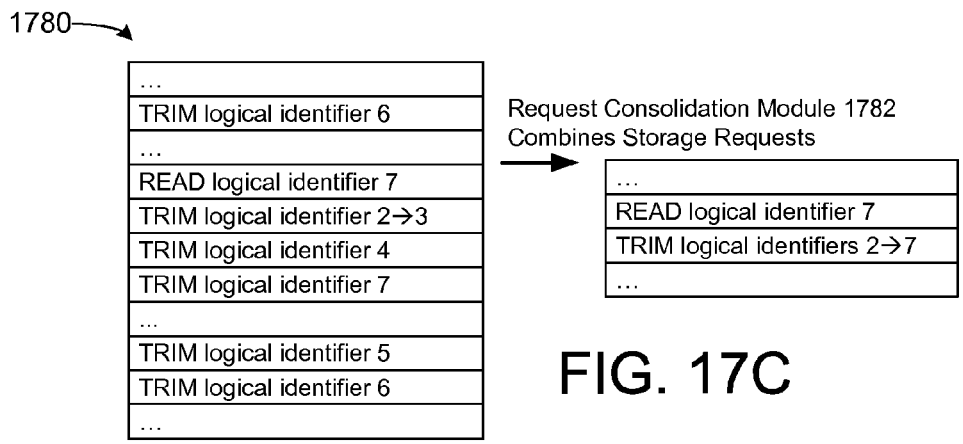

The request consolidation module 1782 may be configured to modify storage requests in the request buffer 1780 such that the modifications do not affect other pending storage requests. As illustrated in FIG. 17C, the request buffer 1780 may comprise a storage request to read data of logical identifier 7. The request consolidation module 1782 may be configured to schedule the read storage request before the combined storage request to TRIM logical identifiers 2 . . . 7 such that the read storage request can be completed; scheduling the read storage request after the combined TRIM storage request would result in losing access to the data of logical identifier 7.

Figure 17D:
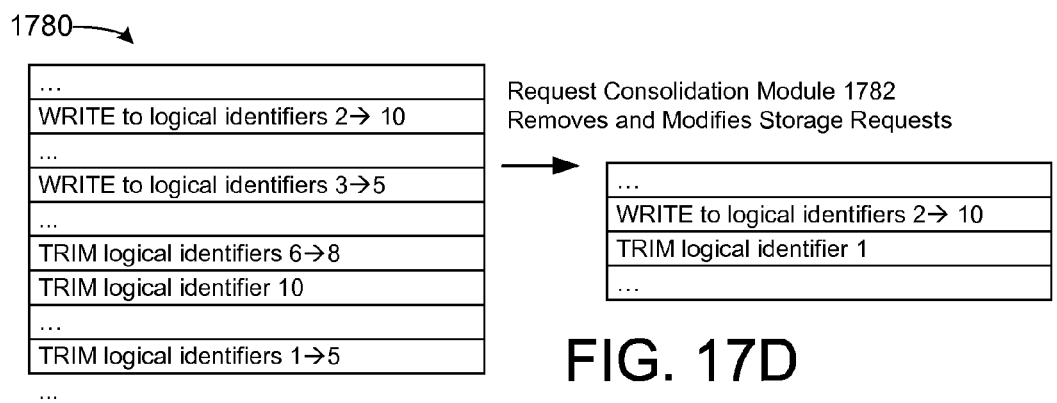

The request consolidation module 1782 may be further configured to remove and/or delete one or more storage requests from the request buffer 1780. A storage request may be removed and/or deleted from the request buffer 1780 in response to determining that the storage request(s) would be obviated by one or more other pending storage requests in the request buffer 1780. As illustrated in FIG. 17D, the request buffer 1782 comprises a plurality of storage requests to TRIM and write to various logical identifiers in the logical address space 134. The request consolidation module 1782 may determine that one or more of the TRIM and/or write storage requests are obviated by other pending storage requests in the request buffer 1780; the write request to logical identifier 2 . . . 10 overlaps several of the TRIM storage requests and the write request to logical identifiers 3 . . . 5. The request consolidation module 1782 may be configured to remove and/or delete the storage requests that are obviated by the write storage request. Storage requests that are not obviated by the write storage request may be retained and/or modified (e.g., the storage request to TRIM logical identifiers 1 . . . 5 may be modified to TRIM only logical identifier 1, which is not obviated by the write storage request). As described above, the request consolidation module 1782 may configure the modification such that other pending storage requests are not affected. For example, the write operation to logical identifiers 3 . . . 5 may not be deleted if there is a storage request to read data of one or more of the logical identifiers 3 . . . 5 before the write to 2 . . . 10 in the request buffer 1780. Removing a storage request may further comprise acknowledging completion of the storage request. The storage request may be acknowledged even if the storage request is not actually implemented (e.g., is obviated by another storage request in the request buffer 1780).

As described above, the request buffer 1780 may be configured to buffer storage requests received from one or more storage clients 118A-N, including vector storage requests and/or atomic vector storage requests. The request consolidation module 1782 may be configured to modify an atomic vector storage request (and/or the constituent storage requests thereof) in response to other pending storage requests in the request buffer 1780 (and/or within the atomic vector storage request itself). In some embodiments, however, the request consolidation module 1782 may only modify storage requests within respective atomic vector storage operations, without regard to other non-atomic storage requests in the request buffer 1780. For example, the request consolidation module 1782 may consolidate adjacent and/or overlapping write and/or TRIM requests within an atomic vector storage request, as described above. However, the request consolidation module 1782 may not modify the sub-requests of the atomic vector storage request in response to other storage requests in the request buffer 1780 that are not part of the atomic vector storage request.

Figure 18:
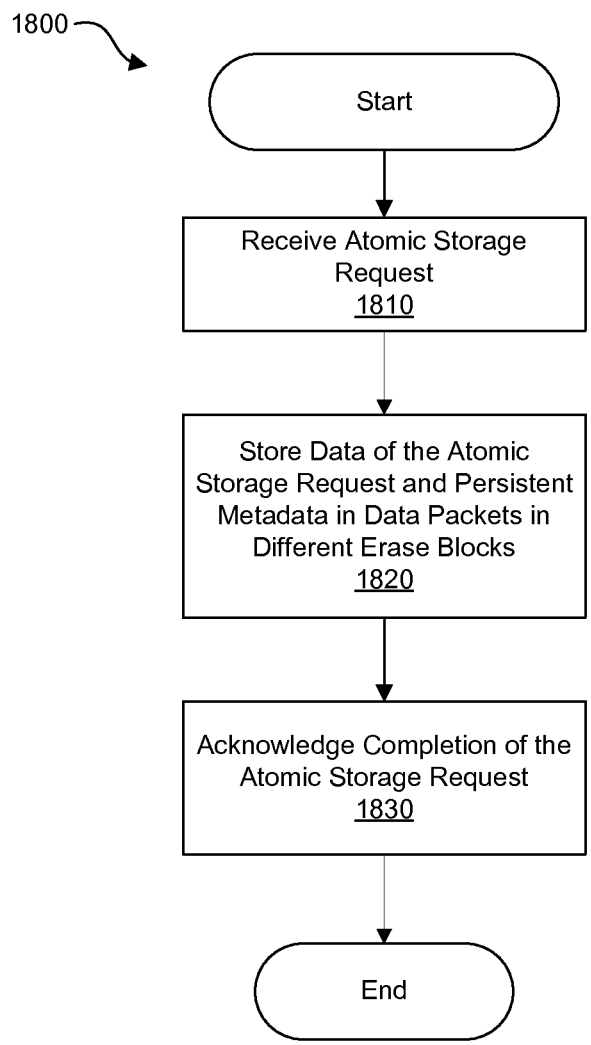
FIG. 18 is a flow diagram of one embodiment of a method for servicing an atomic storage request.

FIG. 18 is a flowchart of one embodiment of a method 1800 for servicing an atomic storage request 1101. The method 1800 may start and be initialized, which may include, but is not limited to, loading one or more machine-readable instructions from a non-transitory, machine-readable storage medium, accessing and/or initializing resources, such as a non-volatile storage device, communication interfaces, and so on.

As the method begins, an atomic storage request 1101 is received 1810, for example, at the storage management layer 1730. The atomic storage request 1101 may be received 1810, for example, through an interface, such as the storage management layer 130 by use of one or more of the interfaces 1694a-b. The atomic storage request 1101 may involve a single atomic storage operation or a plurality of vector storage operations. The storage request 1101 may pertain to disjoint, non-adjacent, and/or non-contiguous ranges and/or sets of logical identifiers in the logical address space 134.

Step 1820 may comprise storing and/or appending data pertaining to the atomic storage request contiguously to a log on the non-volatile storage media 140. In some embodiments, the data may be appended in a packet format, such as the packet format 710 described above in conjunction with FIG. 7. Step 1820 may further comprise storing the data with persistent metadata (e.g., persistent metadata flags 717) to track completion of the atomic storage request, as illustrated, for example, in FIGS. 13A and 16B-C. The persistent metadata may comprise persistent metadata flags configured to identify data that is part of an incomplete atomic storage operation. The persistent metadata may comprise persistent metadata flags 717 of one or more data packets. The persistent metadata may further comprise one or more persistent indicators that the atomic storage request is complete. In some embodiments, a completion indicator may comprise storing a persistent metadata flag 717 in a last data packet stored as part of the atomic vector storage request (e.g., the final data packet within the log), wherein the persistent metadata flag 717 is configured to indicate completion of the atomic storage request. In some embodiments, the atomic storage request 1101 may involve a plurality of storage operations, each of which may encompass storage operations in a plurality of different logical erase blocks 1340a-b. The log storage module 136 may be configured to store persistent metadata (such as a header 1314a) and associated user data 1312 within a data packet 1310a-d (or other persistent note) on the storage media 1302 in one or more write operations, i.e., as part of one or more operations performed on the storage media 1302.

Step 1830 may comprise acknowledging completion of the atomic storage request to a storage client 118A-N or the like. The atomic storage module 172 may be configured to send acknowledgment asynchronously via a callback or other mechanism. Alternatively, the atomic storage request 1101 may be synchronous, and the atomic storage module 172 may transmit acknowledgment by a return from a synchronous function or method call.

In some embodiments, acknowledgment is provided as soon as it can be assured that the data of the atomic storage request 1101 will be persisted to the non-volatile storage media 140 but before the data is actually stored thereon. For example, the atomic storage module 172 may send acknowledgment upon transferring data of the atomic storage request 1101 into a buffer of the non-volatile storage device 1302 or into a write data pipeline, transferring the data to a storage controller 120 (e.g., within a protection domain of a storage controller 120), or the like. Alternatively, acknowledgment 1830 is performed after the data of the atomic storage request 1101 has been persisted on the non-volatile storage media 140.

Figure 19:
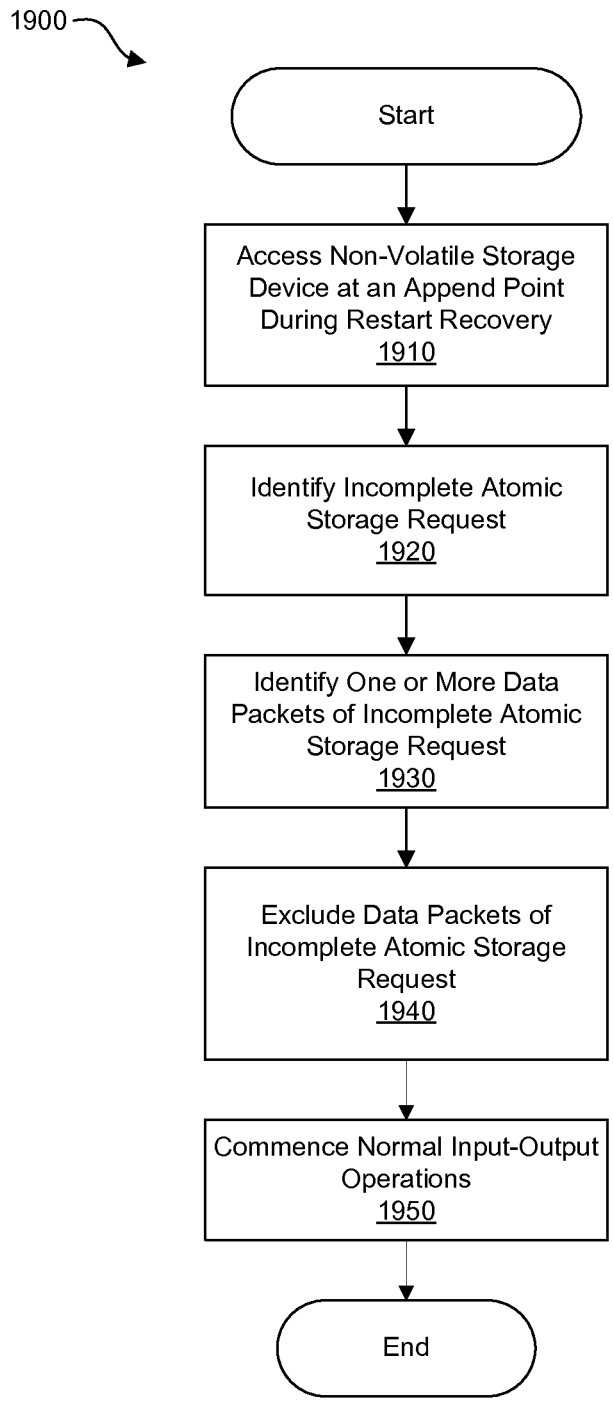
FIG. 19 is a flow diagram of one embodiment of a method for restart recovery.

FIG. 19 illustrates a method 1900 for restart recovery to reconstruct storage metadata 135 (e.g., forward index 204). As shown in FIG. 19, the storage controller 120 may be configured to access an append point on the non-volatile storage media 140. The non-volatile storage media 1502 may comprise a plurality of data packets 1510*a-c*, 1510*d-e*, 1510*f-i* in a log format; the data packets 1510*a-c*, 1510*d-e*, 1510*f-i* may be appended to the log from the append point 1520 and/or may be associated with respective sequence indicators, as described above. The data packets 1510*a-c*, 1510*d-e*, 1510*f-i* may be associated with different logical identifiers 1515 of the logical address space 134; the logical identifiers may be independent of physical storage locations 1523 on the non-volatile storage media 1502.

The restart recovery module 139 may be configured to identify data packets 1920 of incomplete atomic storage requests in response to a data packet 1510*i* preceding the append point 1520 comprising a persistent indicator that satisfies an incomplete atomic write criteria. For example, the persistent indicator may satisfy the incomplete atomic write criteria if the preceding data packet comprises the first persistent metadata flag in the first state 1417*a* (e.g., a state indicating that the packet is part of an incomplete or in process atomic storage request).

The restart recovery module may be further configured to identify 1930 one or more data packets 1510*d-e*, 1510*f-i* associated with the incomplete atomic storage request by, for example, identifying data packets including the first persistent metadata flag in a first state 1417*a*. The one or more data packets 1510*d-e*, 1510*f-i* associated with the incomplete atomic storage request may be positioned sequentially within the log-based structure 1103. One example of an incomplete atomic storage request involving sequentially positioned packets is illustrated in FIG. 15, i.e., the data packets 1510*d-e*, 1510*f-i* of FIG. 15 are associated with the incomplete atomic storage request and are positioned sequentially in a log-based structure 1103. It should be noted that identifying 1920 the incomplete atomic storage request and identifying 1930 one or more packets associated with the incomplete atomic storage request may be performed consecutively or concurrently.

Step 1940 comprises excluding the data packet 1510*d-e*, 1510*f-i* associated with the incomplete atomic storage request from an index, such as a forward index 1504 or a reverse index 1022. The restart recovery module 139 may exclude 1940 by bypassing each data packet 1510*d-e*, 1510*f-i* associated with the incomplete atomic storage request during a scan of the log-based structure 1103 used to create the index 1504. In addition, the exclusion module 1745 may exclude 1940 by removing each logical identifier 1515 that maps to each data packet 1510*d-e*, 1510*f-i* associated with the incomplete atomic storage request from the index 1504 created by way of a scan of the log-based structure 1103.

Step 1940 may comprise grooming (e.g., erasing) the data packets 1510*d-e*, 1510*f-i* associated with the incomplete atomic storage request 1103 by way of the storage space recovery operation. The groomer module 138 may be further configured to exclude 1940 by erasing each logical erase block 1540*a-b* of the solid-storage media comprising one or more data packets 1510*d-e*, 1510*f-i* associated with the incomplete atomic storage request and transferring data packets 1510*a-c* from each logical erase block 1540*a* to a different location 1540*c* on the non-volatile storage media 1502, as illustrated, for example, in FIG. 15. The groomer module 138 may also erase by assigning a subsequence number 1519 to a destination logical erase block 1540*c* configured to store the preserved data packets 1510*a-c*, as is also illustrated, for example, in FIG. 15. During a power-on operation of the storage device, the groomer module 138 may erase by identifying a first logical erase block 1540*a* having a sequence number 1518*a* and another logical erase block 1540*c* having a subsequence number 1519 derived from the sequence number 1518*a* and grooming the first logical erase block 1540*a*, as illustrated in FIG. 15, and excluding each data packet 1510*d-e*, 1510*f-i* associated with the failed atomic storage request from the index 1504. Excluding may further comprise storing a physical TRIM note identifying the data packet(s) of the incomplete atomic storage request.

Step 1950 may comprise resuming input-output operations after restart recovery is complete. Performing exclusion 1940 before commencing 1950 normal input-output operations, in one embodiment, simplifies the restart recovery process by preventing normal input-output operations from interfering with the restart recovery process and/or propagating errors in data stored on the media 1502.

As disclosed above, a vector storage request may comprise a request to perform one or more operations on one or more vectors, which may pertain to respective sets and/or ranges within a logical address space 134. A portion of one or more of the vectors may overlap (and/or may be logically adjacent) and/or one or more operations may negate (e.g., overlay) one or more other operations. For example, a vector storage request may comprise a request to perform a TRIM operation on two vectors. The vectors may pertain to overlapping and/or adjacent sets of logical identifiers (e.g., the operations may TRIM logical identifiers 256-1024 and 759-1052, respectively). The request consolidation module 1782 may identify the overlapping TRIM operations within the vector storage request and, in response, may modify the vector storage requests. Modifying the vector storage request may comprise modifying one or more of the vectors of the vector storage request (e.g., combining the TRIM requests into a single request to TRIM logical identifiers 256-1052). In another example, a vector storage request may comprise requests to TRIM the same set of logical identifiers; the request consolidation module 1782 may be configured to remove one or more of the overlapping vectors of the vector storage request. For example, a vector storage request comprising multiple requests to TRIM logical identifiers 0-256 may be combined into a single TRIM request comprising the vector 0-256. The request consolidation module 1782 may be configured to consolidate or join logically adjacent requests and/or vectors. For example, a vector storage request may comprise requests to TRIM logical identifiers 0-256 and 257-512; the request consolidation module 1782 may be configured to consolidate these two separate vectors into a single vector 0-512.

The request consolidation module 1782 may be further configured to consolidate atomic vector storage requests (e.g., requests received via the interface 1694*b* described above). For example, an atomic vector storage request may comprise a vector configured to TRIM a particular range of logical identifiers followed by a vector configured to write to the same vector (or a portion of the same vector). The request consolidation module 1782 may be configured to detect that the vector pertaining to the TRIM operation is obviated by the vector pertaining to the write operation and, in response, may omit storage request(s) of the TRIM vector (and/or omit the portion of the TRIM operation that is obviated by the write).

The request consolidation module 1782 may be configured to modify storage requests by examining the vectors within respective vector storage requests, comparing vectors of different vector storage requests, examining storage requests in a storage request buffer 1780, identifying I/O vectors for consolidation, and/or modifying the buffered storage requests, and so on, as described above.

Figure 20:
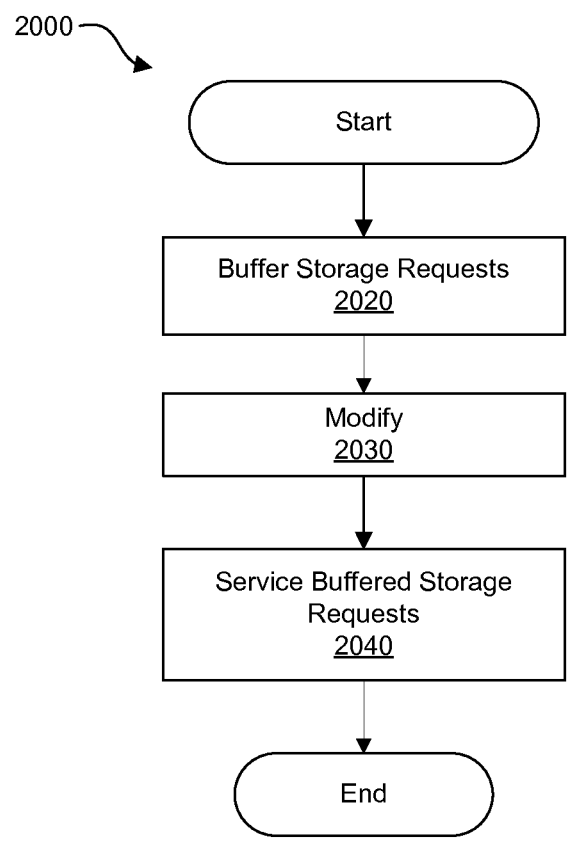
FIG. 20 is a flow diagram of one embodiment of a method for consolidating storage requests.

FIG. 20 is a flow diagram of one embodiment of a method 2000 for managing storage operations. The method 2000 may start and initialize, as described above.

Step 2020 may comprise buffering one or more storage requests. As described above, buffering storage requests may comprise adding the storage requests to a buffer (the request buffer 1780), queuing storage requests (e.g., adding storage requests to an ordered queue 173), holding storage requests, delaying storage requests, and/or the like. Step 2020 may comprise buffering storage requests, buffering vector storage requests, buffering atomic vector storage requests, and so on. Buffering a vector storage request and/or atomic vector storage request may comprise extracting one or more vector(s) from the storage request and/or generating storage requests corresponding to each of the vectors within the vector storage request (e.g., buffering a storage request for each vector within the vector storage request). Step 2020 may comprise retaining an order of the storage requests within the buffer, queue, or other data structure. Accordingly, the buffering of step 2020 may be configured to maintain the storage requests in the same (or equivalent) order as the storage requests were received. For example, in some embodiments, the request buffer 1780 comprises an ordered queue 173, such as a first-in-first-out (FIFO) or the like. Storage requests may flow through the ordered queue 173 (e.g., by first-in-first-out processing), as disclosed above.

Step 2030 may comprise modifying one or more of the storage requests, vector storage requests, and/or vectors. The modification of step 2030 may comprise removing, joining, combining, and/or modifying one or more storage requests, vector storage requests, and/or vectors, as described above. Step 2030 may comprise identifying storage requests and/or vectors that pertain to overlapping and/or adjacent ranges of logical identifiers within the logical address space 134. Accordingly, step 2030 may comprise comparing pending storage requests and/or vectors of pending vector storage requests (atomic and/or otherwise) to other pending storage requests and/or vectors within the request buffer 1780. Step 2030 may further comprise identifying storage requests and/or vectors that can be combined, modified, and/or removed. As disclosed above, storage requests that pertain to overlapping ranges of logical identifiers may be combined, which may comprise modifying the storage request to reference a vector and/or modifying the set, range, extent, and/or logical identifiers of one or more vectors. Step 2030 may further comprise identifying storage requests and/or vectors that are made redundant by one or more other pending storage requests and/or vectors, as disclosed above.

In some embodiments, the modification of step 2030 may operate within the vectors of a particular vector storage request. Accordingly, the buffering of step 2020 may be omitted, and step 2030 may operate within an individual vector storage request (and/or an individual atomic vector storage request). Alternatively, or in addition, the request consolidation module 1782 may treat some storage requests separately. For example, atomic vector storage requests may be buffered and/or consolidated separately from other storage requests. In other embodiments, steps 2020 and/or 2030 may comprise buffering and/or modifying storage requests of a particular storage client 118A-N (e.g., storage requests of a file system storage client 118B), buffering and/or modifying storage requests of a particular type (e.g., only TRIM storage requests), or the like Step 2040 may comprise servicing the buffered storage requests. Step 2040 may comprise servicing one or more of the storage requests and/or vectors modified at step 2030. Step 2040 may be performed at a predetermined time and/or operation interval. In some embodiments, step 2040 is performed in response to a trigger condition, which may include, but is not limited to: filling the request buffer 1780 (e.g., a FIFO, ordered queue 173, or the like), buffering a predetermined number of storage requests, a user request to flush the request buffer 1780, or the like. Step 2040 may further comprise acknowledging completion of one or more storage requests. The request(s) may be acknowledged after all of the storage requests of a particular vector storage request (or atomic vector storage request) are complete. In some embodiments, step 2040 may comprise acknowledging completion of a storage request that was modified at step 2030. The acknowledgement may pertain to a storage request and/or vector that was removed or omitted at step 2030.

Figure 21:
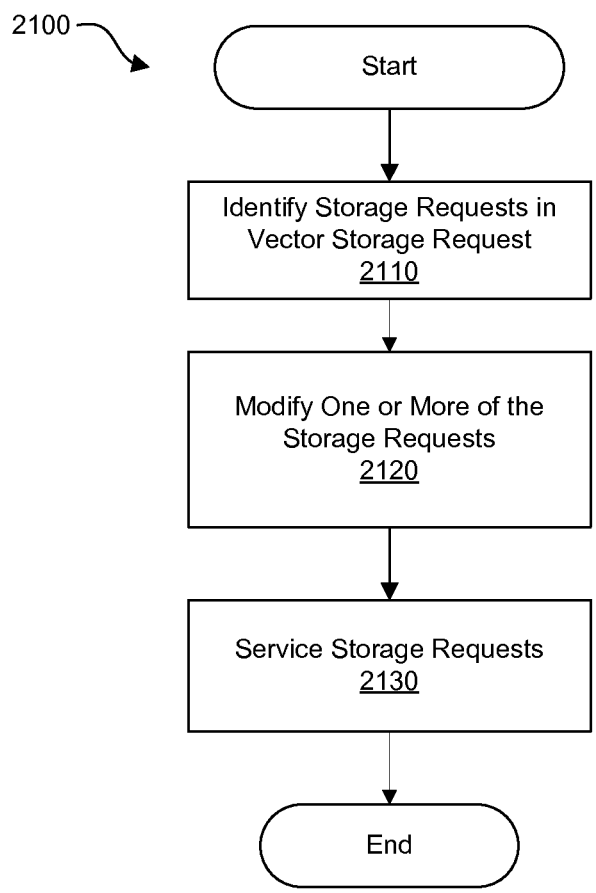
FIG. 21 is a flow diagram of another embodiment of a method for servicing a vector storage request.

FIG. 21 is a flow diagram of one embodiment of a method 2100 for servicing vector storage requests. The method 2100 may start and initialize, as described above.

Step 2110 may comprise identifying a plurality of storage requests of a vector storage request (e.g., a plurality of sub-requests or sub-operations of the vector storage request). The vector storage request may pertain to a plurality of vectors, each vector corresponding to a range of one or more logical identifiers of a logical address space 134. Two or more of the vectors may pertain to logical identifiers that are disjoint, non-adjacent, and/or non-contiguous with respect to the logical address space 134. The storage requests identified at step 2110 may correspond to respective vectors of the vector storage request and/or may comprise different types of storage operations (e.g., in accordance with a vector flag parameter 1698*n* or vector storage request flag parameter 1696*d*).

Step 2120 may comprise modifying one or more of the storage requests of the vector storage request based on and/or in response to other pending storage requests (by use of the request consolidation module 1782, described above). Step 2120 may comprise buffering the identified storage requests in a request buffer 1780, which may comprise other storage requests of other storage clients 118A-N (in addition to the storage requests identified at step 2110). Alternatively, step 2120 may comprise modifying the storage requests in response to the vector storage request as identified at step 2110, without regard to other storage requests (buffered or otherwise). Accordingly, the other storage requests may comprise other storage requests within the vector storage request (as identified at step 2110) and/or other storage requests buffered in the request buffer 1780 that are independent of the vector storage request (e.g., in addition to the storage requests of the vector storage request of step 2110).

Modifying a storage request may comprise joining and/or combining two or more storage requests, removing or deleting one or more storage requests that are obviated (e.g., negated) by one or more other pending storage requests, modifying the logical identifier(s) and/or vector of the storage request, and so on, as described above. The modifications of step 2120 may be configured to maintain consistency with other storage requests; as described above, the request consolidation module 1782 may be configured to modify and/or order the storage requests such that the modifications do not affect other pending storage requests.

Step 2130 may comprise servicing the storage requests of the vector storage request (as modified at step 2120). Step 2130 may comprise storing data packets of the vector storage request contiguously within a log on the non-volatile storage media 140 (e.g., by use of the log storage module 136).

Storing the data packets contiguously may comprise appending the data packets at an append point, storing the data packets sequentially from the append point, and/or associating the data packets with respective sequence indicators on the non-volatile storage media 140, such that a log order of the data packets is retained on the non-volatile storage media 140.

In some embodiments, the vector storage request of step 2110 may be an atomic vector storage request. Accordingly, step 2130 may further comprise storing one or more persistent indicators on the non-volatile storage media 140 to identify data pertaining to the atomic vector storage request and/or to indicate completion of the atomic vector storage request. Step 2130 may comprise configuring one or more data packets of the atomic vector storage request to include respective persistent indicators (e.g., persistent metadata flags 717) that indicate that the one or more data packets pertain to an atomic storage request that is incomplete and/or in process. Step 2130 may further comprise configuring a last data packet of the atomic storage request to include a persistent indicator (e.g., persistent metadata flag 717) that indicates that the atomic storage operation is complete.

Reference throughout this specification to features, advantages, or similar language does not imply that all of the features and advantages that may be realized are included in any single embodiment. Rather, language referring to the features and advantages is understood to mean that a specific feature, advantage, or characteristic described in connection with an embodiment is included in at least one embodiment. Thus, discussion of the features and advantages, and similar language, throughout this specification may, but do not necessarily, refer to the same embodiment.

Furthermore, the features, advantages, and characteristics described herein may be combined in any suitable manner in one or more embodiments. One skilled in the relevant art will recognize that the disclosed embodiments may be practiced without one or more of the specific features or advantages of a particular embodiment. In other instances, additional features and advantages may be recognized in certain embodiments that may not be present in all embodiments. These features and advantages of the disclosed embodiments will become more fully apparent from the following description and appended claims, or may be learned by the practice of the embodiments as set forth hereinafter.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a compact disk, digital-video disk, a magnetic tape, a Bernoulli drive, a magnetic disk, a punch card, flash memory, integrated circuits, or other digital processing apparatus memory device.

Furthermore, the features, structures, or characteristics disclosed herein may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of the disclosed embodiments. One skilled in the relevant art will recognize, however, that the teachings of the disclosure may be practiced without one or more of the specific details, or with other methods, components, materials, and so forth. In other instances, well-known structures, materials, or operations are not shown or described in detail to avoid obscuring aspects of the disclosed embodiments.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

We claim:
1. An apparatus, comprising:
a non-volatile storage medium;
a request consolidation module configured to modify a storage request of an atomic vector storage request in response to another pending storage request;

a storage fulfillment module configured to service storage requests including the one or more modified storage requests;

a log storage module configured to append data pertaining to the atomic vector storage request contiguously within a log on the non-volatile storage medium; and an atomic storage module configured to include a first persistent indicator on the non-volatile storage medium, wherein the first persistent indicator is configured to indicate that the data pertains to an atomic storage operation.

2. The apparatus of claim 1, wherein the storage request is modified in response to another storage request of the vector storage request.

3. The apparatus of claim 1, wherein the storage request is modified in response to a storage request that is independent of the vector storage request.

4. The apparatus of claim 1, wherein modifying the storage request comprises combining two or more storage requests, wherein the two or more storage requests include a storage request of the vector storage request.

5. The apparatus of claim 4, wherein the two or more storage requests comprise logical identifiers that reference one of adjacent and overlapping logical identifiers.

6. The apparatus of claim 4, wherein the two or more storage requests comprise trim storage requests that pertain to one of adjacent and overlapping logical identifier ranges.

7. The apparatus of claim 1, wherein modifying the storage request comprises removing the storage request in response to determining that the storage request is obviated by one or more of the pending storage requests.

8. The apparatus of claim 7, wherein the request consolidation module is configured to remove the storage request in response to determining that the storage request comprises a trim request that pertains to one or more logical identifiers to be written by other pending storage requests.

9. The apparatus of claim 1, wherein the vector storage request comprises an atomic vector storage request, the apparatus further comprising:

a log storage module configured to append data pertaining to the atomic vector storage request contiguously within a log on the non-volatile storage medium; and an atomic storage module configured to include a first persistent indicator on the non-volatile storage medium, wherein the first persistent indicator is configured to indicate that the data pertains to an atomic storage operation.

10. The apparatus of claim 9, wherein the atomic storage module is configured to include a second persistent indicator on the non-volatile storage medium to indicate that the atomic vector storage request is complete.

11. The apparatus of claim 9, wherein the atomic storage module is configured to append one or more data packets pertaining to the atomic vector storage request contiguously within the log, and wherein a last data packet of the atomic storage operation within the log comprises a persistent metadata flag configured to indicate completion of the atomic storage operation.

12. An apparatus, comprising:

a request buffer configured to store one or more storage requests, including an atomic vector storage request;

a request consolidation module configured to modify one or more of the storage requests in the request buffer based on one or more other storage requests in the request buffer; and a storage request execution module configured to service storage requests in the request buffer;

a log storage module configured to append data pertaining to the atomic vector storage request contiguously within a log on anon-volatile storage medium; and an atomic storage module configured to include a first persistent indicator on the non-volatile storage medium, wherein the first persistent indicator is configured to indicate that the data pertains to an atomic storage operation.

13. The apparatus of claim 12, wherein the request consolidation module is configured to delete a storage request from the request buffer in response to one or more other storage requests in the request buffer.

14. The apparatus of claim 12, wherein the request consolidation module is configured to omit a trim storage request from the request buffer in response a storage request to store data to a set of logical identifiers that overlaps a set of logical identifiers of the trim storage request.

15. The apparatus of claim 12, wherein the request consolidation module is configured to consolidate two or more trim storage requests that overlap and/or are contiguous in a logical address space.

16. A non-transitory computer-readable storage medium comprising instructions configured to cause a computing device to perform a method, comprising:

buffering a plurality of storage requests, the plurality of storage requests comprising an atomic vector storage request;

modifying one of the plurality of storage requests based on a logical identifier range of the storage request and respective logical identifier ranges of others of the plurality of storage requests;

executing the buffered storage requests, wherein execution of one of the buffered storage requests comprises storing one or more data packets to a non-volatile solid-state storage medium;

appending data pertaining to the atomic vector storage request contiguously within a log on the non-volatile solid-state storage medium; and including a first persistent indicator on the non-volatile solid-state storage medium, wherein the first persistent indicator is configured to indicate that the data pertains to an atomic storage operation.

17. The non-transitory computer-readable storage medium of claim 16, wherein modifying the storage request comprises one or more of:

deleting the storage request in response to identifying one or more storage requests that pertain to logical identifiers that overlap the logical identifier range of the storage request; and combining the storage request with another storage request in response to one or more of the storage requests comprising logical identifier ranges that overlap in a logical address space and the storage requests comprising logical identifier ranges that are adjacent in the logical address space.

18. The non-transitory computer-readable storage medium of claim 16, wherein modifying the storage request comprises one or more of:

removing a trim storage request in response to a subsequent storage request to store data in association with a range of logical identifiers that overlaps the logical identifier range of the trim storage request; and consolidating the storage request with another storage request having a logical identifier range that overlaps with and/or is contiguous with the logical identifier range of the storage request within a logical address space.

* * * * *